(12) United States Patent
Maruyama et al.

(10) Patent No.: US 10,822,187 B2
(45) Date of Patent: Nov. 3, 2020

(54) ROLLER, SEPARATION DEVICE, IMAGE READING APPARATUS, AND RECORDING APPARATUS

(71) Applicant: SEIKO EPSON CORPORATION, Tokyo (JP)

(72) Inventors: Hidenobu Maruyama, Azumino (JP); Takuya Kojima, Chino (JP); Kentaro Miyazaki, Shiojiri (JP); Naohiro Daito, Shiojiri (JP); Kenta Anegawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/109,558

(22) Filed: Aug. 22, 2018

(65) Prior Publication Data

US 2019/0062083 A1 Feb. 28, 2019

(30) Foreign Application Priority Data

Aug. 23, 2017 (JP) .................................. 2017-160012
Mar. 22, 2018 (JP) .................................. 2018-053974

(51) Int. Cl.
*B65H 3/06* (2006.01)
*B65H 27/00* (2006.01)
(Continued)

(52) U.S. Cl.
CPC .......... *B65H 3/0638* (2013.01); *B41J 13/076* (2013.01); *B41J 13/22* (2013.01);
(Continued)

(58) Field of Classification Search
CPC ................ B65H 27/00; B65H 2404/11; B65H 2404/1122; B65H 2404/117; B65H 3/0638; B65H 3/5261; B65H 3/5284
See application file for complete search history.

(56) References Cited

U.S. PATENT DOCUMENTS 1,749,393 A * 3/1930 Pflimlin .................... D01H 5/74
492/48
3,486,543 A * 12/1969 Nishimura .............. B27B 25/02
144/250.1
(Continued)

FOREIGN PATENT DOCUMENTS

EP         1837298 A1 *  9/2007  ............. B65H 27/00
JP       61-203038 A       9/1986
(Continued)

*Primary Examiner* — Luis A Gonzalez
(74) *Attorney, Agent, or Firm* — Workman Nydegger

(57) ABSTRACT

An elastic body portion includes an inner circumferential portion and an outer circumferential portion which serves as an outer circumferential side with respect to the inner circumferential portion and a space portion between the inner circumferential portion and the outer circumferential portion, and a plurality of joining portions which join the inner circumferential portion and the outer circumferential portion to each other in the space portion, in which at least a portion of each of the joining portions has a curved shape, and in which the joining portions are each joined to the inner circumferential portion and the outer circumferential portion such that connecting portions between the joining portions and the inner circumferential portion and connecting portions between the joining portions and the outer circumferential portion do not form acute angles in the space portion.

11 Claims, 45 Drawing Sheets

(51) Int. Cl.
*F16C 13/00* (2006.01)
*B41J 13/076* (2006.01)
*B41J 13/22* (2006.01)
*H04N 1/04* (2006.01)
*B65H 3/52* (2006.01)
*H04N 1/00* (2006.01)

(52) U.S. Cl.
CPC ......... *B65H 3/0676* (2013.01); *B65H 3/5284* (2013.01); *B65H 27/00* (2013.01); *F16C 13/00* (2013.01); *H04N 1/0057* (2013.01); *H04N 1/00519* (2013.01); *H04N 1/00599* (2013.01); *H04N 1/00602* (2013.01); *H04N 1/04* (2013.01); *B65H 2404/117* (2013.01); *B65H 2404/1122* (2013.01); *B65H 2404/1316* (2013.01); *B65H 2404/185* (2013.01)

(56) References Cited

U.S. PATENT DOCUMENTS

| | | | | |
|---|---|---|---|---|
| 4,425,694 A | * | 1/1984 | Somerville | B65H 27/00 271/272 |
| 4,823,689 A | * | 4/1989 | Kishino | F16C 13/00 100/155 R |
| 6,769,679 B2 | * | 8/2004 | Ishibashi | B65H 27/00 271/109 |
| 7,386,249 B2 | * | 6/2008 | Bethel | G03G 15/0818 399/105 |
| 9,242,489 B2 | * | 1/2016 | Stephens | B41J 13/02 |
| 2003/0218293 A1 | | 11/2003 | Mizuno et al. | |
| 2005/0200074 A1 | * | 9/2005 | Boller | B65H 29/60 271/225 |
| 2017/0225916 A1 | | 8/2017 | Tsuda et al. | |

FOREIGN PATENT DOCUMENTS

| | | | | |
|---|---|---|---|---|
| JP | 61206767 A | * | 9/1986 | |
| JP | 62-224719 A | | 10/1987 | |
| JP | 2003-341859 A | | 12/2003 | |
| JP | 2006-001656 A | | 1/2006 | |
| JP | 2008-241739 A | | 10/2008 | |
| JP | 2011162283 A | * | 8/2011 | ............ B65H 27/00 |
| JP | 5860986 B | | 12/2015 | |
| JP | 2016-037390 A | | 3/2016 | |
| JP | 2016-175710 A | | 10/2016 | |
| JP | 6094913 B | | 8/2017 | |
| JP | 6094919 B | | 8/2017 | |
| JP | 2018-177461 A | | 11/2018 | |
| JP | 2018-179139 A | | 11/2018 | |

* cited by examiner

ROLLER, SEPARATION DEVICE, IMAGE READING APPARATUS, AND RECORDING APPARATUS

BACKGROUND

1. Technical Field

The present invention relates to a roller, a separation device, an image reading apparatus, and a recording apparatus.

2. Related Art

A roller which transports a medium is used in various devices. For example, the roller is used in a transport device of a medium, a separation device which separates a plurality of overlapping media, an image reading apparatus, a recording apparatus, and the like, each of which is provided with the transport device, the separation device, and the like. In such a device provided with a roller, in order to increase the contact area between the roller and the medium, the transporting of the medium is performed such that the medium and the contact surface (the surface of the roller) assume a state of being slightly elastically crushed. In other words, a roller capable of favorably transporting a medium in a state in which a surface of the roller is crushed is used.

For example, in JP-A-2016-175710, a roller (a paper feed roller) in which an inner-wheel portion and an outer-wheel portion are joined by a plurality of straight line shaped connecting walls (joining portions) which are disposed in a radial shape from a rotation center is disclosed, and the roller is configured to be capable of transporting a medium in a state in which the surface of the roller is crushed.

JP-A-2003-341859 discloses a roller (a feed roller) which is capable of feeding out paper sheets (media), where the roller is flexible, and is provided with ribs (joining portions) which join a shaft portion and a circumferential portion and vacancies (space portions) between the shaft portion and the circumferential portion and the roller is configured to be capable of transporting the medium in a state in which the surface of the roller is crushed.

Here, it is also possible to achieve a configuration in which the roller is capable of transporting the medium in a state in which the surface of the roller is crushed by using a foam rubber material. However, in order to secure the transporting capability of the roller using the foam rubber material, a high-performance material becomes necessary and there is a problem in that the costs are increased. Additionally, cracks form more easily with the passage of time originating from the foam part, the shape is not easily restored to the original shape when deformations are applied repeatedly, resulting in a problem of the durability of the roller being reduced.

In the roller which is disclosed in JP-A-2016-175710, the connecting walls are disposed to extend radially from a rotation center in a straight line shape. Therefore, the degree of crushing of the roller fluctuates between a state in which the connecting walls are positioned in the direction in which the force is applied to the medium from the roller (a state in which the roller is not easily crushed) and a state in which the connecting walls are not positioned in this direction (a state in which the roller is easily crushed). In other words, the crushing of the surface of the roller fluctuates when transporting the medium. When the crushing of the surface of the roller fluctuates, the transporting capability of the medium is reduced.

In regard to the roller which is disclosed in JP-A-2003-341859, a connecting portion of a shaft portion side and a circumferential portion side in the rib are joined to each other to configure an acute angle in a vacant portion and there is a case in which manufacturing a mold for manufacturing the connecting portion of such a configuration is difficult. Since the connecting portions which configure acute angles in the vacant portions are joined, a force is concentrated on the corner portions which configure the acute angles, breakage based on the corner portions and the like occurs easily, and there is a problem with the durability.

SUMMARY

An advantage of some aspects of the invention is to use a roller which may be easily manufactured while suppressing a reduction in durability so as to reduce fluctuation in crushing of a surface of the roller when transporting a medium.

According to an aspect of the invention, there is provided a roller which includes an elastic body portion that is provided on an outer circumferential surface of a shaft, in which the elastic body portion includes an inner circumferential portion which serves as the shaft side and an outer circumferential portion which serves as an outer circumferential side with respect to the inner circumferential portion, and a space portion between the inner circumferential portion and the outer circumferential portion, and a plurality of joining portions which join the inner circumferential portion and the outer circumferential portion to each other in the space portion, in which at least a portion of each of the joining portions has a curved shape, and in which the joining portions are each joined to the inner circumferential portion and the outer circumferential portion such that connecting portions between the joining portions and the inner circumferential portion and connecting portions between the joining portions and the outer circumferential portion do not form acute angles in the space portion.

In this configuration, at least a portion of each the joining portions which join the inner circumferential portion and the outer circumferential portion to each other in the space portion has a curved shape. Since it is possible to effectively distribute the force which is applied to the medium from the roller by rendering the joining portions a curved shape, it is possible to reduce the fluctuation in the force which is applied to the medium from the roller regardless of the disposition of the roller with respect to the medium. Therefore, it is possible to reduce the fluctuation in the crushing of the surface of the roller.

The connecting portions between the joining portions and the inner circumferential portion and the connecting portions between the joining portions and the outer circumferential portion are each joined to the inner circumferential portion and the outer circumferential portion so as not to form acute angles in the space portion. Therefore, for example, the manufacturing of the roller is made easy such as being able to simplify the structure of the mold used when manufacturing the elastic body portion (in particular, the structure of the regions corresponding to the connecting portions). It is possible to distribute the force which is applied to the connecting portions and it is possible to suppress a reduction in the durability. This is because, when the connecting portions are joined so as not to configure acute angles in the space portion, a force is concentrated on the corner portions which configure the acute angles and breakage and the like occurs easily, whereas it is possible to ensure that breakage and the like does not occur easily by eradicating such corner portions by not configuring acute angles (acute angles are not formed).

Here, the expression "curved shape" means a shape in which an end portion of the joining portion on one side of the space portion and an end portion of the joining portion on the other side of the space portion are rounded (curved) to the same direction side.

The expression "joined so as not to form an acute angle" means "not joined so as to form a sharp angle", and, for example, includes configurations in which the corner portion of the space portion at the connecting portion between the joining portion and the inner circumferential portion and the connecting portion between the joining portion and the outer circumferential portion is a right angle or an obtuse angle, and configurations in which, even if the corner portion is an acute angle, the tip is a rounded shape (a curved shape). Since the meaning is "not joined so as to form a sharp angle", this does not mean in the strict sense "joined so as to be less than 90°", and, for example, means that an angle close to an angle which is no less than 80° is permissible even if the angle is less than 90°.

In the roller, the joining portions may be joined to tangential lines of the inner circumferential portion and the outer circumferential portion in a perpendicular direction.

In this configuration, since the joining portions are joined to the tangential lines of the inner circumferential portion and the outer circumferential portion in a perpendicular direction, in particular, it is possible to distribute the force which is applied to the connecting portions and it is possible to suppress a reduction in the durability. In this configuration, due to being able to effectively distribute the force which is applied to the connecting portions, it is possible to render the connecting portions thick and it is possible to effectively reduce the fluctuation in the crushing of the surface of the roller.

Here, the meaning of the expression "joined in a perpendicular direction" includes a case in which the joining is at the perpendicular direction by a strict definition in which the joining is at a direction of 90° with respect to the tangential lines of the inner circumferential portion and the outer circumferential portion, and a case in which the joining is at an angle slightly deviated from 90° with respect to the tangential lines of the inner circumferential portion and the outer circumferential portion. For example, the meaning of the expression includes a case in which the joining is at a direction which is 90°±10° with respect to the tangential lines of the inner circumferential portion and the outer circumferential portion.

In the roller, a connecting portion between a first joining portion of the joining portions and the inner circumferential portion and a connecting portion between a second joining portion, which is adjacent to the first joining portion, of the joining portions and the outer circumferential portion may be provided on the same straight line extending in a radial direction of the roller.

In this configuration, the connecting portion between the first joining portion and the inner circumferential portion and the connecting portion between a second joining portion, which is adjacent to the first joining portion, and the outer circumferential portion are provided on the same straight line which extends in the radial direction of the roller. By adopting such a configuration, it is possible to maintain the strength of the joining portions while suppressing an increase in the volume of the joining portions (such an increase leads to the roller becoming difficult to crush and a reduction in the transporting capability) and it is possible to suppress the roller becoming difficult to crush and the transporting capability being reduced.

In the roller, the elastic body portion may include an inner layer portion which serves as the shaft side, and an outer layer portion which serves as a side which contacts a medium, and the inner layer portion may include the joining portions, the inner circumferential portion, and the outer circumferential portion.

In this configuration, it is possible to apply the elastic body portion of the roller to a two-layer structure roller and the effects described above may be obtained.

The roller may further include a partition portion that partitions the space portion into one side and another side of the roller in an axial direction.

In a case in which the elastic body portion is manufactured by insert molding or the like using a low-fluidity raw material, a problem of the shape precision of the final molded product being reduced occurs easily. However, in this configuration, since it is possible to improve the fluidity of the raw material using the partition portion, it is possible to suppress the occurrence of the problem.

In the roller, a first joining portion of the joining portions and a second joining portion which is adjacent to the first joining portion may be in a positional relationship so as not to interfere with each other in a radial direction when the elastic body portion is crushed in the radial direction.

In this configuration, since the first joining portion of the joining portions and the second joining portion which is adjacent to the first joining portion are in a positional relationship so as not to interfere with each other in the radial direction when the elastic body portion is crushed in the radial direction, it is possible to suppress the fluctuation in the crushing which is caused by the interference between the first joining portion and the second joining portion when the roller surface is crushed.

In the roller, a thickness of the outer circumferential portion in the radial direction may be greater than or equal to a thickness of the joining portions in a circumferential direction.

Since the thickness of the outer circumferential portion in the radial direction is greater than or equal to the thickness of the joining portions in a circumferential direction, it is possible to suppress the fluctuation in the crushing when the roller surface is crushed.

In the roller, positions of connecting portions between the joining portions and the inner circumferential portion and connecting portions between the joining portions and the outer circumferential portion may be deviated in a circumferential direction and the joining portions are S-shaped as viewed from a rotating shaft direction.

Accordingly, in a configuration in which the positions of the connecting portions between the joining portions and the inner circumferential portion and the connecting portions between the joining portions and the outer circumferential portion are deviated in a circumferential direction and the joining portions are S-shaped as viewed from the rotating shaft direction, the same operations and effects may be obtained as described above.

According to another aspect of the invention, there is provided a separation device which includes a feed roller, and a retarding roller that forms a pair with the feed roller to separate media other than a medium which is transported from a bundle of media and return the separated media upstream, in which the retarding roller is the roller according to any one of the configurations described above.

In this configuration, it is possible to realize a more effective separation device using a pair of a feed roller and a retarding roller.

The separation device may further include the shaft, in which the positioning unit which determines a position of the elastic body portion with respect to the shaft in a rotation direction of the roller may be provided on the shaft.

In this configuration, it is possible to determine the position of the elastic body portion with respect to the shaft in the rotation direction of the roller at a suitable position using the positioning unit.

The separation device may further include the shaft, in which a flange may be provided on the shaft, and in which a positioning unit which determines a position of the elastic body portion with respect to the shaft in a rotation direction of the roller may be provided on the flange.

In this configuration, it is possible to determine the position of the elastic body portion with respect to the shaft in the rotation direction of the roller at a suitable position using the positioning unit.

According to still another aspect of the invention, there is provided an image reading apparatus which includes a reader that reads image information of a medium, and a roller that is provided in a medium transport path which passes through a reading execution region of the reader and applies a feeding force to the medium, in which the roller has a structure in which when the roller is pressed against the medium, a contact surface thereof is elastically crushed, and in which at least one of the rollers is the roller according to any one of the configurations described above.

In this configuration, it is possible to obtain the effects described in the configurations above as an image reading apparatus.

According to still another aspect of the invention, there is provided an image reading apparatus which includes a reader that reads image information of a medium, and the separation device according to one of the configurations described above.

In this configuration, in the image reading apparatus, similar operations and effects may be obtained to those of the configurations which are described above.

According to still another aspect of the invention, there is provided a recording apparatus which includes a recording unit, and a roller that is provided in a medium transport path which passes through a recording execution region of the recording unit and applies a feeding force to the medium, in which the roller has a structure in which when the roller is pressed against the medium, a contact surface thereof is elastically crushed, and in which at least one of the rollers is the roller according to one of the configurations described above.

In this configuration, it is possible to obtain the effects described in the configurations above as a recording apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
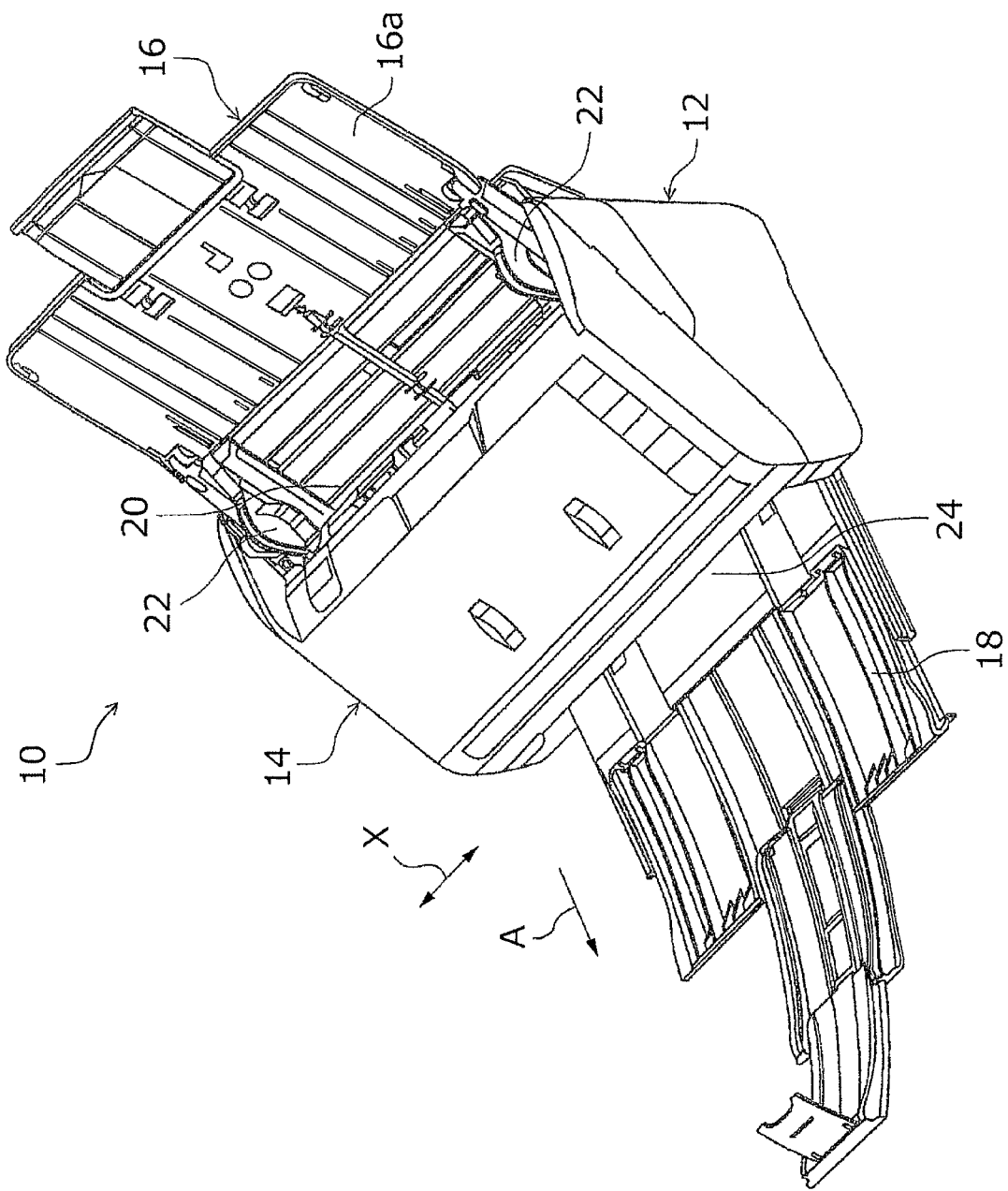
FIG. 1 is a perspective view illustrating an external view of an image reading apparatus according to an embodiment of the invention.

First, for the image reading apparatus according to an embodiment of the invention, a description will be given of an outline of the overall configuration of an image reading apparatus and the configuration of a medium transport path using a continuous automatic feeding image scanner illustrated in FIGS. 1 and 2 as an example. Next, for the separation device according to an embodiment of the invention, a description will be given of the configuration of a separation device and an outline of the separation operation using the separation device illustrated in FIG. 3 which is installed in the image reading apparatus as an example.

Next, a description will be given of a specific example of a roller of the invention while comparing a portion to the roller of the reference example illustrated in FIG. 47, using the roller according to the first to the twenty-fifth embodiments illustrated in FIGS. 4 to 46 which may be applied to a retarding roller of the separation device. Finally, reference will be made to an embodiment in which the roller of the invention is applied to the recording apparatus. In the drawings, constituent parts which achieve the same functions are given the same reference numerals and duplicate description will be avoided.

Figure 2:
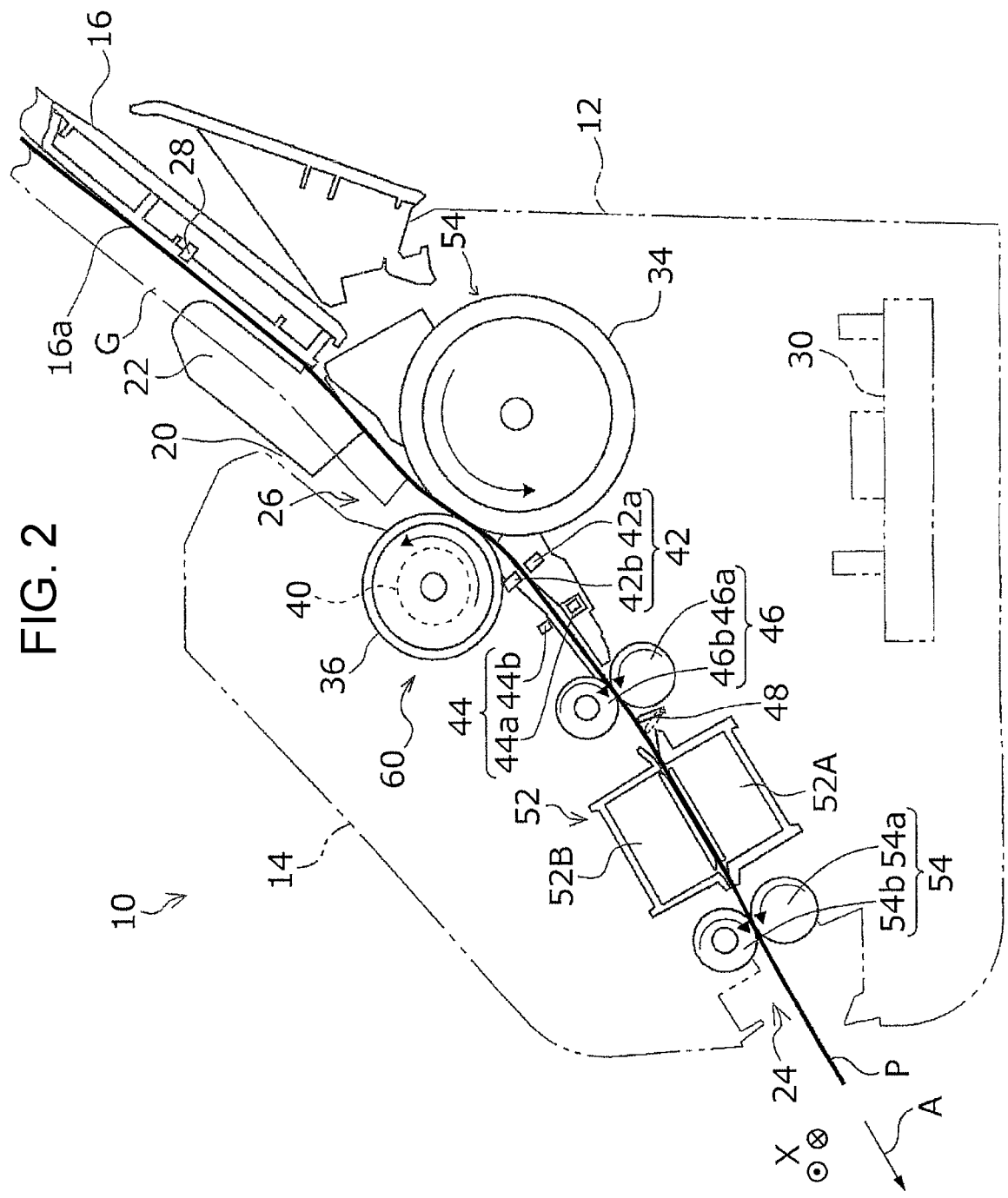
FIG. 2 is a sectional diagram of the main parts illustrating the image reading apparatus according to an embodiment of the invention.

(1) Overview of Entire Configuration of Image Reading Apparatus (Refer to FIGS. 1 and 2)

An image reading apparatus 10 is provided with a bottom unit 12, a top unit 14, a cover portion 16, and an output tray 18. Although not illustrated, the top unit 14 includes a rotational movement fulcrum on an end portion on the downstream side of the bottom unit 12 in a medium transport direction A and is attached to the bottom unit 12 to be capable of rotationally moving via the rotational movement fulcrum.

Although not illustrated, the bottom unit 12 includes a rotational movement fulcrum on a top portion of the bottom unit 12 on the rear side and the cover portion 16 is attached to the bottom unit 12 to be capable of rotationally moving via the rotational movement fulcrum. The cover portion 16 is capable of adopting a non-feeding state (not illustrated) in which the cover portion 16 covers the top portion and a feed port 20 of the top unit 14 and a feeding-capable state in which the cover portion 16 rotationally moves to the apparatus rear side as illustrated in FIG. 1 and opens the feed port 20. As illustrated in FIG. 1, when the cover portion 16 enters the feeding-capable state, the reverse surface of the cover portion 16 functions as a medium placement portion 16a on which the medium P is placed.

An output port 24 which outputs the medium P is provided on the apparatus front side of the bottom unit 12. The bottom unit 12 is provided with the output tray 18 which may be pulled out from the output port 24 toward the apparatus front side. The output tray 18 is attached to the bottom unit 12 such that the output tray 18 may be pulled out to be capable of adopting a state in which the output tray 18 is stored in the base portion of the bottom unit 12 (not illustrated) and a state in which the output tray 18 is pulled out to the apparatus front side (refer to FIG. 1). The output tray 18 is configured by connecting a plurality of tray members and it is possible to adjust the pull-out length from the output port 24 in relation to the size of the medium P which is outputted.

(2) Configuration of Medium Transport Path in Image Reading Apparatus

Next, a description will be given of the configuration of a medium transport path 26 in the image reading apparatus 10 based on FIG. 2. In FIG. 2, only the outlines of the bottom unit 12 and the top unit 14 are illustrated by virtual lines. The bold solid line which is given a reference numeral P in FIG. 2 illustrates a track of the transporting of the medium P which is transported along the medium transport path 26 inside the image reading apparatus 10. A configuration is adopted in which the medium P which is multi-fed (not illustrated) is separated by a separation device 60 (described later), is separated from the medium P which is transported toward a reader 52, and the remaining medium P remains at the position at which the medium P is separated by the separation device 60.

A bundle G of media, the leading ends of which are inserted into the feed port 20, is set in a state of being supported by the medium placement portion 16a as illustrated by the dot-dash line in FIG. 2. A placement portion detection sensor 28 is provided on the medium placement portion 16a. The placement portion detection sensor 28 is configured, for example, by a contact sensor including a lever or the like, an optical non-touch sensor, or the like and when the medium P is set on the medium placement portion 16a, the detection signal of the placement portion detection sensor 28 is transmitted to a control unit 30 illustrated by a virtual line in FIG. 2.

As illustrated in FIG. 1, a pair of edge guides 22 is provided on the medium placement portion 16a. The edge guides 22 are configured to be capable of moving in a direction approaching each other and a direction separating from each other in an apparatus width direction X. A configuration is adopted in which, when the medium P is set on the medium placement portion 16a, the guide surfaces of the edge guides 22 are in contact with the left and right side portions of the medium P in the apparatus width direction X, the position of the medium P is restricted in the apparatus width direction X, and the feeding of the medium P toward the reader 52 is guided. The edge guides 22 which are illustrated in FIG. 1 are in a state of being most separated in the apparatus width direction X, that is, the width direction of the medium P.

Of the bundle G of media which are set in the medium placement portion 16a, the medium P which is positioned bottommost is fed toward the downstream side in the medium transport direction A by a feed roller 34 which is rotationally driven by a feed drive motor (not illustrated). Although not illustrated, two feed rollers 34 are provided with an interval in the apparatus width direction X, for example. The outer circumferential surface of the feed roller 34 is configured using a high friction material (for example, a synthetic rubber, an elastomer, or the like).

In FIG. 2, the leading end of the bundle G of documents (media) is held at a feed standby position illustrated in FIG. 2 by a stopper (not illustrated) before the start of the feeding and the entrance of the bundle G to the space between the feed roller 34 and a retarding roller 36 is restricted.

The retarding roller 36 which serves as a constituent member of the separation device 60 (described later) together with the feed roller 34 is provided at a position facing the feed roller 34. In the same manner as the feed roller 34, two retarding rollers 36 are provided in the apparatus width direction X, for example. The retarding roller 36 is provided in a state of being biased to the feed roller 34 side by biasing units (not illustrated).

The retarding roller 36 is configured to be rotationally driven in a rotation direction C which is a reverse of a rotation direction B of the feed roller 34 by a transport drive motor (not illustrated), the retarding roller 36 is provided with a torque limiter 40, and the retarding roller 36 is configured to receive the drive torque of the transport drive motor (not illustrated) via the torque limiter 40.

A first medium detection sensor 42 which detects the feeding of the medium P is provided at a position downstream of the medium transport path 26 between the feed roller 34 and the retarding roller 36. Although not illustrated, the first medium detection sensor 42 is disposed, for example, inside a transporting region of the maximum size of the medium P in the apparatus width direction X which may be fed in the medium transport path 26. The first medium detection sensor 42 is configured, for example, by an optical non-contact sensor which is provided with a light emitting unit 42a and a light receiving unit 42b which are disposed at positions facing each other interposing the medium transport path 26. The first medium detection sensor 42 is configured such that, the feeding of the medium P is detected due to the medium P blocking the detection light from the light emitting unit 42a when the medium P is transported in the medium transport path 26 and the detection signal is transmitted to the control unit 30.

A multi-feeding detection sensor 44 which detects the multi-feeding of the medium P is disposed, for example, in the medium transporting region in the apparatus width direction X on the downstream side of the first medium detection sensor 42 in the medium transport direction A in the medium transport path 26. The multi-feeding detection sensor 44 is provided with a speaker unit 44a and a microphone unit 44b and is configured to emit ultrasonic waves from the speaker unit 44a toward the medium P which passes through the medium transport path 26 and to detect a reflected sound from the medium P using the microphone unit 44b. In the present embodiment, the multi-feeding detection sensor 44 is configured to be capable of detecting not only the multi-feeding of the medium P, but also to be capable of detecting the type of the medium P such as the thickness of the medium P using the frequency of the reflected sound.

A transport roller pair 46, which is configured by providing a transport drive roller 46a and a transport driven roller 46b, is provided at a position downstream of the multi-feeding detection sensor 44 in the medium transport direction A in the medium transport path 26. A second medium detection sensor 48 which is configured by a contact sensor including a lever, for example, is provided at a position downstream of the transport roller pair 46 in the medium transport direction A.

The reader 52 which reads an image which is expressed on the medium P as image information is provided at a position downstream of the second medium detection sensor 48 in the medium transport direction A. The reader 52 is provided with a first reading unit 52A and a second reading unit 52B. The first reading unit 52A is provided on the bottom unit 12 to face the first surface which is the bottom surface of the medium P which is transported along the medium transport path 26 and the second reading unit 52B is provided on the top unit 14 to face the second surface which is the top surface of the medium P which is transported along the medium transport path 26. The first reading unit 52A and the second reading unit 52B are configured as contact image sensor modules (CISM), for example.

The medium P in which the image which is expressed on at least one surface of the first surface and the second surface is read by the reader 52 is transported to an output roller pair 54 which is positioned at a position downstream of the reader 52 in the medium transport direction A. The output roller pair 54 is configured to include an output drive roller 54a and an output driven roller 54b and the medium P is nipped by the output roller pair 54 which is configured in this manner to be output from the output port 24 to the outside.

The transport drive roller 46a of the transport roller pair 46 and the output drive roller 54a of the output roller pair 54 may be rotationally driven using a single motor which is a common drive source and may be independently rotationally driven using separate motors.

The image reading apparatus 10 according to the invention is provided with the reader 52 which reads the image information of the medium P, the various rollers 34, 36, 46, 54, and the like which are provided in the medium transport path 26 which passes through the reading execution region of the reader 52 and apply a feeding force to the medium P. Each of the rollers 34, 36, 46, 54, and the like has a structure in which a contact surface S (refer to FIG. 3) is elastically crushed when pressed onto the medium P.

At least one of the rollers 34, 36, 46, 54, and the like is configured by a roller 1 of an aspect of the invention (described later). In the present embodiment, the retarding roller 36 is configured by the roller 1 of an aspect of the invention.

Figure 3:
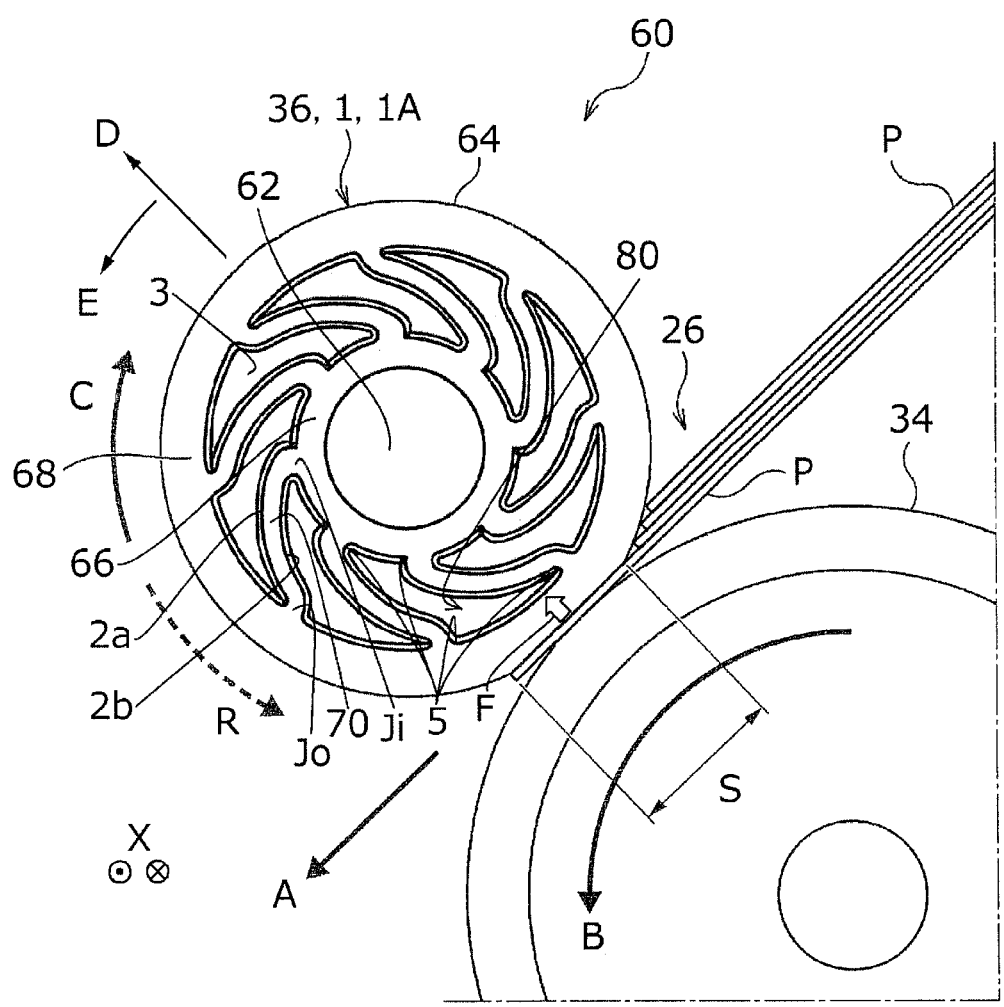
FIG. 3 is a sectional diagram of the main parts illustrating a separation device according to an embodiment of the invention.
Figure 4:
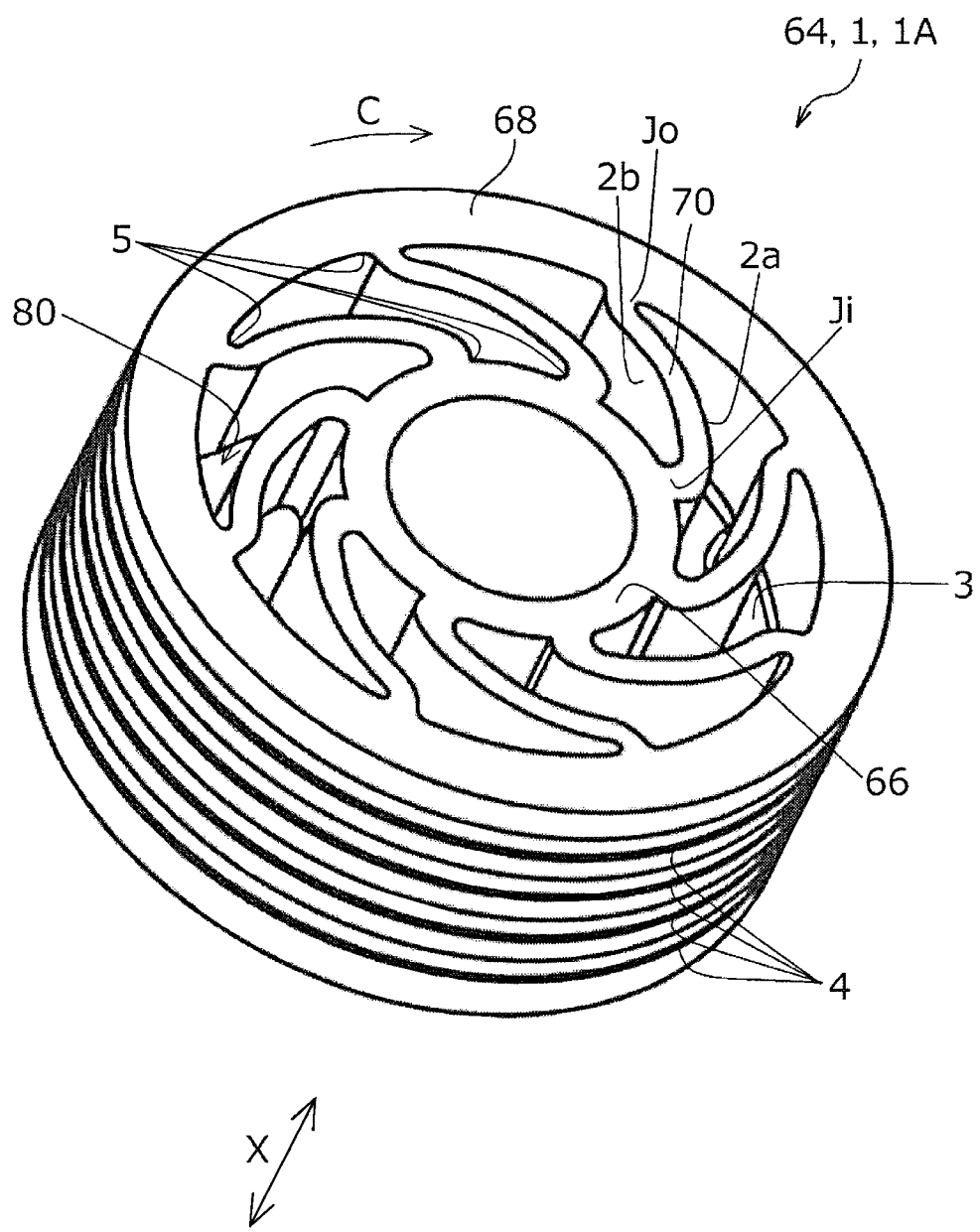
FIG. 4 is a perspective view illustrating a portion (an elastic body portion) of a roller according to a first embodiment of the invention.
Figure 5:
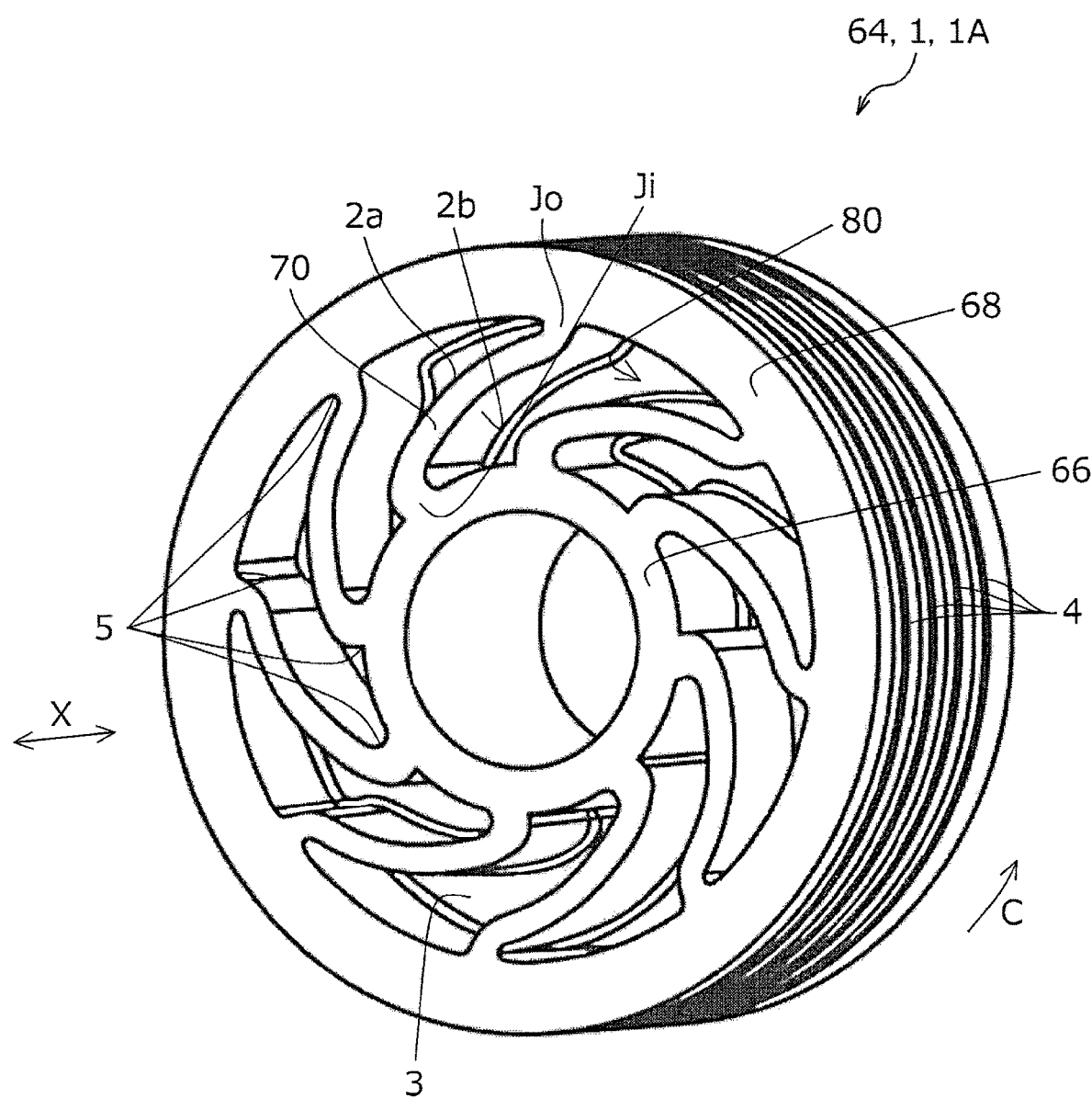
FIG. 5 is a perspective view illustrating a portion (the elastic body portion) of the roller according to the first embodiment of the invention.

(3) Configuration of Separation Device (Refer to FIG. 3)

The separation device 60 is provided with the feed roller 34 and the retarding roller 36 which forms a pair with the feed roller 34 to separate media other than the medium P which is transported from the bundle G of media and return the separated media upstream, and the retarding roller 36 is configured by the roller 1 of an aspect of the invention.

The roller 1 of an aspect of the invention is provided with a shaft 62 and an elastic body portion 64 which is provided on an outer circumferential surface of the shaft 62. The shaft 62 may be perceived as a member which configures the separation device 60 separately from the roller 1 instead of as a constituent element of the roller 1.

The elastic body portion 64 of the roller 1 is provided with an inner circumferential portion 66 which serves as the shaft 62 side and an outer circumferential portion 68 which serves as the outer circumferential side with respect to the inner circumferential portion 66. A space portion 80 and a plurality of joining portions 70 which join the inner circumferential portion 66 to the outer circumferential portion 68 in the space portion 80 are provided between the inner circumferential portion 66 an the outer circumferential portion 68.

The joining portions 70 are provided in a state of being inclined in the same direction in a circumferential direction E with respect to a radial direction D of the roller 1.

As illustrated in FIG. 3, in the present embodiment, when the connecting portion between the joining portion 70 and the inner circumferential portion 66 is Ji and the connecting portion between the joining portion 70 and the outer circumferential portion 68 is Jo, the joining portions 70 are attached such that the orientation of the inclination of the joining portions 70 causes the direction of rocking in which the connecting portion Ji is a fulcrum to be a direction R which returns the medium P to the upstream side in the medium transport direction A when the roller 1 receives a pressing force F from the medium P. Naturally, the joining portions 70 may be attached such that the direction of rocking in which the connecting portion Ji is a fulcrum is the reverse of the direction R which returns the medium P to the upstream side in the medium transport direction A.

(4) Separation Operation of Separation Device (Refer to FIG. 3)

Next, a description will be given dividing the separation operation of the medium P by the separation device 60 into (A) a basic separation operation and (B) a special separation operation which is obtained by the roller 1 of an aspect of the invention.

(A) Basic Separation Operation

When the rotational torque which is received by the feed roller 34 exceeds a limit torque of the torque limiter 40, the retarding roller 36 is cut off from the drive system of the transport drive motor (not illustrated) which drives the retarding roller 36 by the torque limiter 40 and is driven by the feed roller 34 to rotate in a clockwise direction as illustrated by a rotation direction C in FIG. 3.

When the feeding of the medium P is started and plural sheets of the media P enter the space between the feed roller 34 and the retarding roller 36, the retarding roller 36 stops receiving rotational torque from the feed roller 34 and the rotation driven by the feed roller 34 stops. The retarding roller 36 receive the drive force of the transport drive motor via the torque limiters 40 and starts rotating in the reverse direction from the feed roller 34 (the counterclockwise direction as illustrated by the dashed line arrow R in FIG. 3).

Accordingly, the upper media P for which to prevent the multi-feeding excluding the bottommost medium P to be fed do not receive the transporting force for progressing to the downstream side in the medium transport direction A, are returned to the upstream side in the medium transport direction A by the rotation of the retarding roller 36, and the multi-feeding of the medium P is prevented. Since the bottommost medium P to be fed is directly in contact with the feed roller 34, the medium P is transported to the downstream side in the medium transport direction A by the transporting force which is received from the feed roller 34.

(B) Special Separation Operation

The feed roller 34 is in contact with the retarding roller 36 before the medium P is supplied between the feed roller 34 and the retarding roller 36. When a feeding force acts on the medium P of the bottommost surface of the bundle G of media which are set in the medium placement portion 16a due to the rotation of the feed roller 34, a plurality of sheets of the media P enter the space between the feed roller 34 and the retarding roller 36.

Since the retarding roller 36 is not in contact with the feed roller 34 due to the media P, the driven rotation in the clockwise direction illustrated by the rotation direction C in FIG. 3 stops, that is, the rotation in the reverse direction (the counterclockwise direction as illustrated by the dashed arrow R in FIG. 3) is started by the drive force of the retarding roller 36 itself, and the second sheet from the bottommost surface onward of the media P are returned to the upstream in the medium transport direction A.

In the retarding roller 36 to which the roller 1 of an aspect of the invention is applied, the pressing force F from the medium P acts toward the retarding roller 36 at the moment the medium P enters between the feed roller 34 and the retarding roller 36, and the outer circumferential surface of the retarding roller 36 assumes a slightly crushed state.

Although the joining portions 70 rock slightly using the connecting portions Ji between the joining portions 70 and the inner circumferential portion 66 as fulcrums when the outer circumferential surface of the retarding roller 36 is crushed, when the inclination direction of the joining portions 70 is the direction illustrated in FIG. 3, a slight rocking occurs momentarily in the counterclockwise direction in FIG. 3 due to the rocking. The momentary rotation applies an action returning the medium P to the upstream side in the medium transport direction A. Therefore, it is possible to realize an effective separation operation of the medium P using the retarding roller 36 according to the present embodiment to which the roller 1 of an aspect of the invention is applied.

(5) Specific Configuration of Roller 1 (Refer to FIGS. 3 to 46)

First, a description will be given of the roller 1 (a roller 1A) of the first embodiment using FIGS. 3 to 6 as a specific configuration of the roller 1.

The roller 1A of the present embodiment illustrated in FIGS. 3 to 6 is a roller provided with the shaft 62 and the elastic body portion 64 which is provided on the outer circumferential surface of the shaft 62. The elastic body portion 64 is provided with the inner circumferential portion 66 which is the shaft 62 side and the outer circumferential portion 68 which is the outer circumferential side with respect to the inner circumferential portion 66, and is provided with the space portion 80 and the plurality of joining portions 70 which join the inner circumferential portion 66 to the outer circumferential portion 68 in the space portion 80 between the inner circumferential portion 66 an the outer circumferential portion 68.

Here, as illustrated in FIG. 3, in each of the joining portions 70, an end portion (for example, an end portion 2a) of the joining portion 70 on one side of the space portion 80 and an end portion (for example, an end portion 2b) of the joining portion 70 on the other side of the space portion 80 have curved shapes which are rounded (curved) to the same direction side. The connecting portion Ji between the joining portion 70 and the inner circumferential portion 66 and the connecting portion Jo between the joining portion 70 and the outer circumferential portion 68 are joined to the inner circumferential portion 66 and the outer circumferential portion 68 so as not to form an acute angle (to avoid configuring an acute angle) in the space portion 80.

If at least a portion of the joining portion 70 which joins the inner circumferential portion 66 to the outer circumferential portion 68 in the space portion 80 has a curved shape, it is possible to more effectively distribute the force which is applied to the medium P from the roller 1 by causing the curved shape portion which is an easily warped shape to warp. Therefore, regardless of the disposition of the roller 1 with respect to the medium P, it is possible to reduce the fluctuation in the force applied to the medium P from the roller 1 and it is possible to reduce the fluctuation in the crushing of the surface of the roller 1.

The connecting portion Ji between the joining portion 70 and the inner circumferential portion 66 and the connecting portion Jo between the joining portion 70 and the outer circumferential portion 68 are joined to the inner circumferential portion 66 and the outer circumferential portion 68 so as not to form an acute angle in the space portion. Therefore, for example, the manufacturing of the roller 1 is made easy such as being able to simplify the structure of the mold used when manufacturing the elastic body portion 64 (in particular, the structure of the regions corresponding to the connecting portions Ji and the connecting portions Jo). It is possible to distribute the force which is applied to the connecting portions Ji and the connecting portions Jo and it is possible to suppress a reduction in the durability. This is because, when the connecting portions Ji and the connecting portions Jo are joined so as not to configure acute angles in the space portion 80, a force is concentrated on corner portions 5 which configure the acute angles and breakage and the like based on the corner portions 5 occurs easily, whereas it is possible to ensure that breakage and the like does not occur easily by eradicating such corner portions 5 by not configuring acute angles (acute angles are not formed).

Here, the expression "joined so as not to form an acute angle" means "not joined so as to form a sharp angle", and, for example, includes configurations in which the corner portion 5 of the space portion 80 at the connecting portion Ji between the joining portion 70 and the inner circumferential portion 66 and the connecting portion Jo between the joining portion 70 and the outer circumferential portion 68 is a right angle or an obtuse angle, and configurations in which, even if the corner portion 5 is an acute angle, the tip is a rounded shape (a curved shape). Since the meaning is "not joined so as to form a sharp angle", this does not mean in the strict sense "joined so as to be less than 90°", and, for example, means that an angle close to an angle which is no less than 80° is permissible even if the angle is less than 90°. In the roller 1A of the present embodiment, the corner portions 5 of the space portion 80 are all right angles or obtuse angles and the tips are rounded shapes (refer to FIGS. 3 to 6). Even in roller 1B to roller 1X (described later), all of the corner portions 5 of the space portion 80 are at least right angles or obtuse angles or the tips have rounded shapes.

In the roller 1A of the present embodiment, a plurality of ring-shaped groove portions 4 are formed at a predetermined pitch in the axial direction of the roller 1A in the outer circumferential surface which contacts the medium P in the elastic body portion 64.

Figure 6:
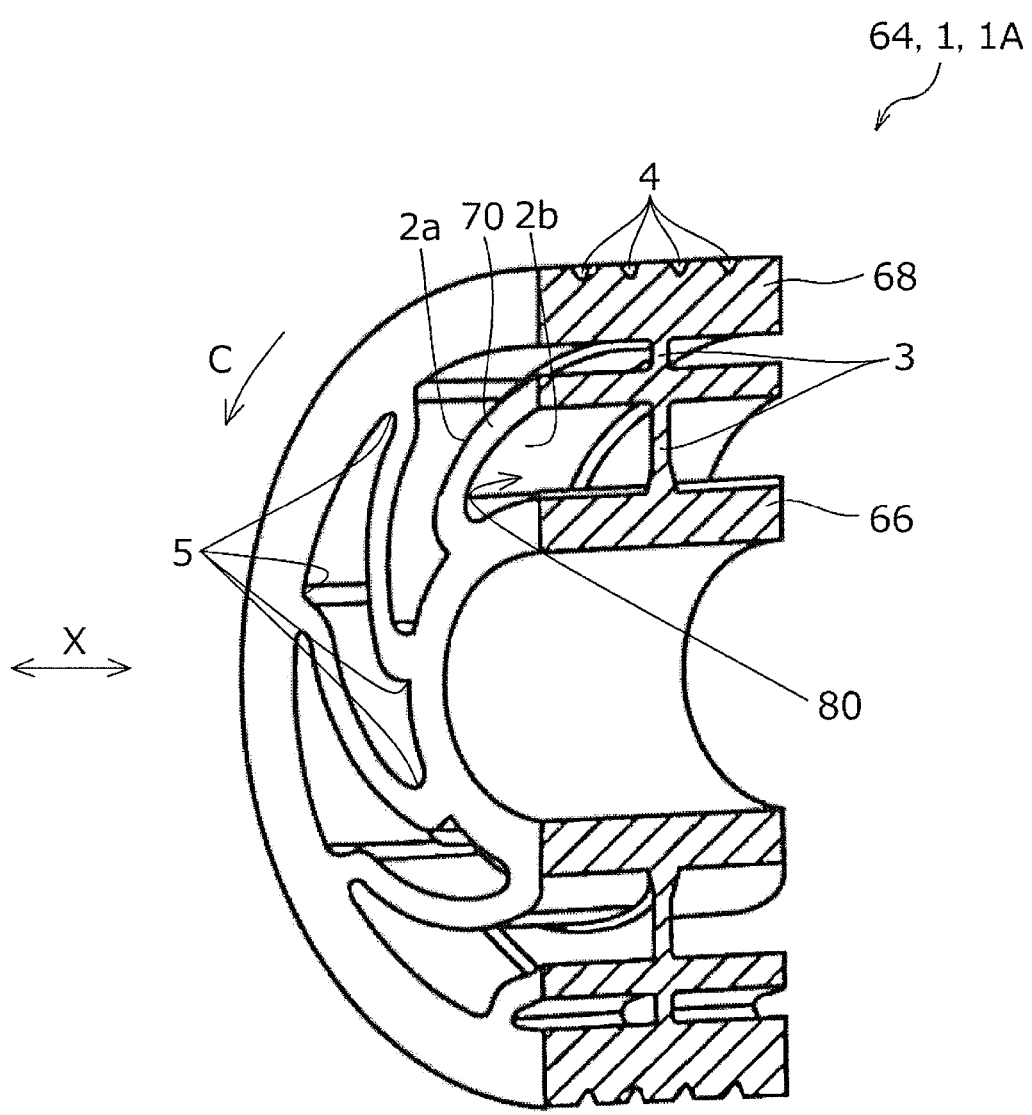
FIG. 6 is a sectional diagram illustrating a portion (the elastic body portion) of the roller according to the first embodiment of the invention.

In the roller 1A of the present embodiment, particularly as illustrated in FIG. 6, a partition portion 3 which partitions the space portion 80 into one side and another side of the roller 1A in the axial direction (a direction going along the apparatus width direction X).

In a case in which the elastic body portion 64 is manufactured by insert molding or the like using a low-fluidity raw material, a problem of the shape precision of the final molded product being reduced occurs easily. However, in the roller 1A of the present embodiment, since it is possible to improve the fluidity of the raw material using the partition portion 3, it is possible to suppress the occurrence of the problem.

There the shape of the partition portion 3 is not particularly limited, and in addition to a shape which is formed integrally with the joining portions 70 and connects with the inner circumferential portion 66 and the outer circumferential portion 68 as in the partition portion 3 of the present embodiment, for example, it is possible to adopt a shape which does not connect with at least one of the joining portions 70, the inner circumferential portion 66, and the outer circumferential portion 68, a shape in which a hole is opened which penetrates the apparatus width direction X, and the like.

However, the roller 1 of the invention is not limited to a configuration provided with the partition portion 3. Therefore, as specific configurations of the roller 1 which is not provided with the partition portion 3, a description will be given of the roller 1 (a roller 1B) of the second embodiment using FIGS. 7 and 8, the roller 1 (a roller 1C) of the third embodiment using FIGS. 9 and 10, the roller 1 (a roller 1D) of the fourth embodiment using FIG. 11, the roller (a roller 1E) of the fifth embodiment using FIG. 12, and the roller 1 (a roller 1F) of the sixth embodiment using FIG. 13. When describing the rollers 1 of the second to the fourth embodiments, a description will be given with comparison to a roller 101 of a roller illustrated in FIG. 47.

Excluding the fact that the partition portion 3 is not provided, the roller 1B of the second embodiment has the same shape as the roller 1A of the first embodiment. Expressed in other terms, the roller 1B of the second embodiment is configured such that the space portion 80 of the roller 1A of the first embodiment penetrates the roller 1A in the axial direction.

Although also applicable to the roller 1A of the first embodiment, in the roller 1B of the second embodiment, the joining portion 70 is joined to the inner circumferential portion 66 and the outer circumferential portion 68 in a perpendicular direction to the tangential lines of the inner circumferential portion 66 and the outer circumferential portion 68. Therefore, in particular, in this configuration, it is possible to distribute the force which is applied to the connecting portions Ji and the connecting portions Jo and it is possible to suppress a reduction in the durability. In this configuration, due to being able to effectively distribute the force which is applied to the connecting portions Ji and the connecting portions Jo, it is possible to render the connecting portions Ji and the connecting portions Jo thick and it is possible to effectively reduce the fluctuation in the crushing of the surface of the roller 1.

Here, the meaning of the expression "joined in a perpendicular direction" includes a case in which the joining is at the perpendicular direction by a strict definition in which the joining is at a direction 90° with respect to the tangential lines of the inner circumferential portion 66 and the outer circumferential portion 68, and a case in which the joining is at an angle slightly deviated from 90° with respect to the tangential lines of the inner circumferential portion 66 and the outer circumferential portion 68. For example, meaning of the expression includes a case in which the joining is at a direction which is 90°±10° with respect to the tangential lines of the inner circumferential portion 66 and the outer circumferential portion 68.

The roller 1C of the third embodiment is not provided with the partition portion 3 and is an example of the roller 1 in which the connecting portions Ji and the connecting portions Jo are configured to be thick. Although the effect of reducing fluctuation of the crushing of the surface of the roller 1 is greater in the roller 1B of the second embodiment than the roller 1C of the third embodiment, it is possible to increase the durability of the connecting portions Ji and the connecting portions Jo of the roller 1C of the third embodiment more than in the roller 1B of the second embodiment.

Figure 47:
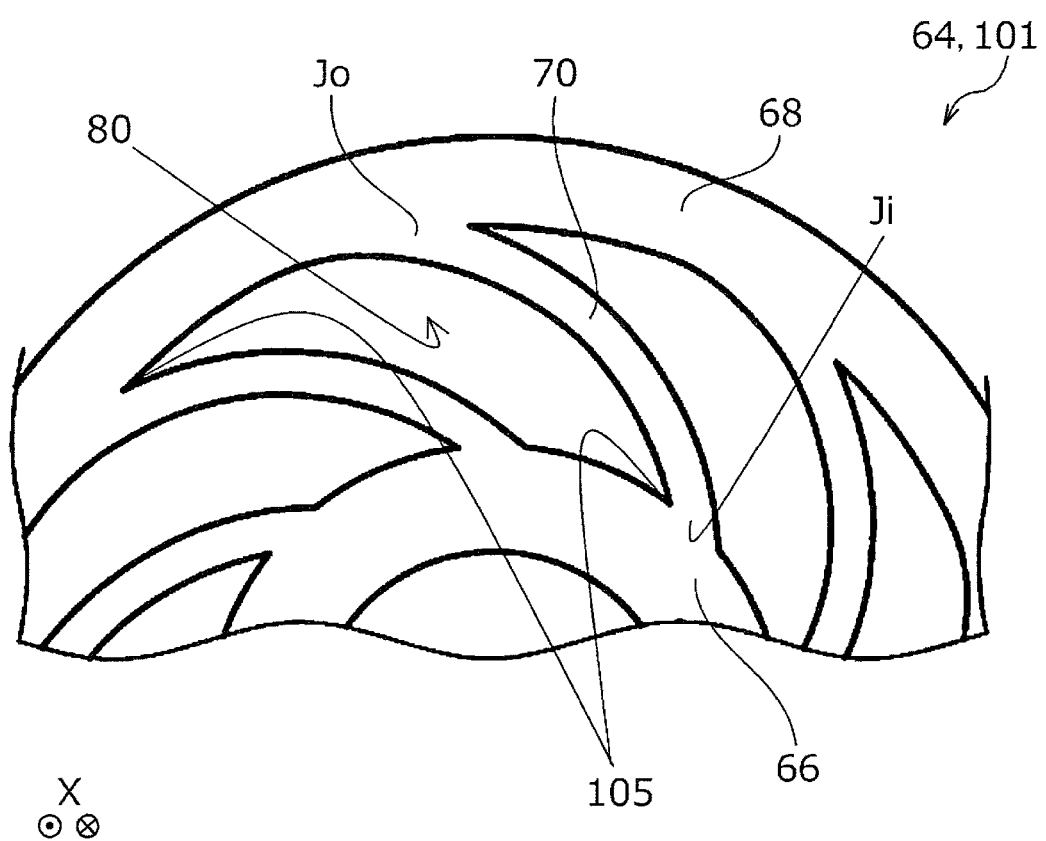
FIG. 47 is an enlarged side view illustrating a portion of a roller of a reference example.

Here, when comparing to the roller 101 of the reference example illustrated in FIG. 47, in the roller 101 of the reference example, a corner portion 105 of the space portion 80 in the connecting portion Ji and the connecting portion Jo is an acute angle. Therefore, for example, the structure of the mold used when manufacturing the elastic body portion 64 (the structure of the regions corresponding to the connecting portions Ji and the connecting portions Jo in particular) may not be simplified and the manufacturing of the roller 101 is complicated. Since the force which is applied to the connecting portions Ji and the connecting portions Jo may not be distributed, a reduction in the durability may not be suppressed. This is because, since the connecting portions Ji and the connecting portions Jo are joined so as to configure acute angles in the space portion 80, a force is concentrated on the corner portions 105 which configure the acute angles and breakage and the like based on the corner portions 105 occurs easily.

It is possible to express the roller 1C of the third embodiment as a configuration in which the tips of the corner portions 105 are rounded shapes with respect to the roller 101 of the reference example.

Figure 8:
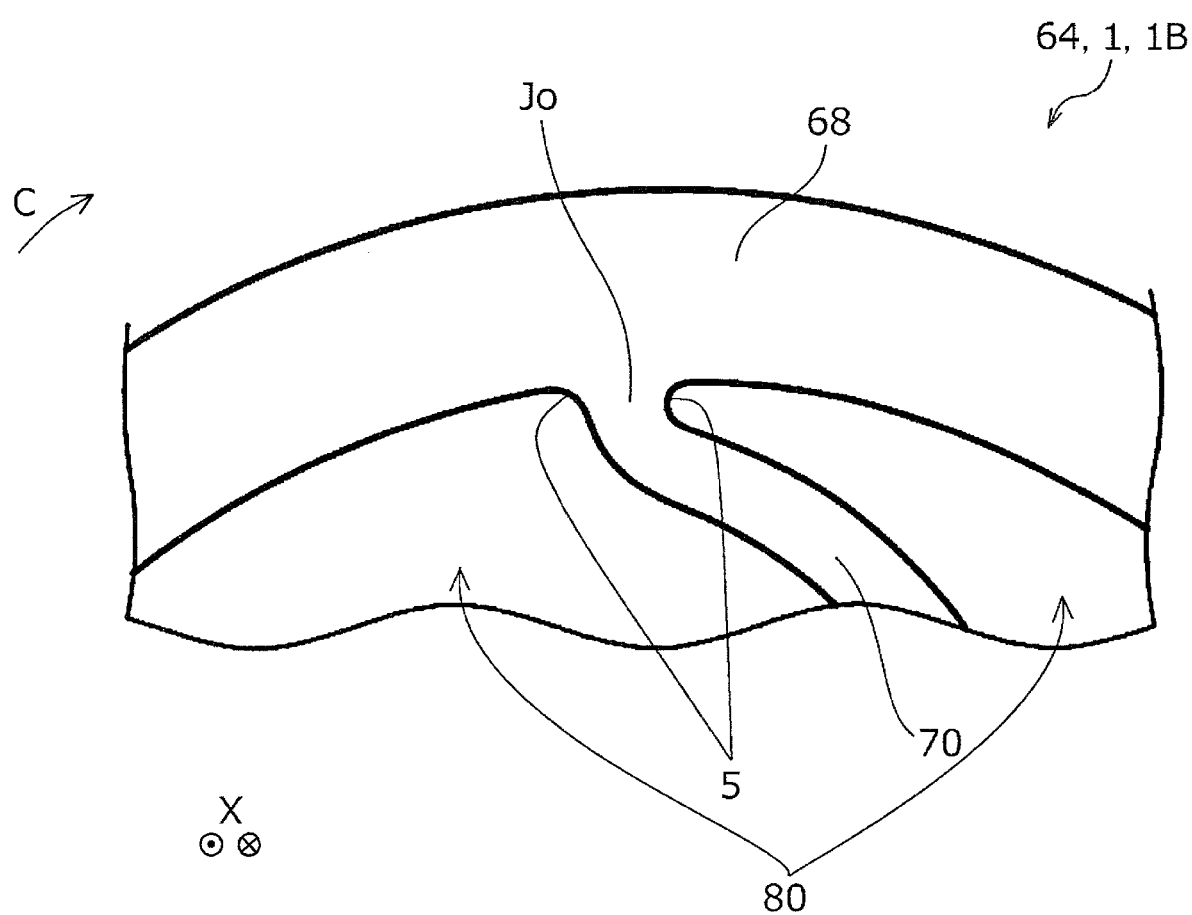
FIG. 8 is an enlarged side view illustrating a portion (the elastic body portion) of the roller according to the second embodiment of the invention.
Figure 9:
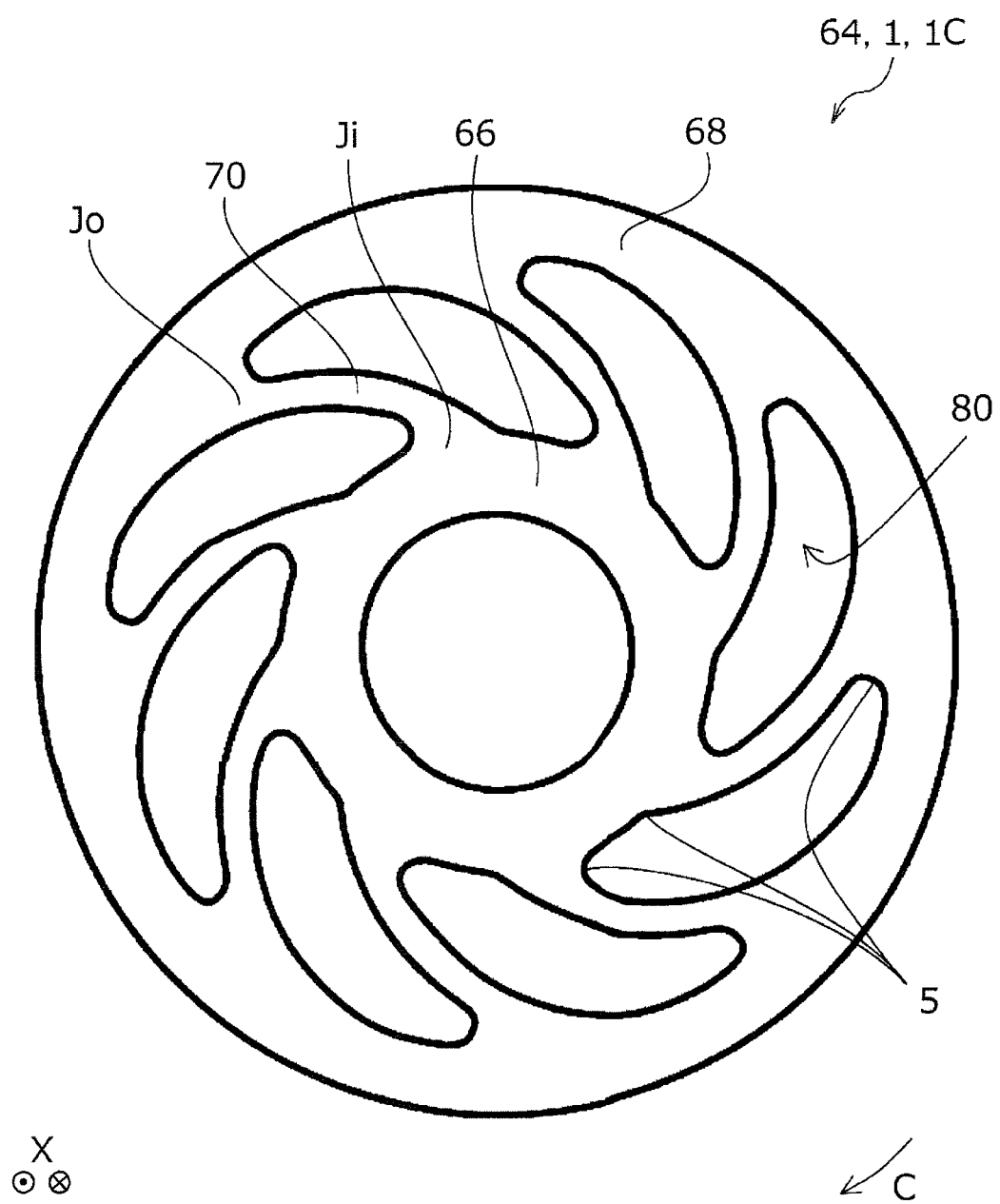
FIG. 9 is a side view illustrating a portion (an elastic body portion) of a roller according to a third embodiment of the invention.
Figure 10:
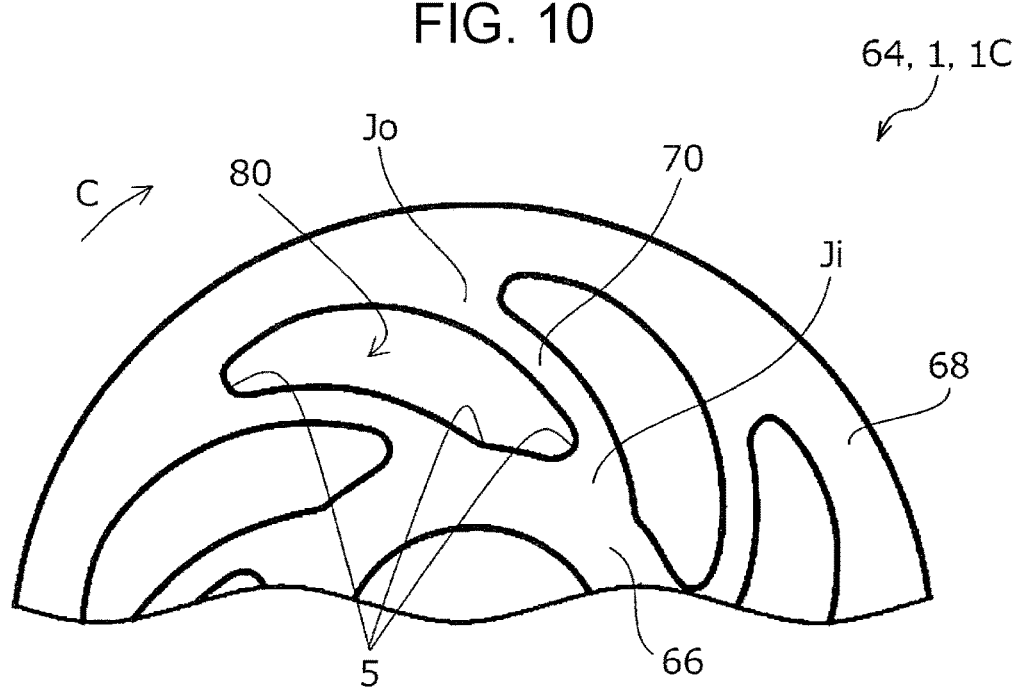
FIG. 10 is an enlarged side view illustrating a portion (the elastic body portion) of the roller according to the third embodiment of the invention.
Figure 11:
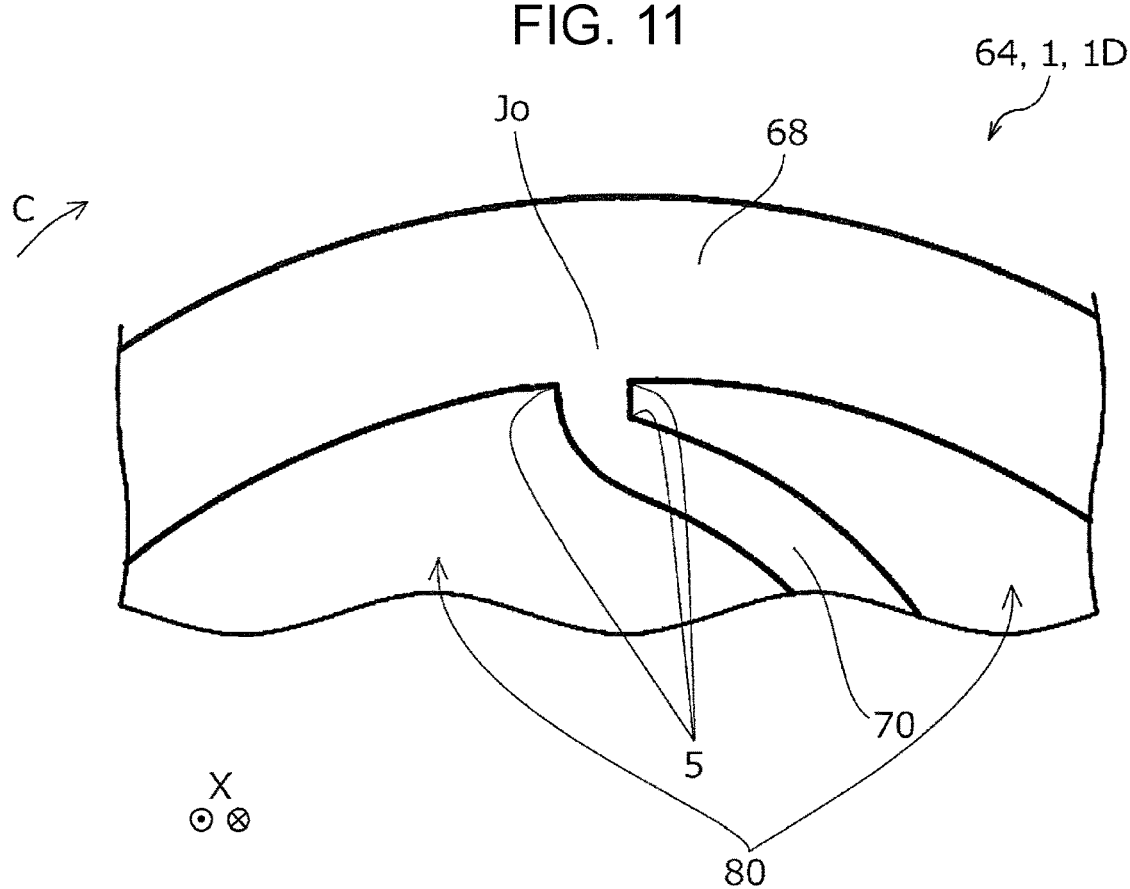
FIG. 11 is an enlarged side view illustrating a portion (an elastic body portion) of a roller according to a fourth embodiment of the invention.

Although also applicable to the roller 1A of the first embodiment, the roller 1B of the second embodiment is configured such that all of the corner portions 5 are rounded shapes as illustrated in FIG. 8 and the like. However, a configuration may be adopted in which the corner portions 5 are not rounded shapes but are right angles or obtuse angles as in the roller 1D of the fourth embodiment illustrated in FIG. 11. In the same manner as the roller 1B of the second embodiment, the roller 1D of the fourth embodiment is configured such that the joining portion 70 is joined to the inner circumferential portion 66 and the outer circumferential portion 68 in a perpendicular direction to the tangential lines of the inner circumferential portion 66 and the outer circumferential portion 68.

Figure 7:
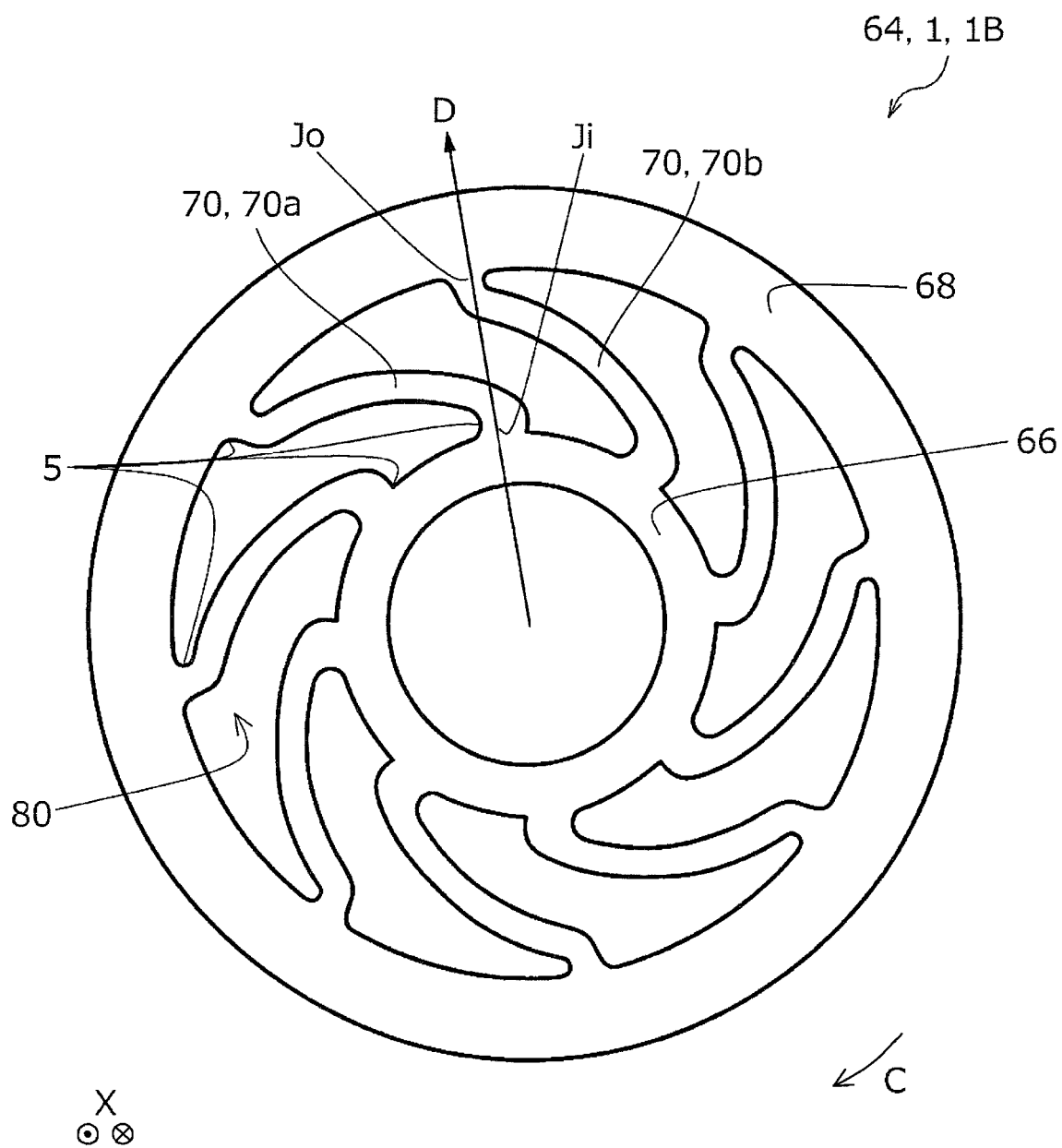
FIG. 7 is a side view illustrating a portion (an elastic body portion) of a roller according to a second embodiment of the invention.

Although the same applies to the roller 1A of the first embodiment and the roller 1D of the fourth embodiment, in the roller 1B of the second embodiment, the connecting portion Ji of one joining portion 70 and the connecting portion Jo of the joining portion 70 which is adjacent to the one joining portion 70 are provided on the same straight line which extends in the radial direction D of the roller 1. Expressed in other terms, as illustrated in FIG. 7, the connecting portion Ji between a first joining portion 70a of the joining portions 70 and the inner circumferential portion 66 and the connecting portion Jo between a second joining portion 70b, which is adjacent to the first joining portion 70a, of the joining portions 70 and the outer circumferential portion 68 are provided on the same straight line which extends in the radial direction D of the roller 1. By adopting such a configuration, it is possible to maintain the strength of the joining portions 70 while suppressing an increase in the volume of the joining portions 70 (such an increase leads to the roller 1 becoming difficult to crush and a reduction in the transporting capability) and it is possible to suppress the roller 1 becoming difficult to crush and the transporting capability being reduced.

A description will be given of the mechanism by which the roller 1 becomes difficult to crush and it is possible to suppress a reduction in the transporting capability by adopting such a configuration.

Figure 12:
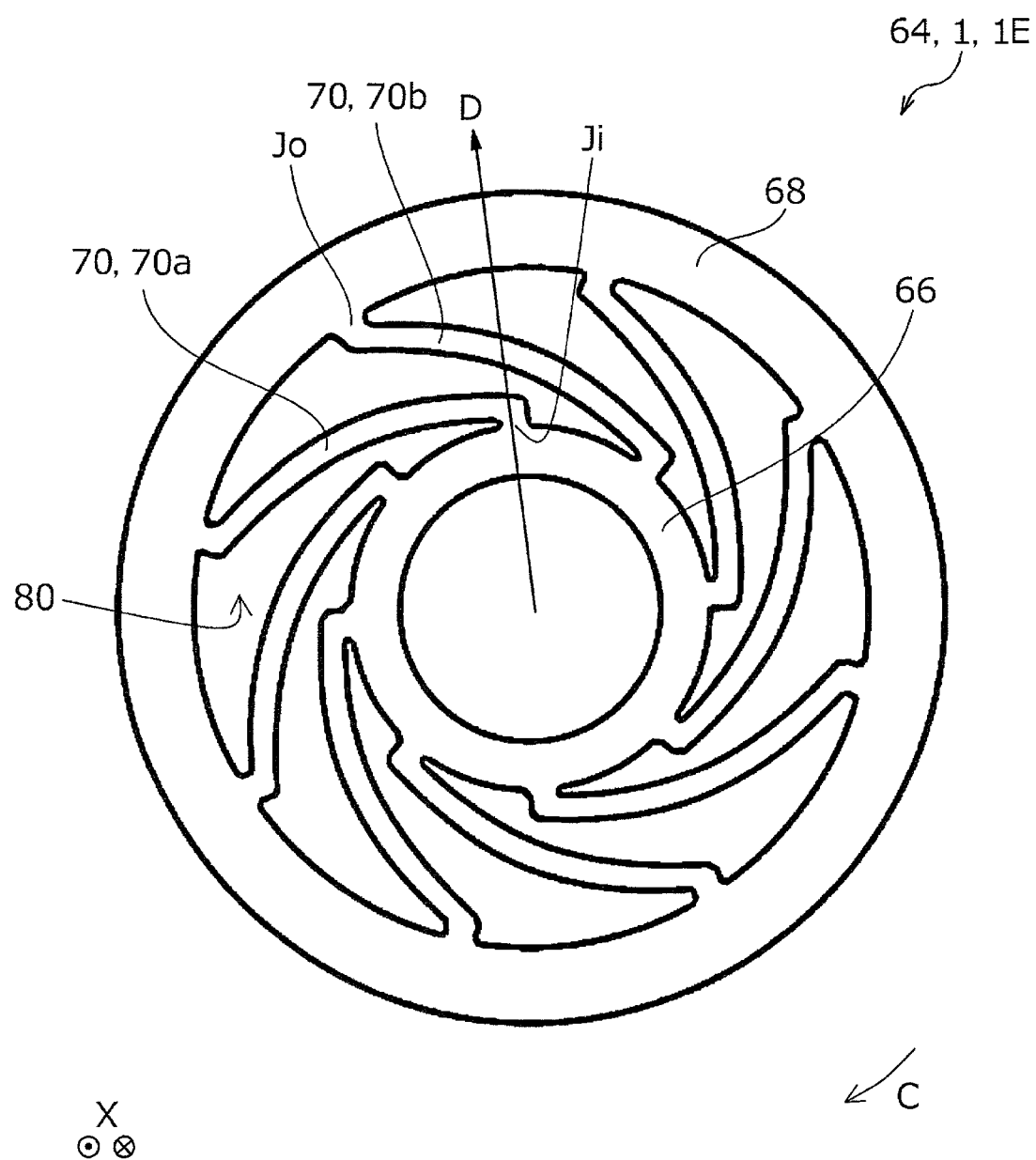
FIG. 12 is a side view illustrating a portion (an elastic body portion) of a roller according to a fifth embodiment of the invention.
Figure 13:
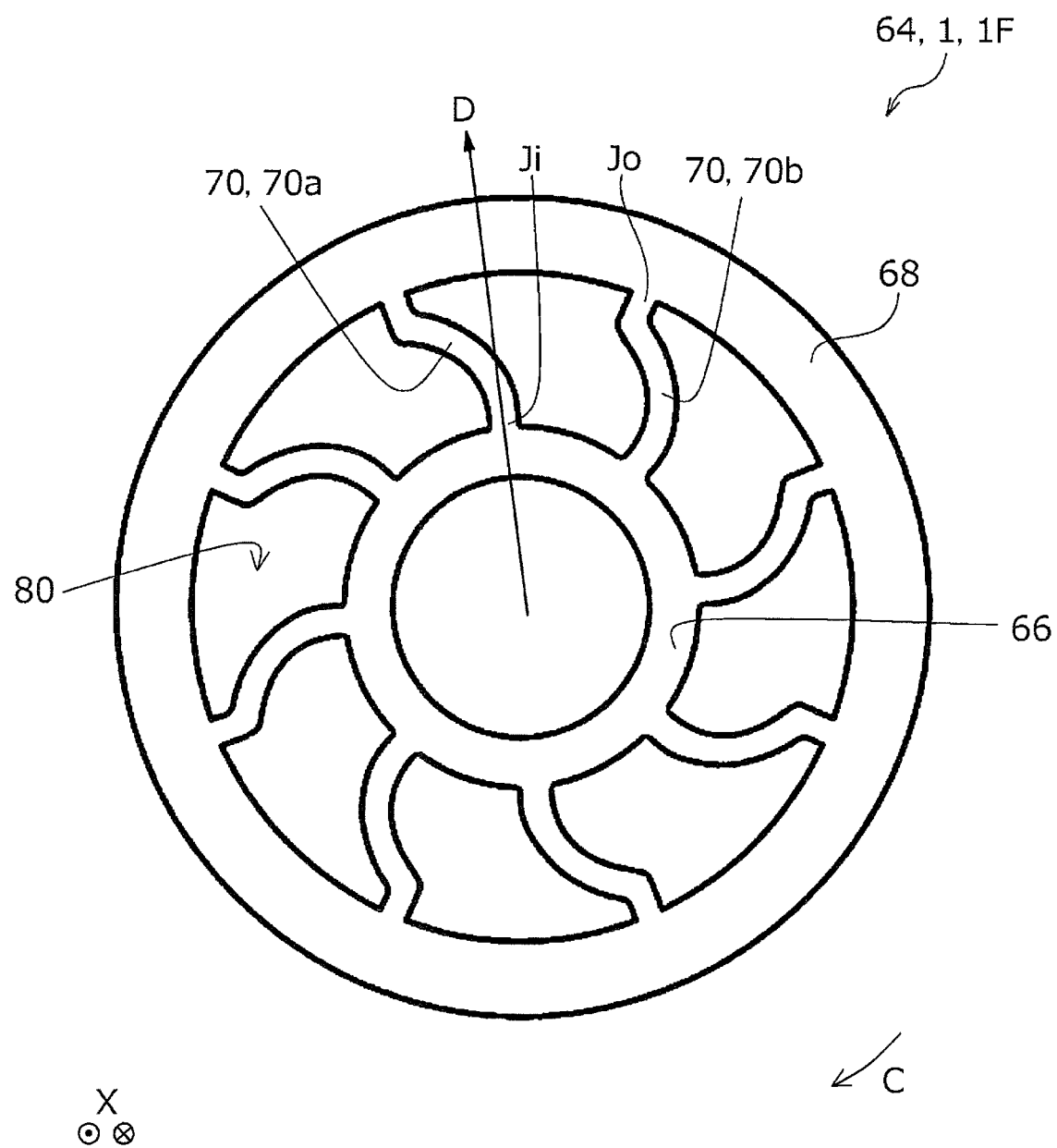
FIG. 13 is a side view illustrating a portion (an elastic body portion) of a roller according to a sixth embodiment of the invention.
Figure 14:
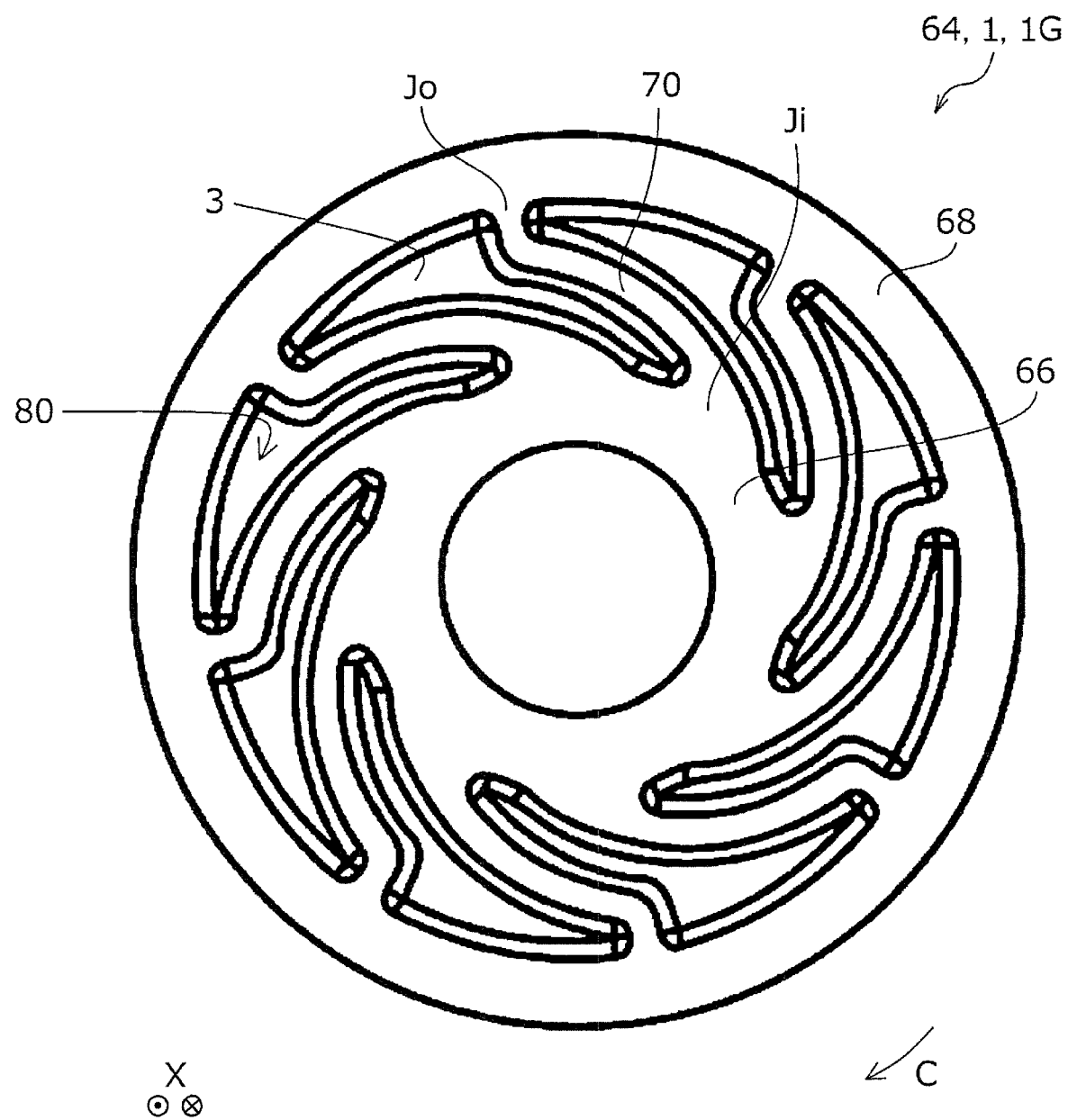
FIG. 14 is a side view illustrating a portion (an elastic body portion) of a roller according to a seventh embodiment of the invention.
Figure 15:
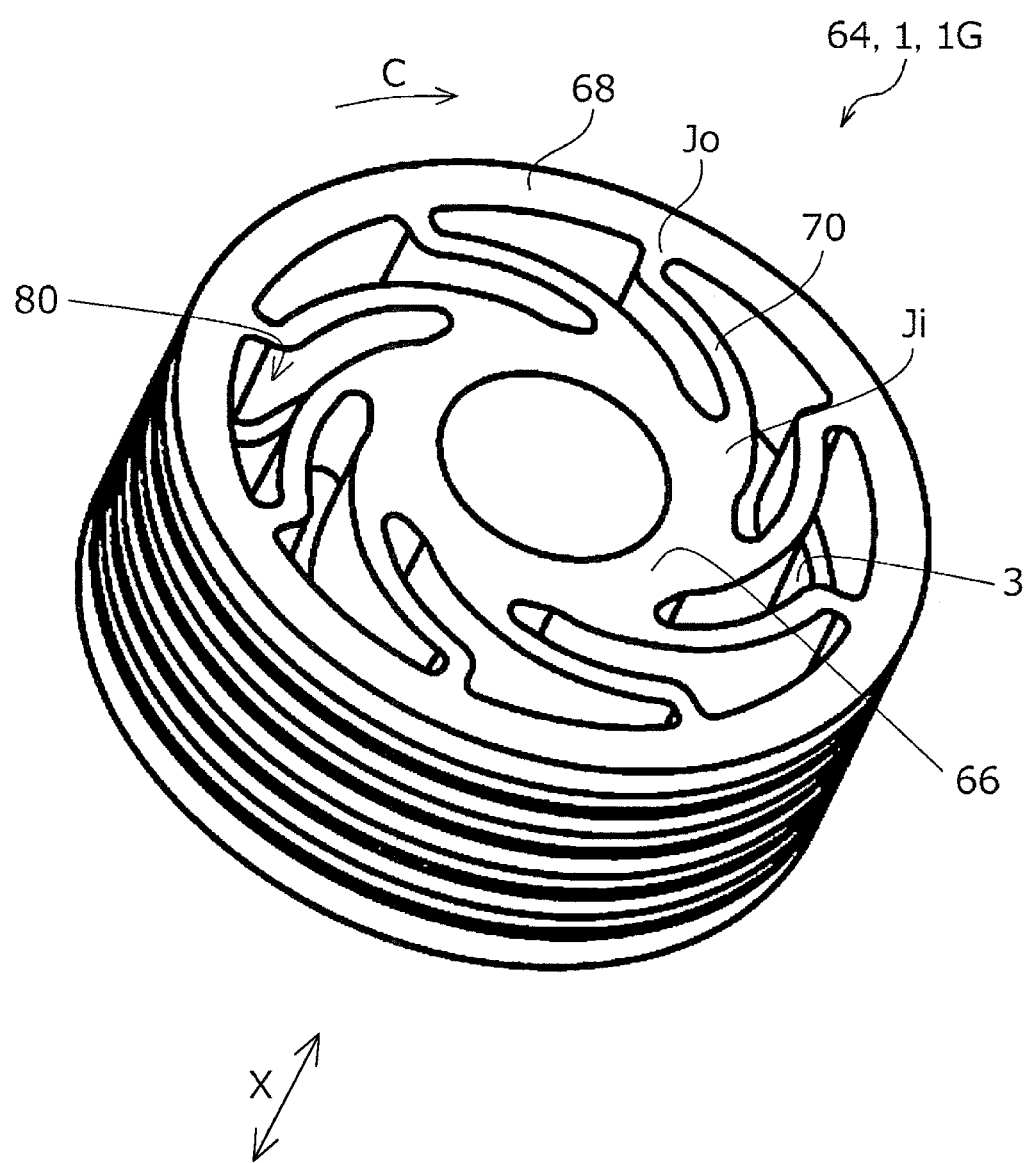
FIG. 15 is a perspective view illustrating a portion (the elastic body portion) of the roller according to the seventh embodiment of the invention.
Figure 16:
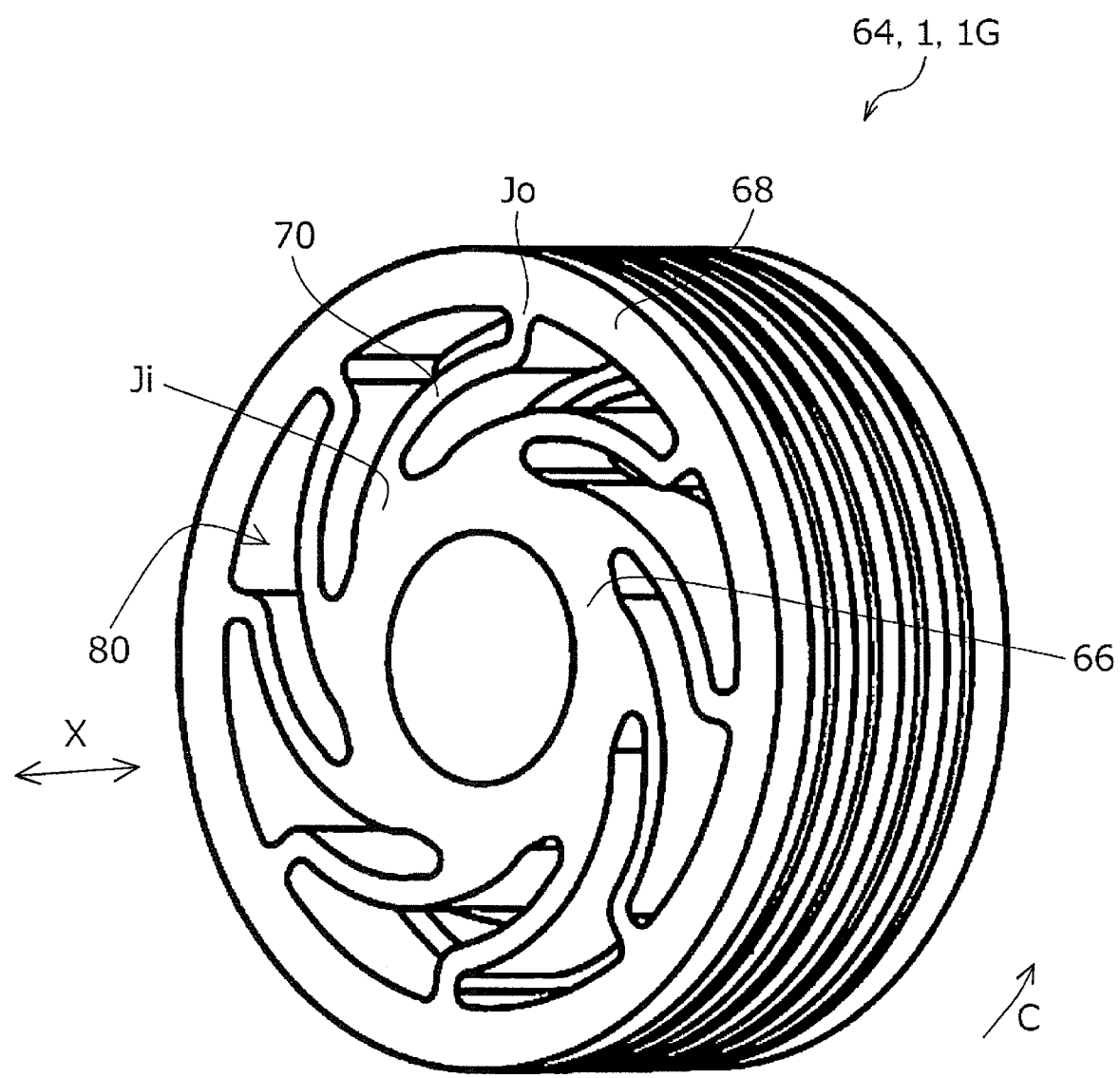
FIG. 16 is a perspective view illustrating a portion (the elastic body portion) of the roller according to the seventh embodiment of the invention.
Figure 17:
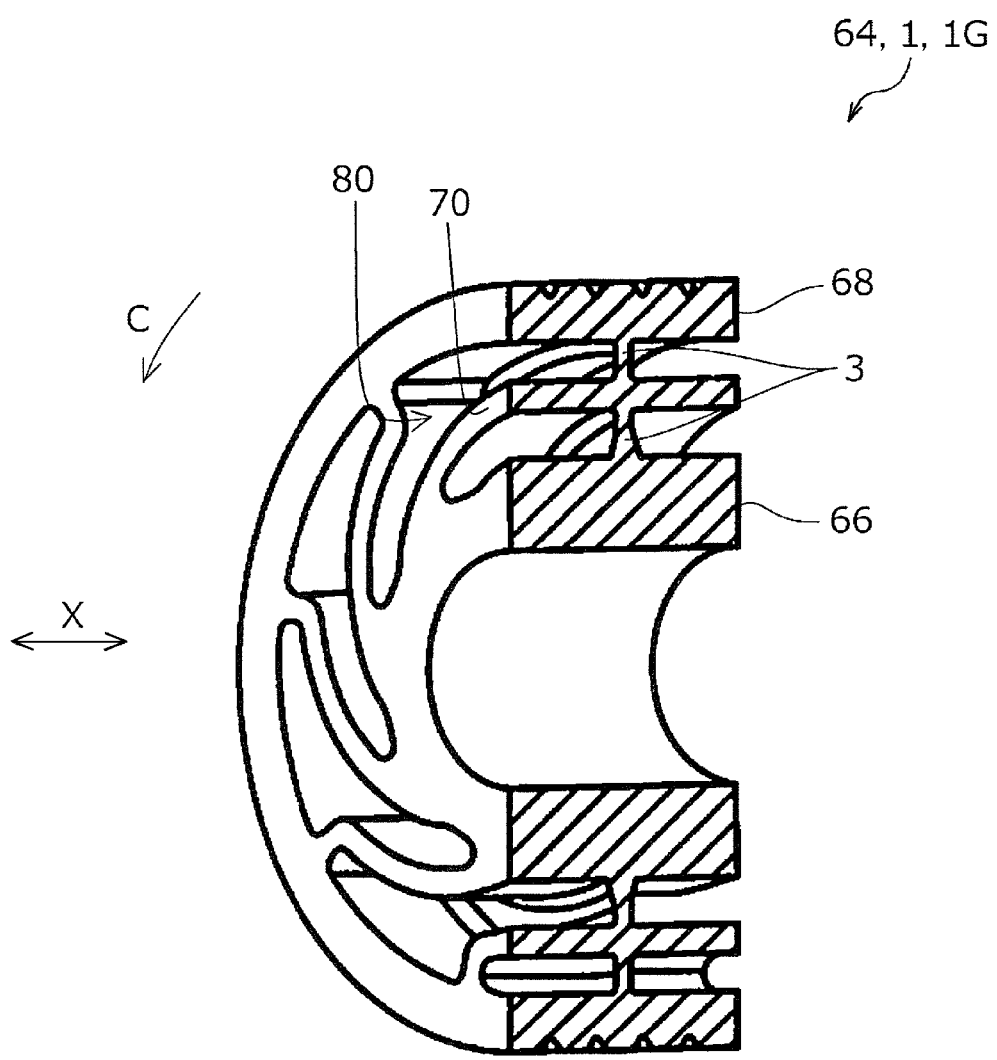
FIG. 17 is a sectional diagram illustrating a portion (the elastic body portion) of the roller according to the seventh embodiment of the invention.

Here, in the roller 1E of the fifth embodiment illustrated in FIG. 12 and the roller 1F of the sixth embodiment illustrated in FIG. 13, the connecting portion Ji of one joining portion 70 and the connecting portion Jo of the joining portion 70 which is adjacent to the one joining portion 70 are not provided on the same straight line which extends in the radial direction D of the roller 1.

In a case in which the joining portions 70 are configured to have a smaller angle than an appropriate angle with respect to the rotation direction C as in the roller 1E of the fifth embodiment illustrated in FIG. 12, the occupation volume of the joining portions 70 is increased in order to maintain the strength of the elastic body portion 64, the roller 1 becomes difficult to crush, and the transporting capability is reduced.

Meanwhile, in a case in which the joining portions 70 are configured to have a greater angle than an appropriate angle (are standing) with respect to the rotation direction C as in the roller 1F of the sixth embodiment illustrated in FIG. 13, the force which is applied between the inner circumferential portion 66 and the outer circumferential portion 68 by the joining portions 70 is increased, the roller 1 becomes difficult to crush, and the transporting capability is reduced.

Therefore, as in the roller 1B of the second embodiment, a configuration in which the joining portions 70 have an appropriate angle with respect to the rotation direction C due to the connecting portions Ji and the connecting portions Jo of the adjacent joining portions 70 being provided on the same straight line which extends in the radial direction D of the roller 1 is favorable. However, configurations such as that of the roller 1E of the fifth embodiment and configurations such as that of the roller 1F of the sixth embodiment are included in the invention.

Next, a description will be given of the roller 1 (a roller 1G) of the seventh embodiment using FIGS. 14 to 17, the roller 1 (a roller 1H) of the eighth embodiment using FIG. 18, the roller 1 (a roller 1I) of the ninth embodiment using FIG. 19, the roller 1 (a roller 1J) of the tenth embodiment using FIG. 20, the roller 1 (a roller 1K) of the eleventh embodiment using FIG. 21, the roller 1 (a roller 1L) of the twelfth embodiment using FIG. 22, and the roller 1 (a roller 1M) of the thirteenth embodiment using FIG. 23.

As illustrated in FIGS. 14 to 17, in the roller 1G of the seventh embodiment, although the connecting portions Jo between the joining portions 70 and the outer circumferential portion 68 have the same configuration as those in the roller 1A of the first embodiment, the connecting portions Ji between the joining portions 70 and the inner circumferential portion 66 are configured to be thick. In the roller 1G of the seventh embodiment, the configuration other than that of the connecting portions Ji is the same configuration as in the roller 1A of the first embodiment.

Figure 18:
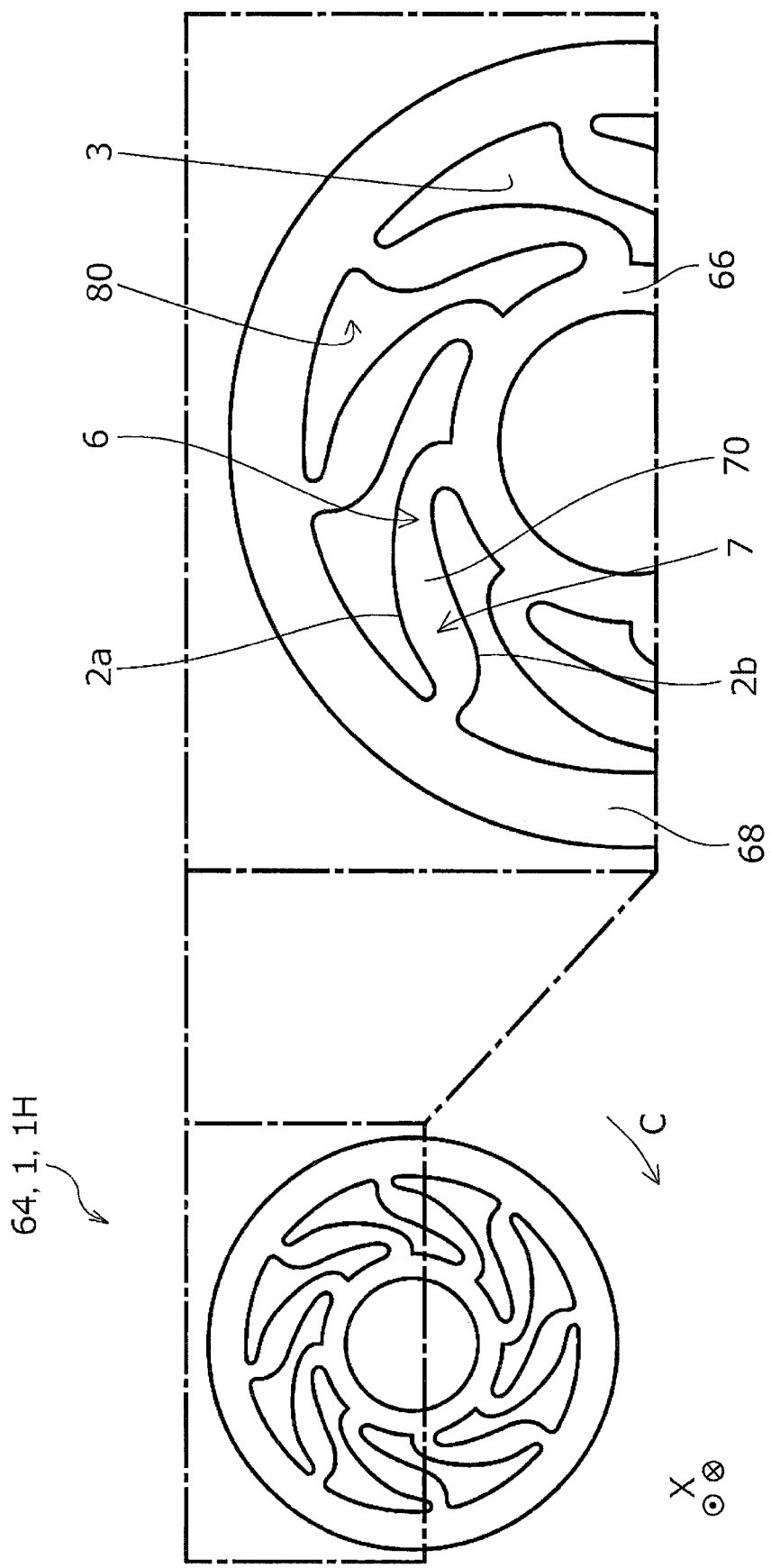
FIG. 18 is a side view and a partial enlarged view illustrating a portion (an elastic body portion) of a roller according to an eighth embodiment of the invention.

As illustrated in FIG. 18, the roller 1H of the eighth embodiment includes a portion 6 in which an end portion (for example, the end portion 2a) of the joining portion 70 on one side of the space portion 80 and an end portion (for example, the end portion 2b) of the joining portion 70 on the other side of the space portion 80 are rounded to the same direction side, and a portion 7 in which the two end portions are not rounded to the same direction side. In other words, instead of the entirety of the joining portion 70 having a curved shape, a portion (the portion 6) of the joining portion 70 has a curved shape. In this manner, a configuration may be adopted in which only a portion of the joining portion 70 has a curved shape and the shape of the portions which do not have a curved shape is not particularly limited.

Figure 19:
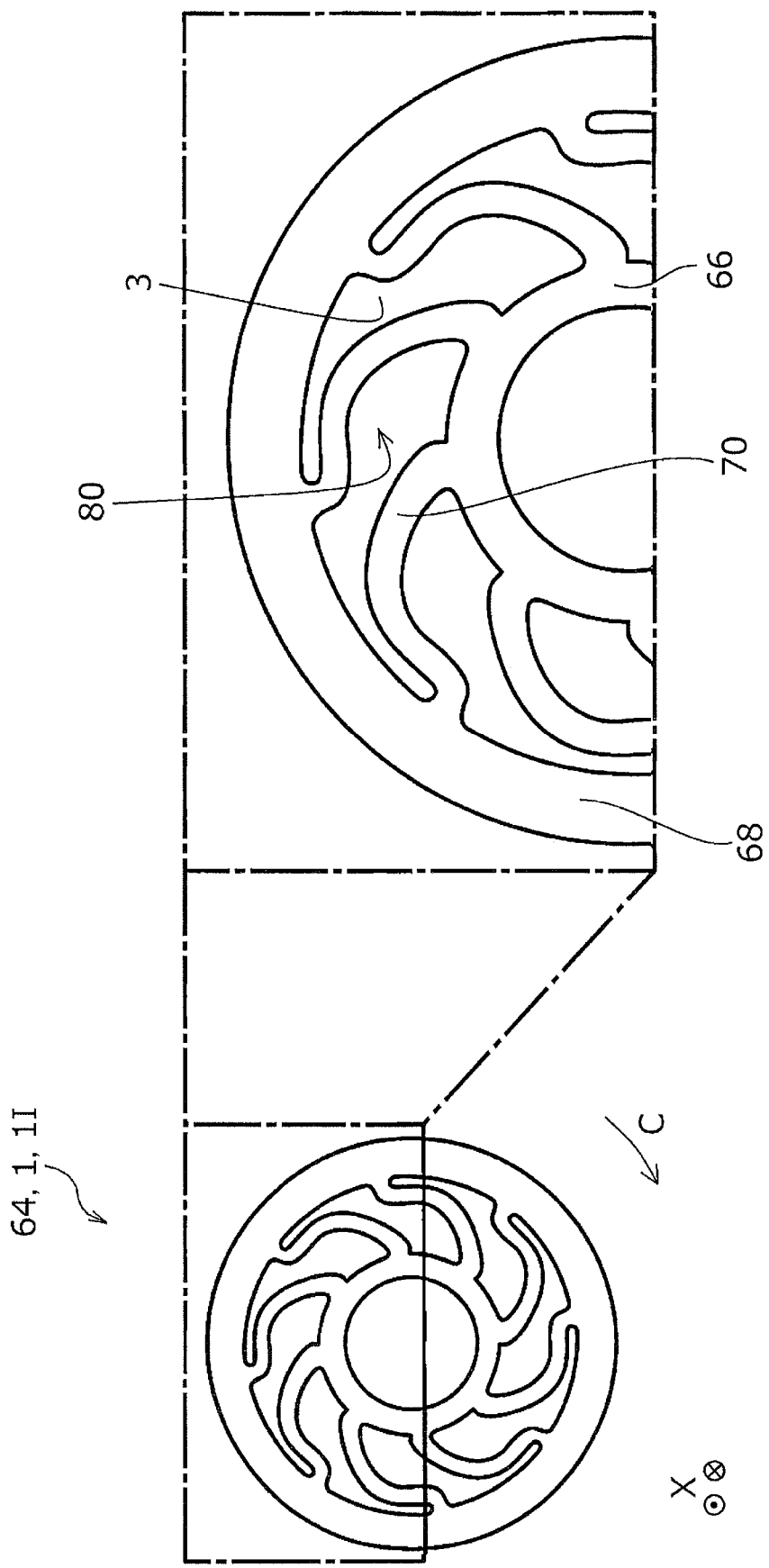
FIG. 19 is a side view and a partial enlarged view illustrating a portion (an elastic body portion) of a roller according to a ninth embodiment of the invention.
Figure 20:
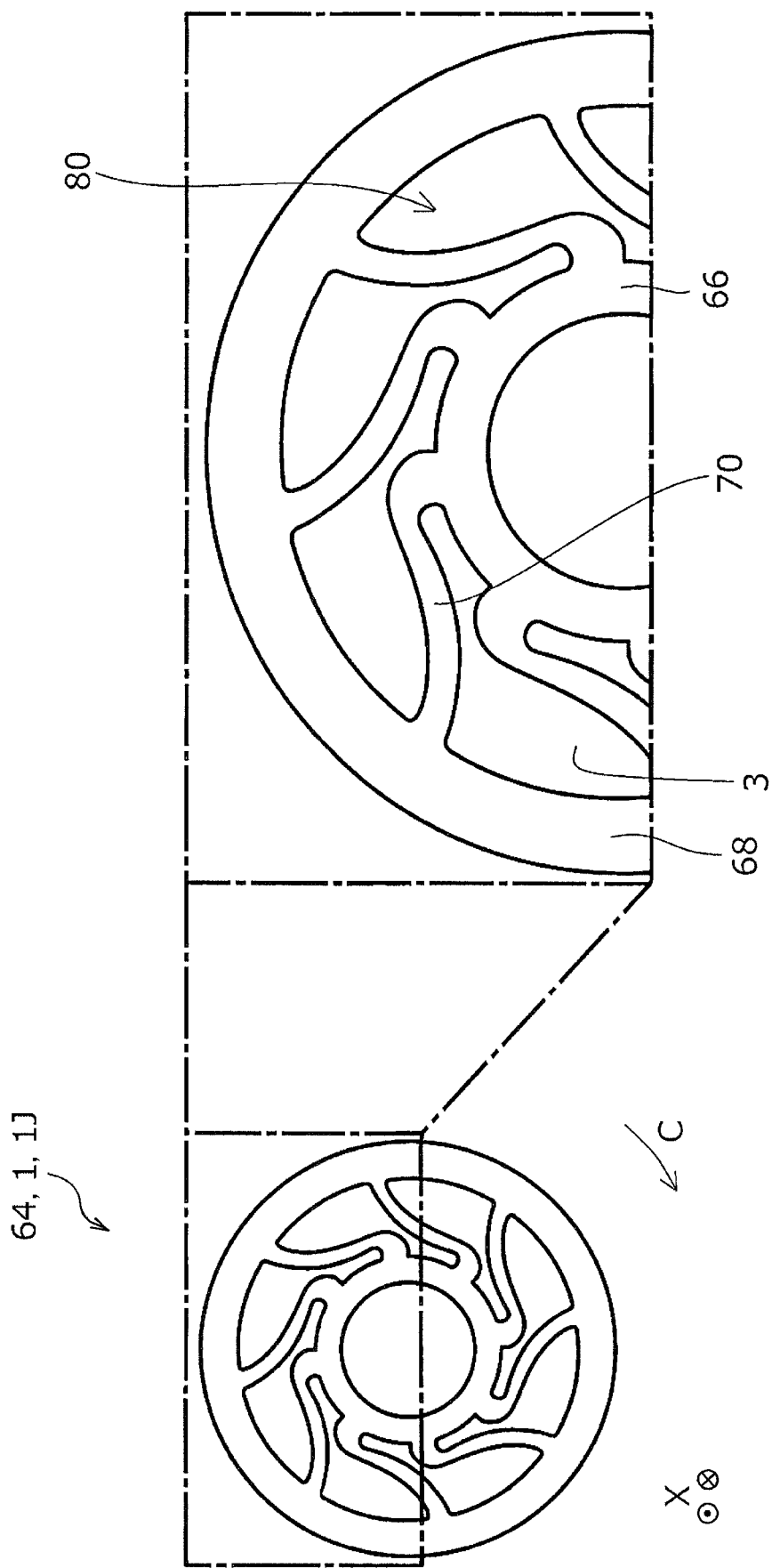
FIG. 20 is a side view and a partial enlarged view illustrating a portion (an elastic body portion) of a roller according to a tenth embodiment of the invention.

As in the roller 1I of the ninth embodiment illustrated in FIG. 19 and the roller 1J of the tenth embodiment illustrated in FIG. 20, the curved shape of the joining portions 70 may be configured to have a different rounding degree and a different rounding orientation from those of the roller 1A of the first embodiment. In other words, the rounding degree and the rounding orientation in the curved shape of the joining portions 70 are not particularly limited.

Figure 21:
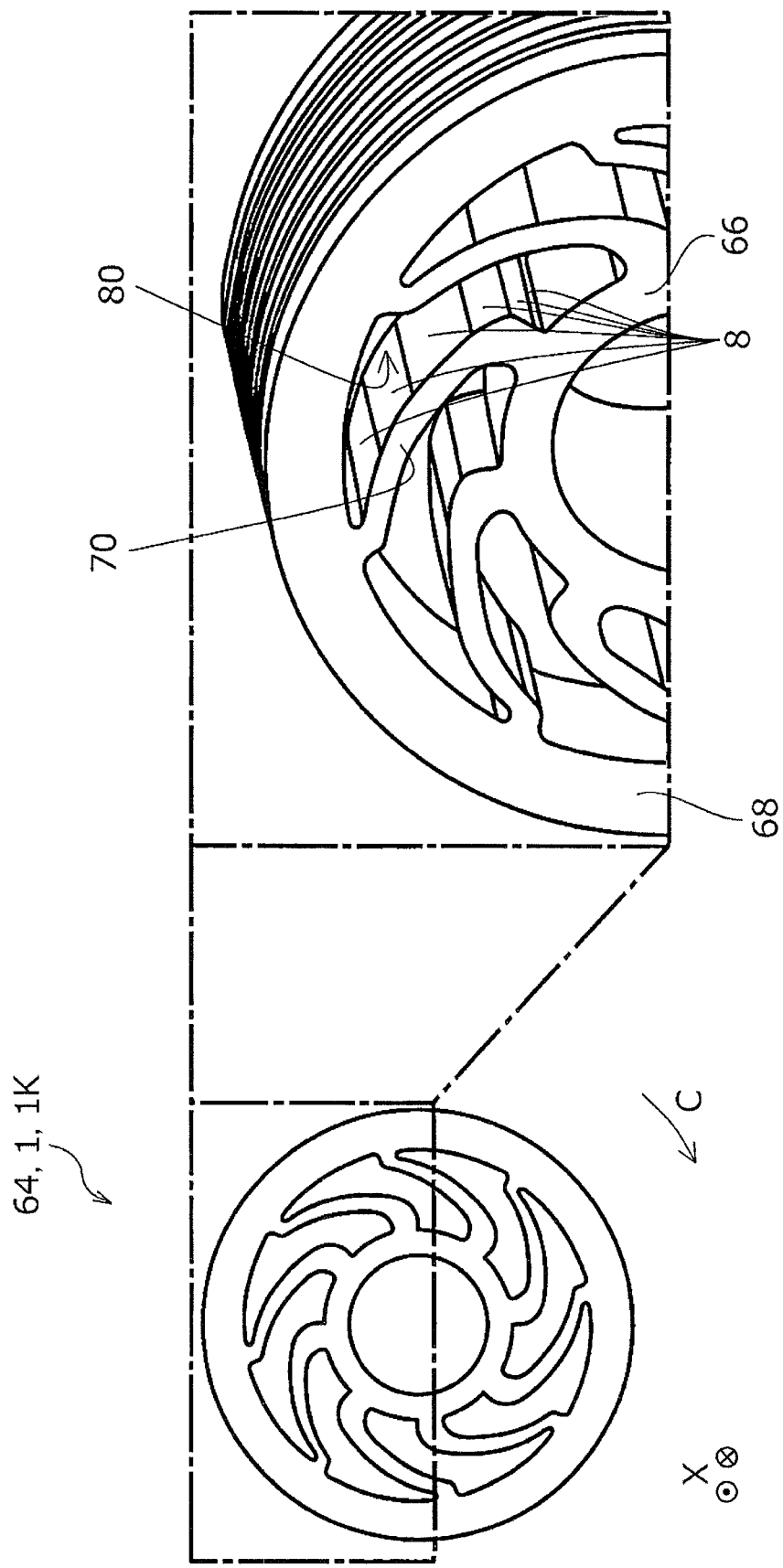
FIG. 21 is a side view and a partial enlarged view illustrating a portion (an elastic body portion) of a roller according to an eleventh embodiment of the invention.

As in the roller 1K of the eleventh embodiment illustrated in FIG. 21, the curved shape of the joining portions 70 may be pseudo-rounded by combining a plurality of flat surfaces 8 instead of being configured by a smooth curved surface.

Figure 22:
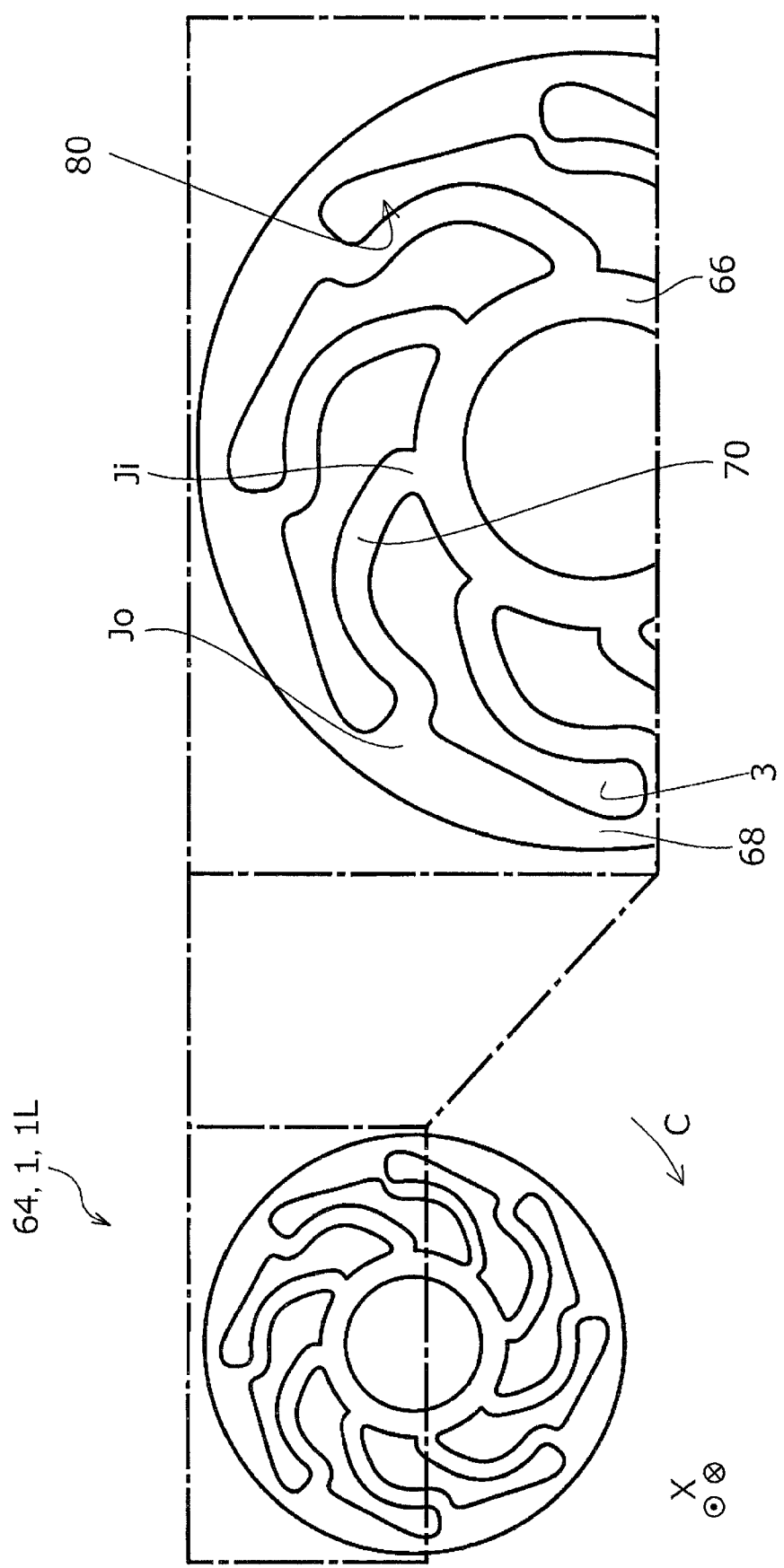
FIG. 22 is a side view and a partial enlarged view illustrating a portion (an elastic body portion) of a roller according to a twelfth embodiment of the invention.

As in the roller 1L of the twelfth embodiment illustrated in FIG. 22, conversely as compared to the roller 1G of the seventh embodiment, a configuration may be adopted in which the connecting portions Jo between the joining portions 70 and the outer circumferential portion 68 are rendered thick instead of the connecting portions Ji between the joining portions 70 and the inner circumferential portion 66.

There are no particular limitations to the shape of the thick portions and the like or the configuration of the connecting portions Ji and the connecting portions Jo such as a case in which the connecting portions Ji and the connecting portions Jo are rendered thick.

Figure 23:
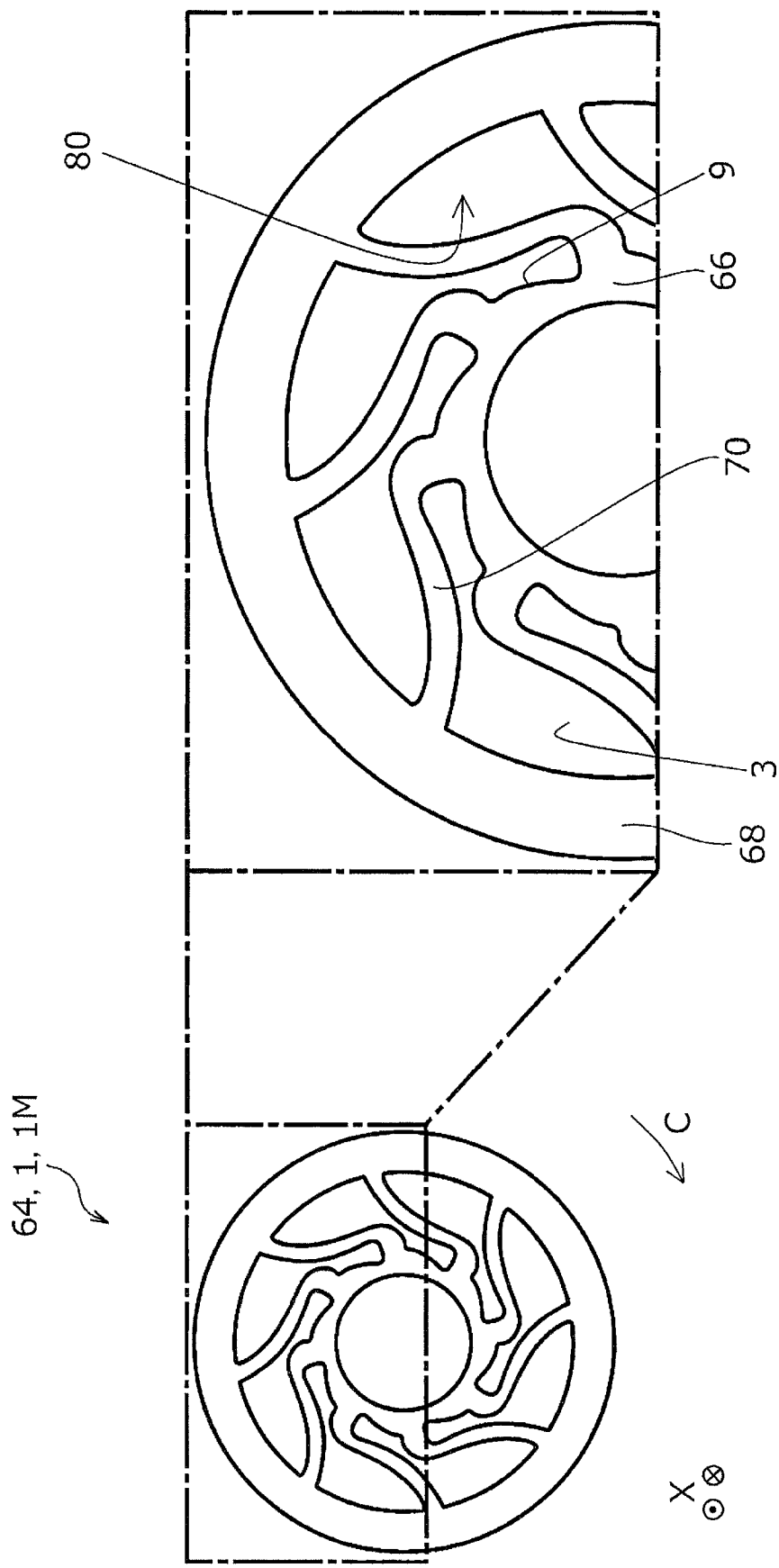
FIG. 23 is a side view and a partial enlarged view illustrating a portion (an elastic body portion) of a roller according to a thirteenth embodiment of the invention.

The configuration of the inner circumferential portion 66 and the configuration of the outer circumferential portion 68 are not particularly limited such as a configuration in which an uneven portion 9 is provided on the inner circumferential portion 66 as in the roller 1M of the thirteenth embodiment illustrated in FIG. 23.

Next, a description will be given of a holder 11 which holds the elastic body portion 64 which is used in the roller 1 of the first embodiment to the thirteenth embodiment by the shaft 62 using FIG. 24.

Figure 24:
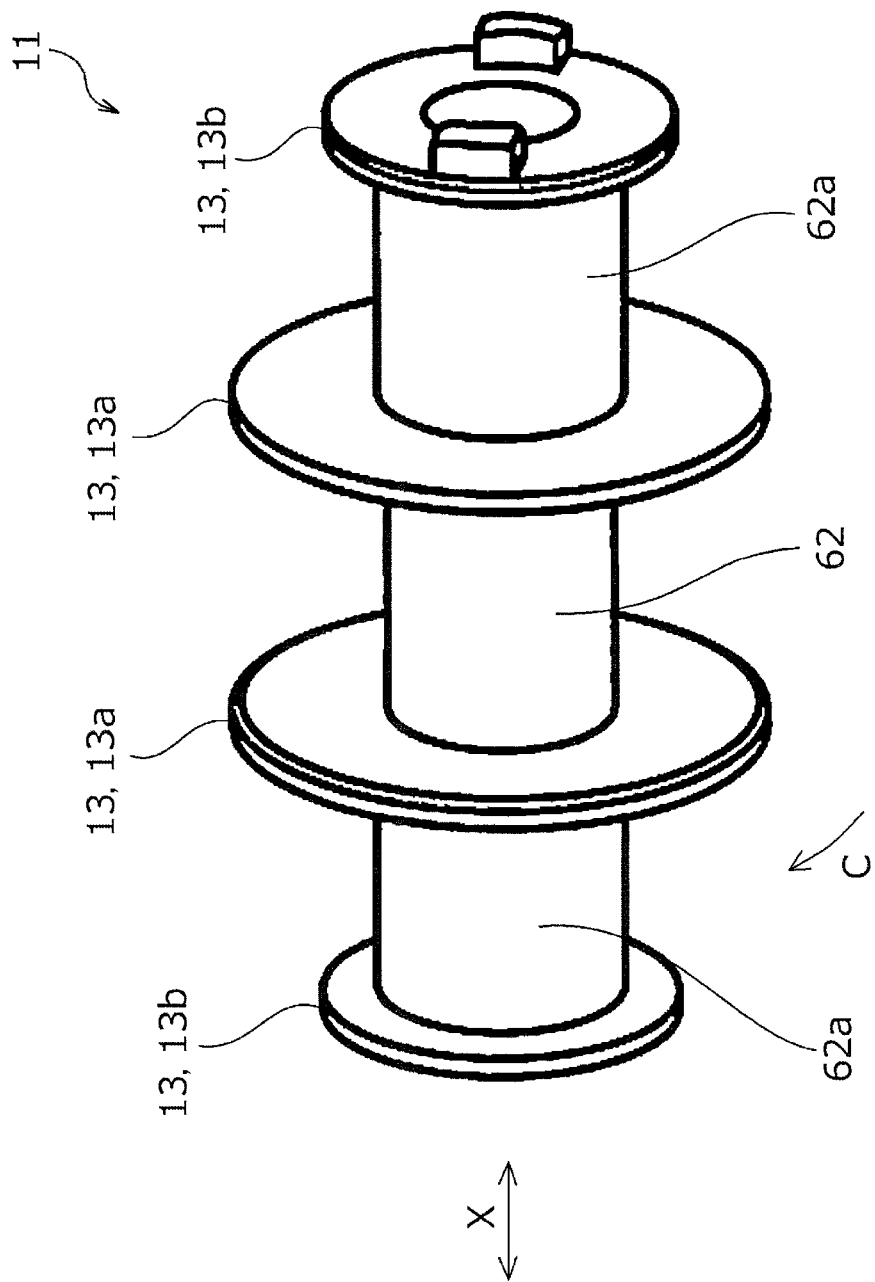
FIG. 24 is a perspective view illustrating a portion (a holder) of the roller according to any one of the first to thirteenth embodiments of the invention.

As illustrated in FIG. 24, the holder 11 includes the shaft 62 and flanges 13. In detail, two inside flanges 13a are provided on the inside of the shaft 62 in a direction going along the apparatus width direction X, and two outside flanges 13b are provided on the outside of the shaft 62 in a direction going along the apparatus width direction X. In the shaft 62, positions (two locations) between the inside flanges 13a and the outside flanges 13b are attachment positions 62a of the elastic body portion 64.

However, the configuration of the holder 11 is not limited to such a configuration. For example, the holder 11 may be provided with a positioning unit such that the elastic body portion 64 which is attached to the shaft 62 does not move in the rotation direction C.

In a configuration such as that of the roller 1 which uses the holder 11 illustrated in FIG. 24, there is a case in which a plurality of the elastic body portions 64 are attached to the holder 11. In such a configuration, there is a case in which there is a demand to determine the phase (the disposition) of each of the plurality of elastic body portions 64 which are attached to the holder 11 in the rotation direction C. This is because, there is a case in which the degree of crushing of the elastic body portions 64 fluctuates due to the phase (the disposition) of the elastic body portions 64 with respect to the shaft 62 and it is possible to reduce the fluctuation by determining the dispositions (aligning the phase) of the plurality of elastic body portions 64.

Therefore, a description will be given of a specific example of the roller 1 which is provided with positioning units 15 such that the elastic body portions 64 do not move in the rotation direction C with respect to the shaft 62.

A description will be given of the roller 1 (a roller 1N) of the fourteenth embodiment using FIGS. 25 to 28, the roller 1 (a roller 1O) of the fifteenth embodiment using FIG. 29, the roller 1 (a roller 1P) of the sixteenth embodiment using FIG. 30, the roller 1 (a roller 1Q) of the seventeenth embodiment using FIGS. 31 and 32, the roller 1 (a roller 1R) of the eighteenth embodiment using FIGS. 33 and 34, the roller (a roller 1S) of the nineteenth embodiment using FIGS. 35 and 36, the roller 1 (a roller 1T) of the twentieth embodiment using FIGS. 37 and 38, the roller 1 (a roller 1U) of the twenty-first embodiment using FIGS. 39 and 40, the roller 1 (a roller 1V) of the twenty-second embodiment using FIGS. 41 and 42, the roller 1 (a roller 1W) of the twenty-third embodiment using FIG. 43, the roller 1 (a roller 1X) of the twenty-fourth embodiment using FIG. 44, and the roller 1 (a roller 1Y) of the twenty-fifth embodiment using FIGS. 45 and 46.

Figure 25:
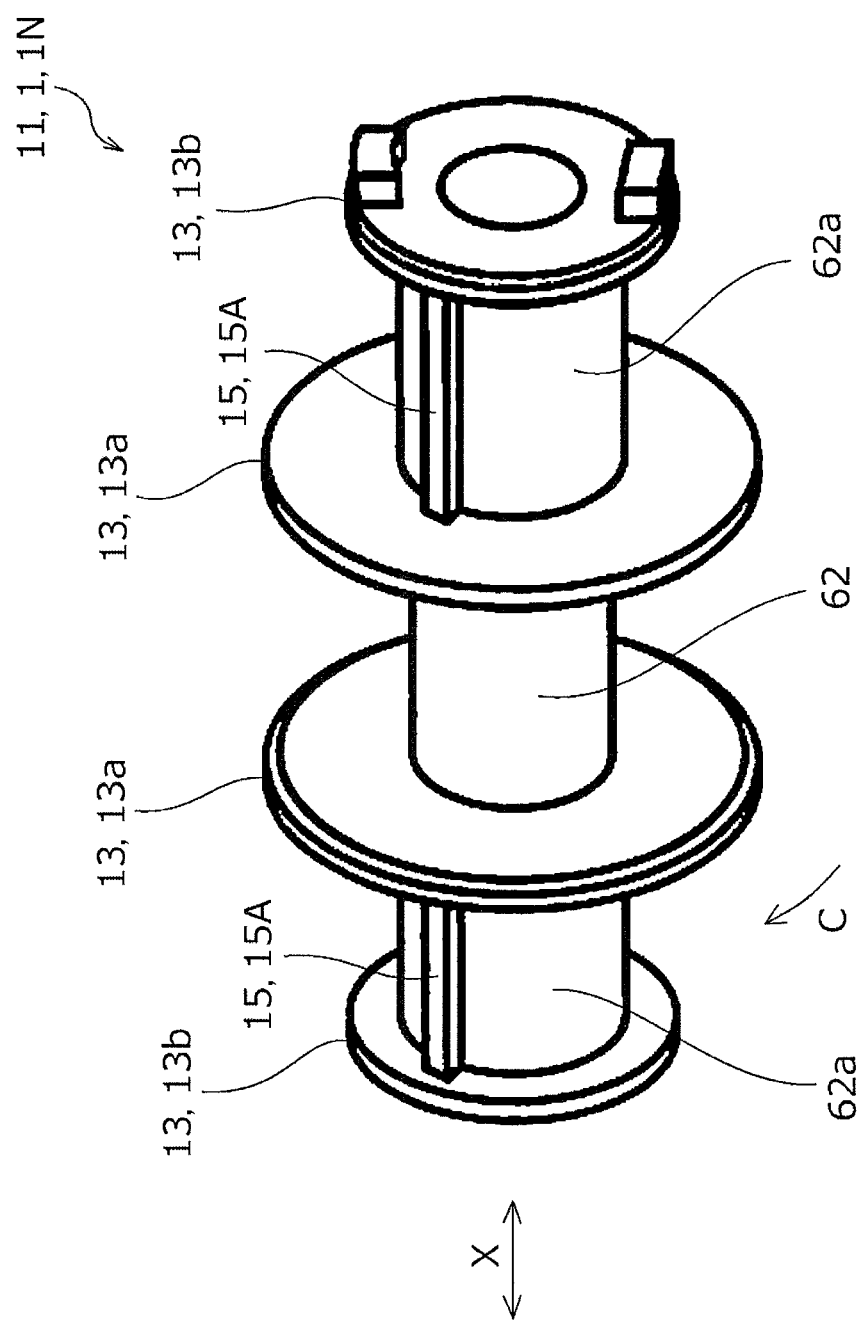
FIG. 25 is a perspective view illustrating a portion (a holder) of a roller according to a fourteenth embodiment of the invention.
Figure 26:
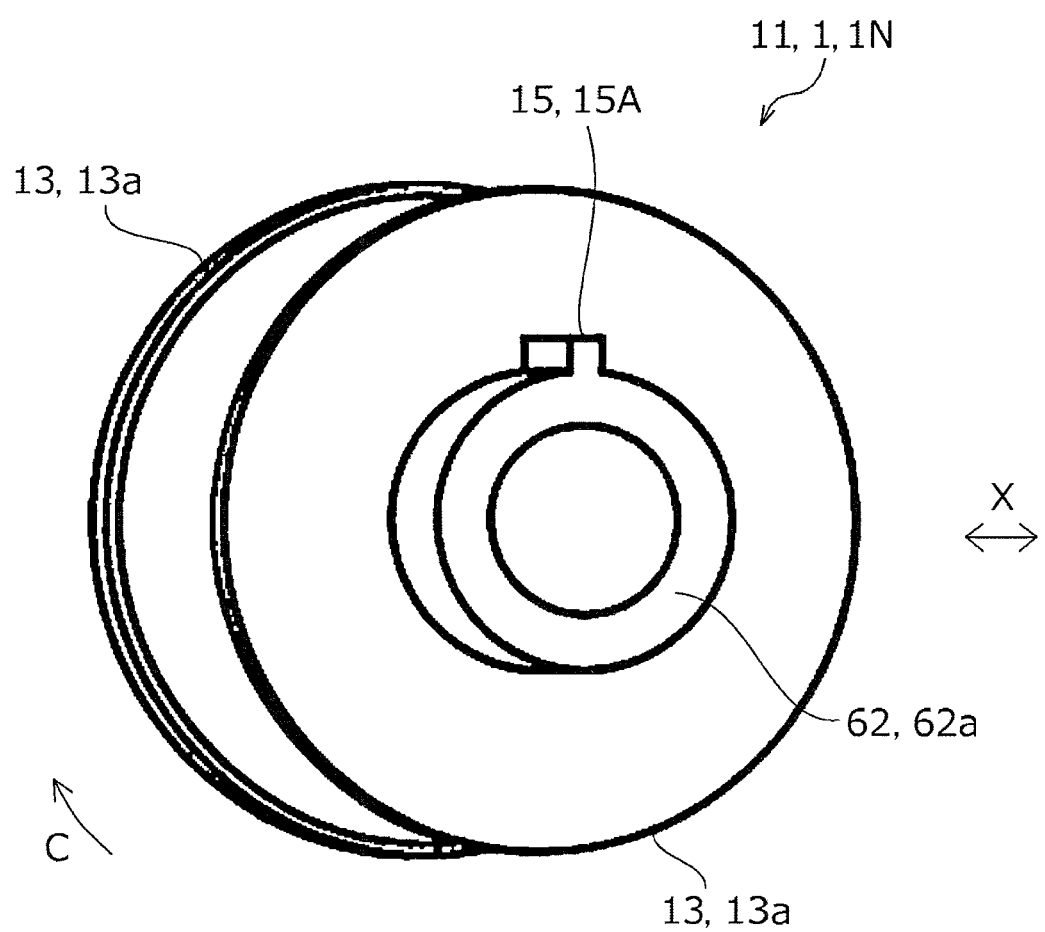
FIG. 26 is a perspective view illustrating a portion (the holder) of the roller according to the fourteenth embodiment of the invention.

As illustrated in FIGS. 25 and 26, in the roller 1N of the fourteenth embodiment, the positioning units 15 (convex-shaped positioning units 15A which run along the apparatus width direction X) are provided on the attachment positions 62a of the elastic body portions 64. In this manner, the positioning units 15 which determine the positions of the elastic body portions 64 with respect to the shaft 62 in the rotation direction C of the roller 1 are provided on the shaft 62 of the roller 1N of the fourteenth embodiment. Therefore, the configuration enables the determination of the positions of the elastic body portions 64 with respect to the shaft 62 in the rotation direction C of the roller 1 at suitable positions using the positioning units 15.

Figure 27:
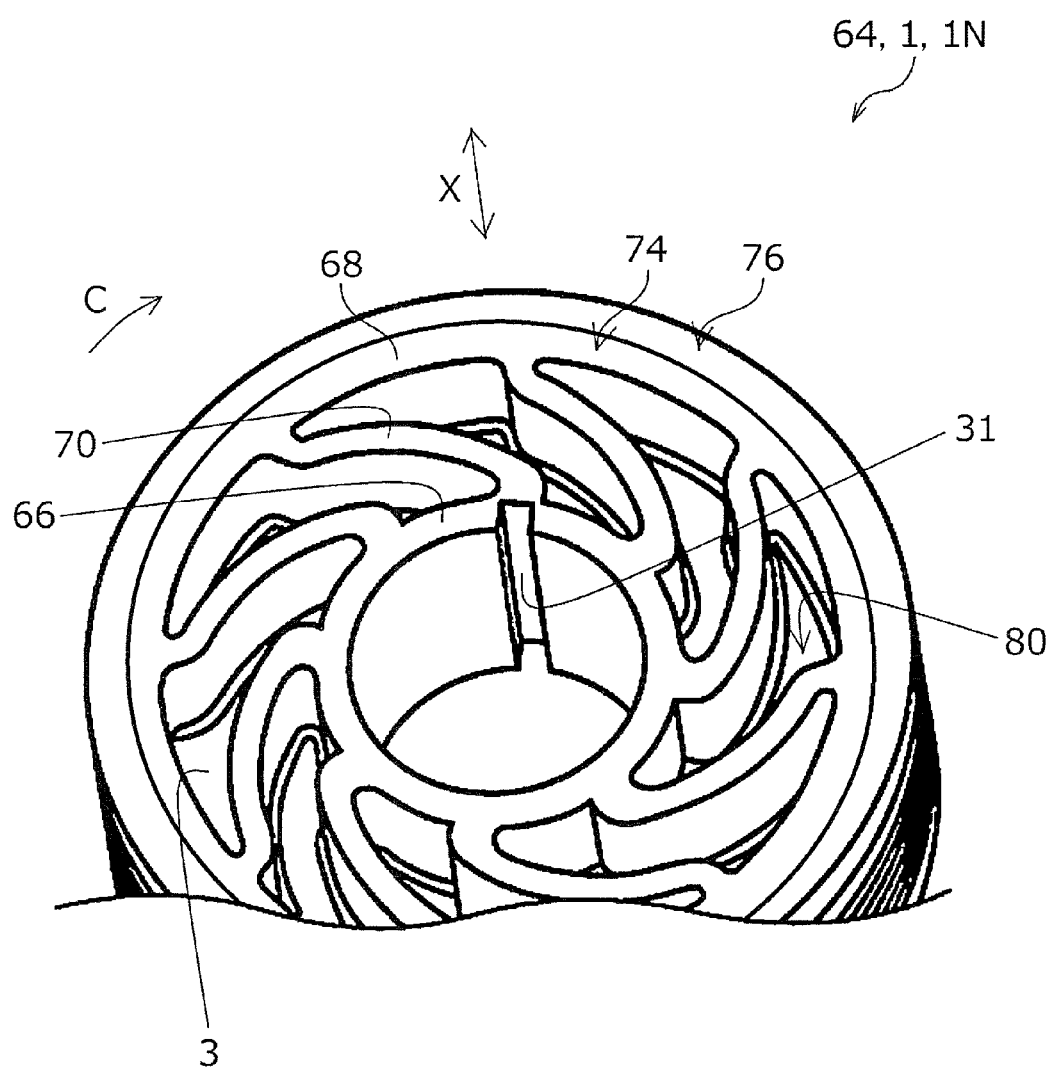
FIG. 27 is a perspective view illustrating a portion (an elastic body portion) of the roller according to the fourteenth embodiment of the invention.
Figure 28:
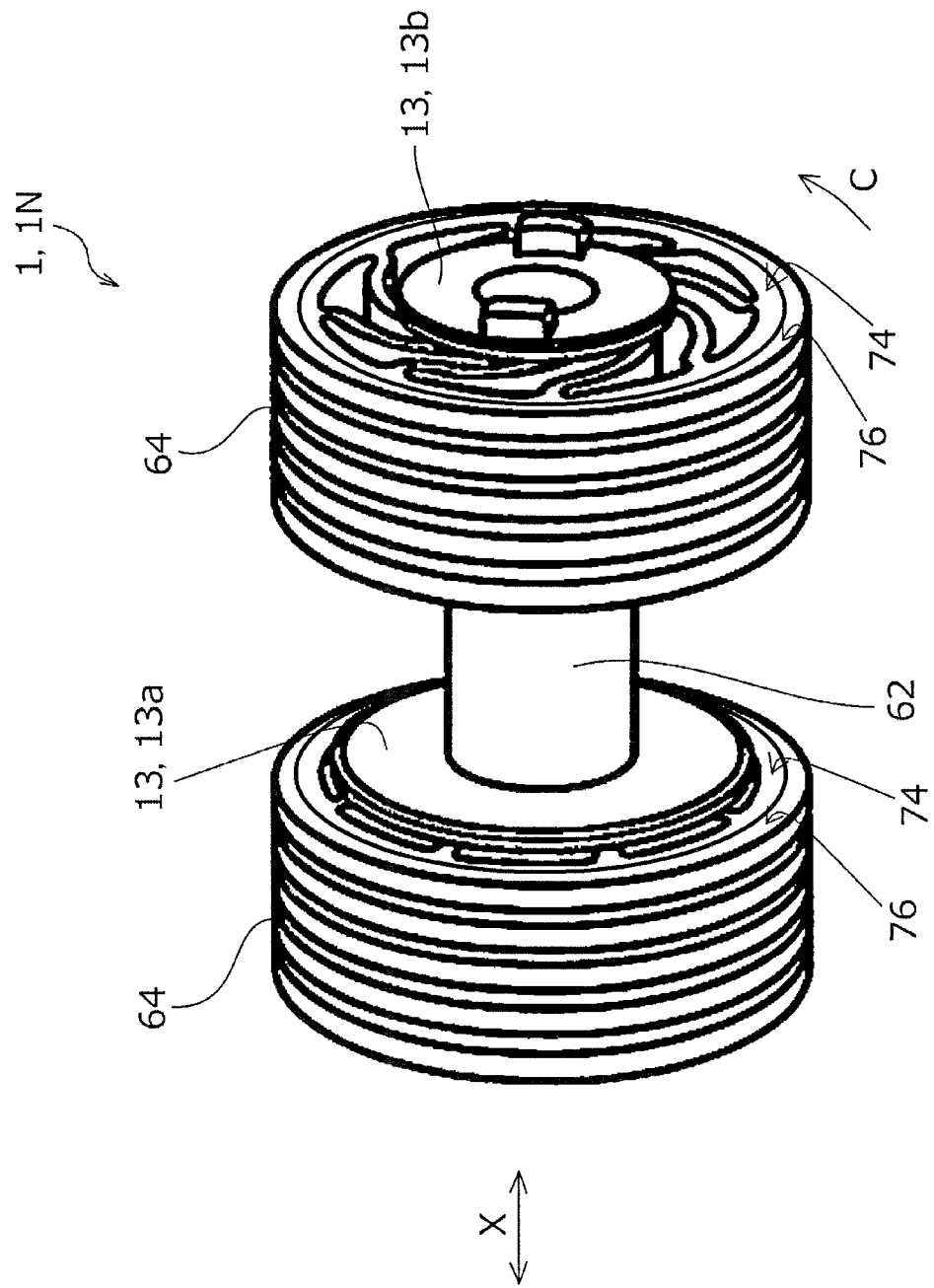
FIG. 28 is a perspective view illustrating the roller according to the fourteenth embodiment of the invention.

In detail, as illustrated in FIG. 27, a recessed (groove-shaped) positioning target portion 31 going along the apparatus width direction X and corresponding to the convex positioning unit 15A going along the apparatus width direction X is formed on the inner circumferential portion 66 in the elastic body portion 64 of the roller 1N of the fourteenth embodiment. As illustrated in FIG. 28, the elastic body portions 64 are positioned with respect to the shaft 62 by the elastic body portions 64 being attached to the shaft 62 such that the positioning units 15A and the positioning target portions 31 are fitted together.

As illustrated in FIGS. 27 and 28, the roller 1N of the fourteenth embodiment is provided with an inner layer portion 74 at which the elastic body portion 64 serves as the shaft 62 side and an outer layer portion 76 at which the elastic body portion 64 comes into contact with the medium P and the inner layer portion 74 is configured to include the joining portions 70, the inner circumferential portion 66, and the outer circumferential portion 68.

The outer layer portion 76 is configured, for example, by a high friction material such as a synthetic rubber or an elastomer in the same manner as the feed roller 34 described earlier.

As illustrated in FIG. 26 and the like, the positioning unit 15A in the roller 1N of the fourteenth embodiment has a shape which is symmetrical in the rotation direction C as viewed from a direction going along the apparatus width direction X. As illustrated in FIG. 27, the positioning target portion 31 corresponding to the positioning unit 15A also has a shape which is symmetrical in the rotation direction C as viewed from a direction going along the apparatus width direction X. Therefore, the roller 1N of the fourteenth embodiment is configured such that it is possible to attach the elastic body portion 64 to the holder 11 in the opposite orientation in the direction going along the apparatus width direction X.

Figure 29:
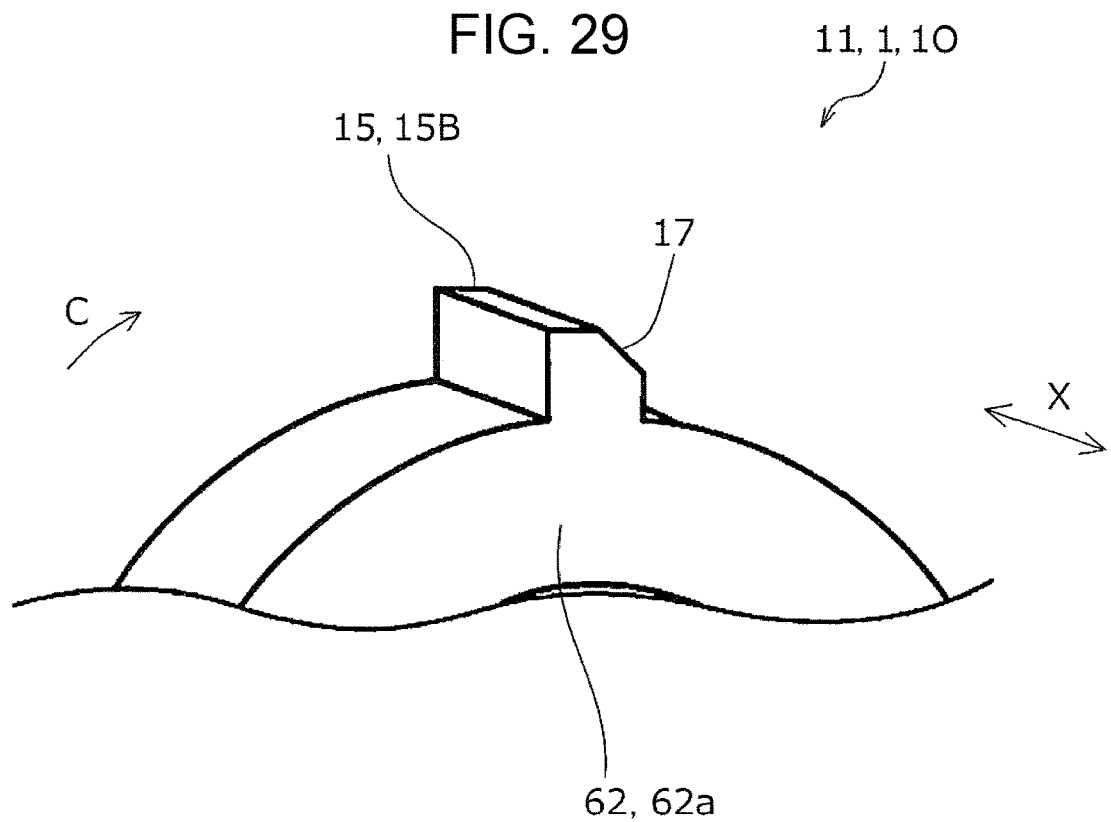
FIG. 29 is a perspective view illustrating a portion (a holder) of a roller according to a fifteenth embodiment of the invention.
Figure 30:
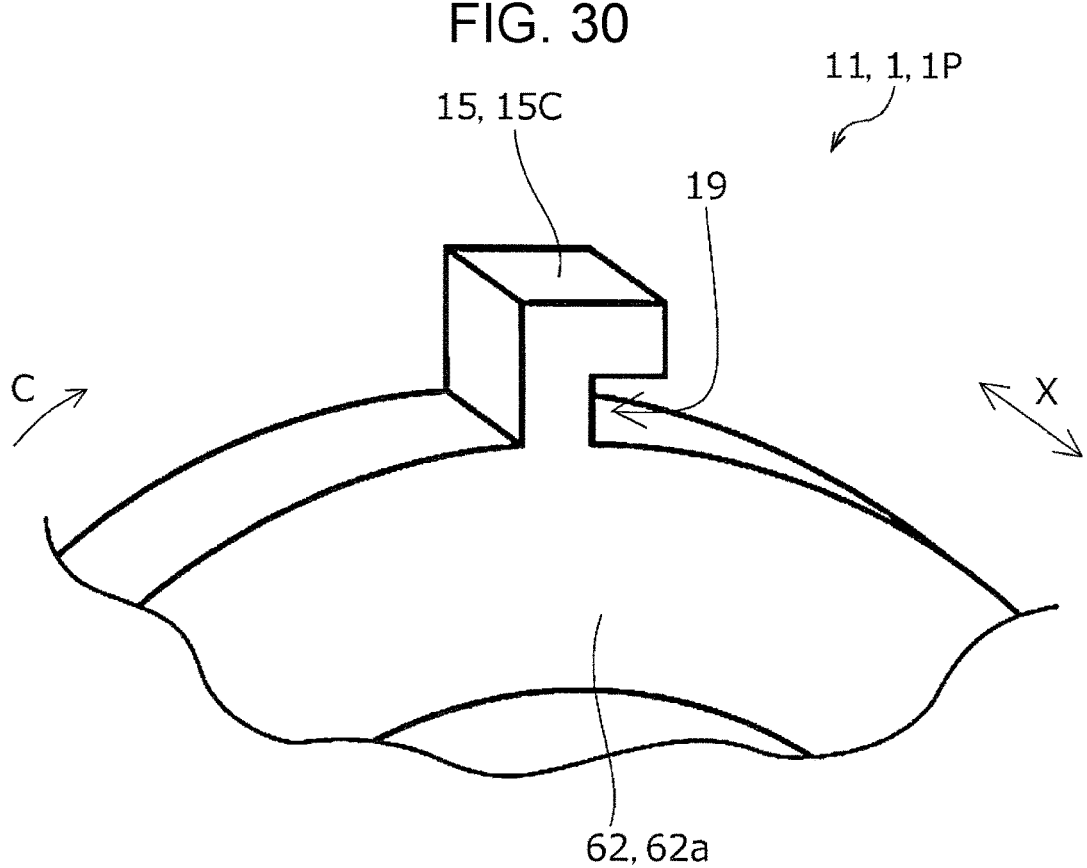
FIG. 30 is a perspective view illustrating a portion (a holder) of a roller according to a sixteenth embodiment of the invention.

Meanwhile, a positioning unit 15B of the roller 1O of the fifteenth embodiment illustrated in FIG. 29 and a positioning unit 15C of the roller 1P of the sixteenth embodiment illustrated in FIG. 30 do not have shapes which are symmetrical in the rotation direction C as viewed from the direction going along the apparatus width direction X. Specifically, an inclined surface 17 is formed on a portion of the positioning unit 15B and a cutout portion 19 is formed in a portion of the positioning unit 15C. Although not illustrated, a groove-shaped portion of a shape corresponding to the positioning unit 15B is formed in the positioning target portion of the roller 1O of the fifteenth embodiment and a groove-shaped portion of a shape corresponding to the positioning unit 15C is formed in the positioning target portion of the roller 1P of the sixteenth embodiment.

Therefore, the roller 1O of the fifteenth embodiment and the roller 1P of the sixteenth embodiment are configured such that it is not possible to attach the elastic body portion 64 to the holder 11 in the opposite orientation in the direction going along the apparatus width direction X.

Figure 31:
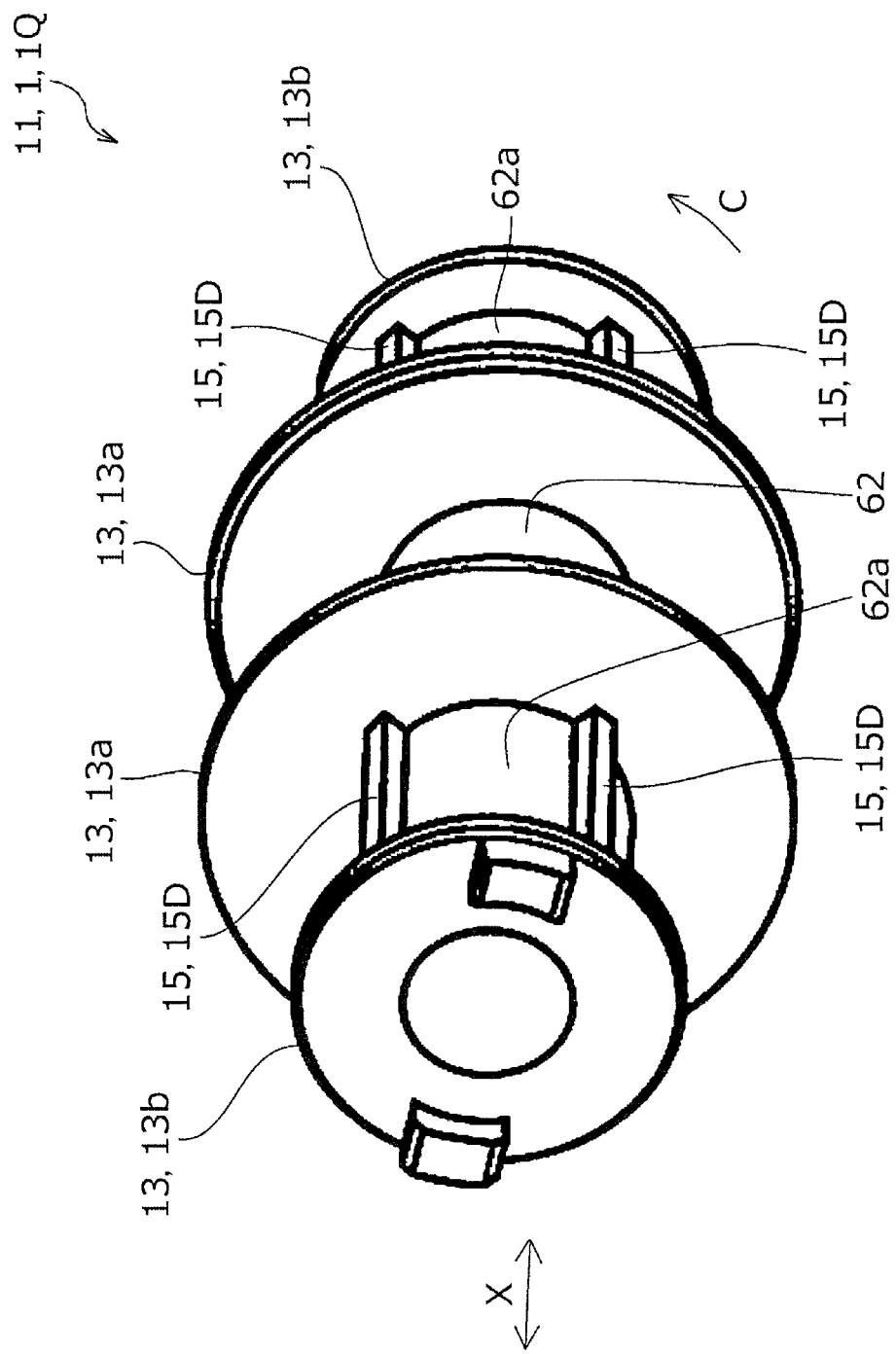
FIG. 31 is a perspective view illustrating a portion (a holder) of a roller according to a seventeenth embodiment of the invention.
Figure 32:
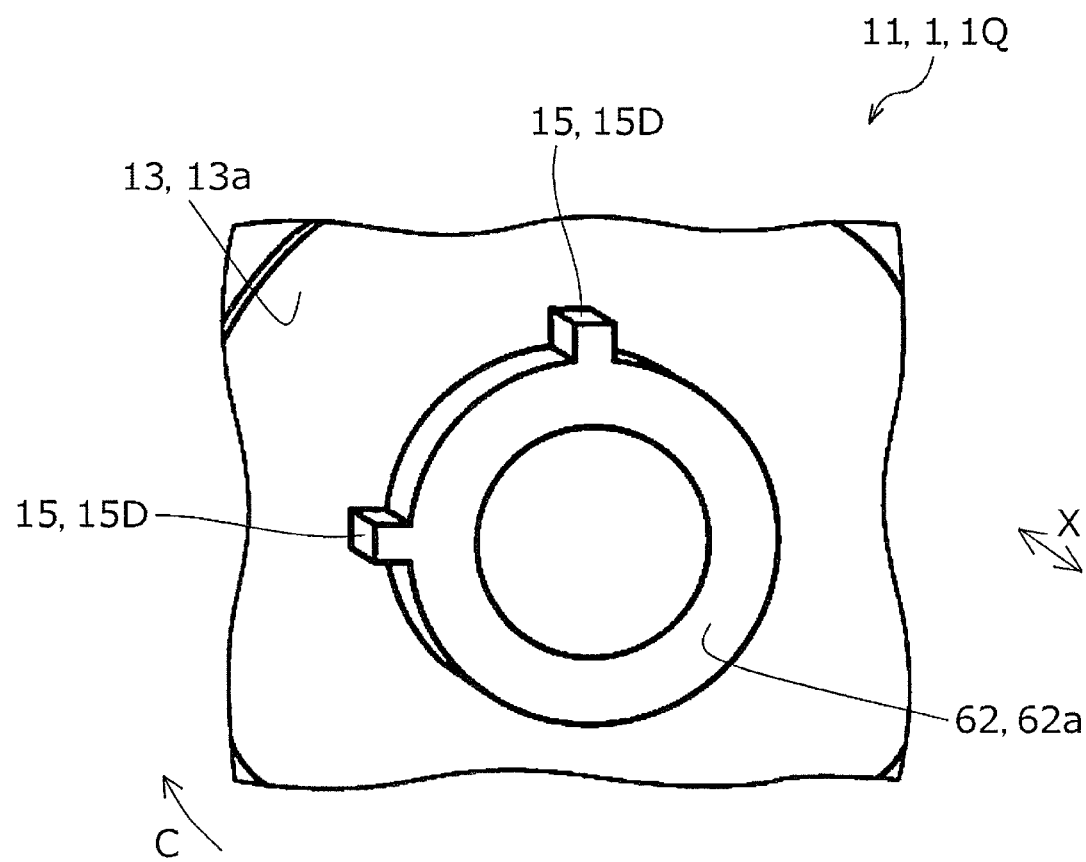
FIG. 32 is a perspective view illustrating a portion (the holder) of the roller according to the seventeenth embodiment of the invention.

In the roller 1Q of the seventeenth embodiment illustrated in FIGS. 31 and 32, positioning units 15D are configured at two locations at an interval separated by 90° in the rotation direction C at the corresponding attachment positions 62a. Although not illustrated, for the positioning target portions of the roller 1Q of the seventeenth embodiment, groove-shaped portions are formed at two locations at positions corresponding to the positioning units 15D.

The positioning units 15D of the two locations and the positioning target portions of the two locations have slightly different sizes and shapes from each other.

Therefore, the roller 1Q of the seventeenth embodiment is configured such that it is not possible to attach the elastic body portion 64 to the holder 11 in the opposite orientation in the direction going along the apparatus width direction X in the same manner as the roller 1O of the fifteenth embodiment and the roller 1P of the sixteenth embodiment.

As described above, although the rollers 1 of the fourteenth embodiment to the seventeenth embodiment are configured such that the convex positioning units 15 going along the apparatus width direction X are formed on the holder 11 and the recessed (groove-shaped) positioning target portions going along the apparatus width direction X are formed in the elastic body portions 64, the rollers 1 are not limited to such configurations.

Figure 33:
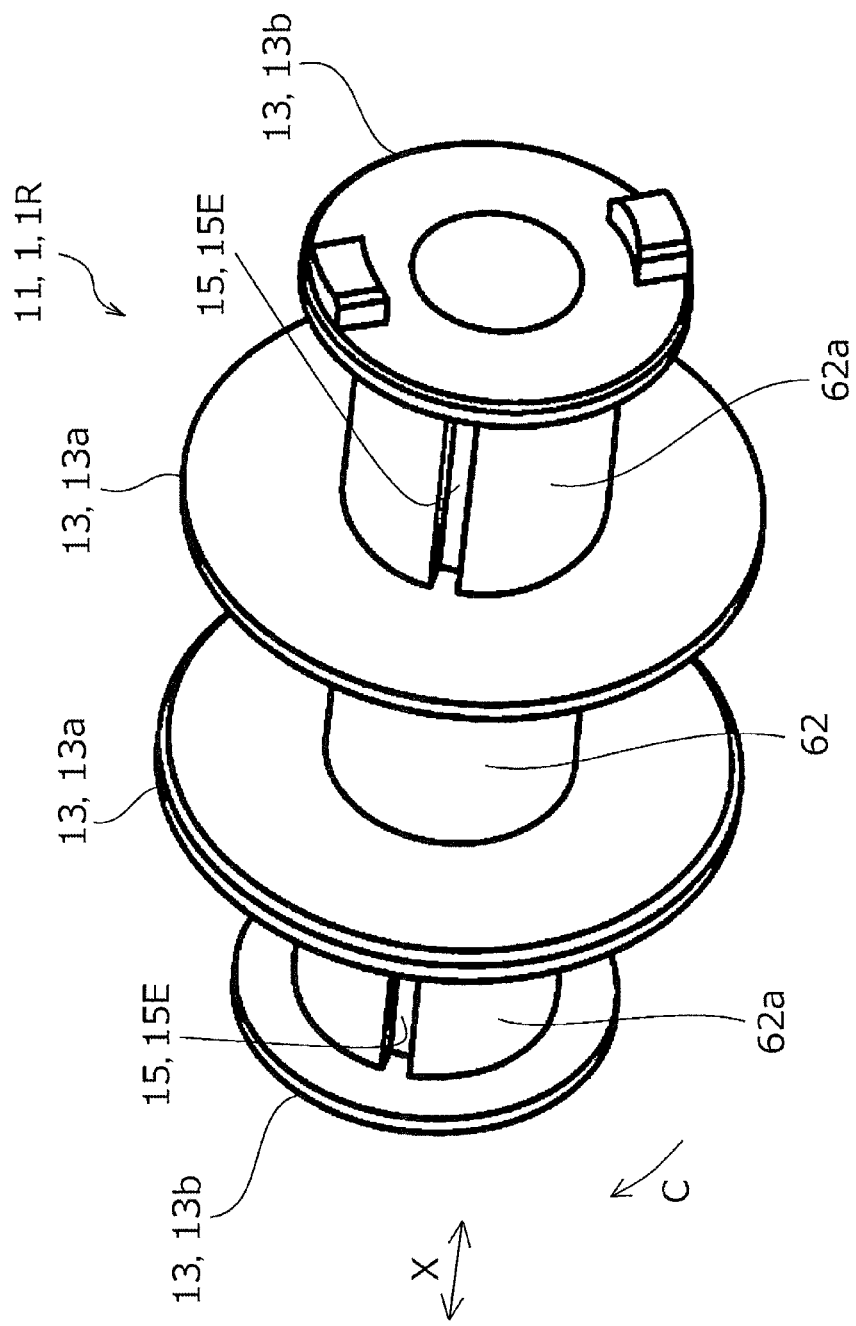
FIG. 33 is a perspective view illustrating a portion (a holder) of a roller according to an eighteenth embodiment of the invention.
Figure 34:
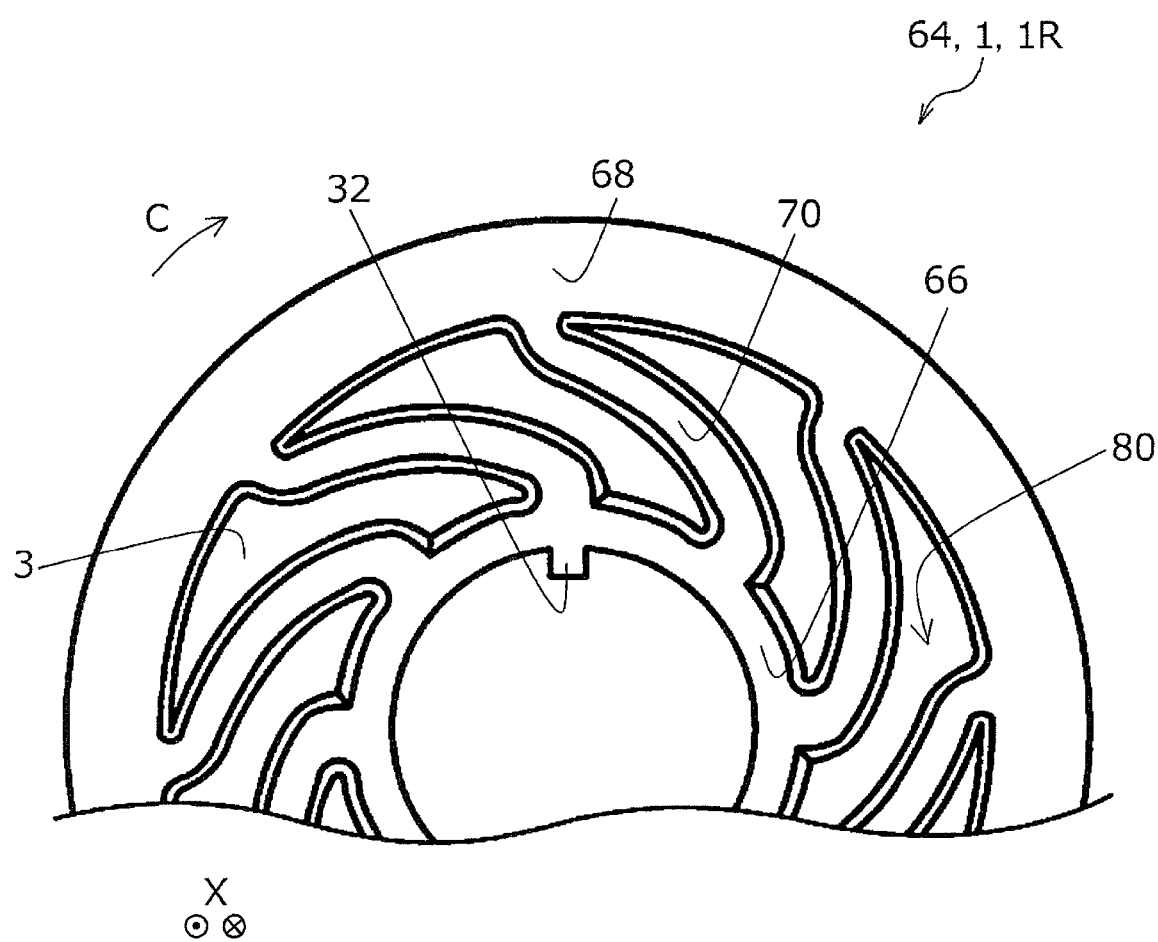
FIG. 34 is a side view illustrating a portion (an elastic body portion) of the roller according to the eighteenth embodiment of the invention.

As illustrated in FIGS. 33 and 34, the roller 1R of the eighteenth embodiment is configured such that the recessed (groove-shaped) positioning units 15 (positioning units 15E) going along the apparatus width direction X are formed at the attachment positions 62a of the shaft 62 of the holder 11 and the convex positioning target portions 32 going along the apparatus width direction X are formed on the inner circumferential portion 66 of the elastic body portion 64. The roller 1 of the invention may adopt such a configuration.

As described above, although the rollers 1 of the fourteenth embodiment to the eighteenth embodiment are configured such that the positioning units 15 are formed on the shaft 62, the configuration is not limited thereto. A configuration may be adopted in which the positioning units 15 which determine the positions of the elastic body portions 64 with respect to the shaft 62 in the rotation direction C of the roller 1 are provided on the flanges 13 which are provided on the shaft 62. Even in this configuration, it is possible to determine the positions of the elastic body portions 64 with respect to the shaft 62 in the rotation direction C of the roller 1 at suitable positions using the positioning units 15.

Figure 35:
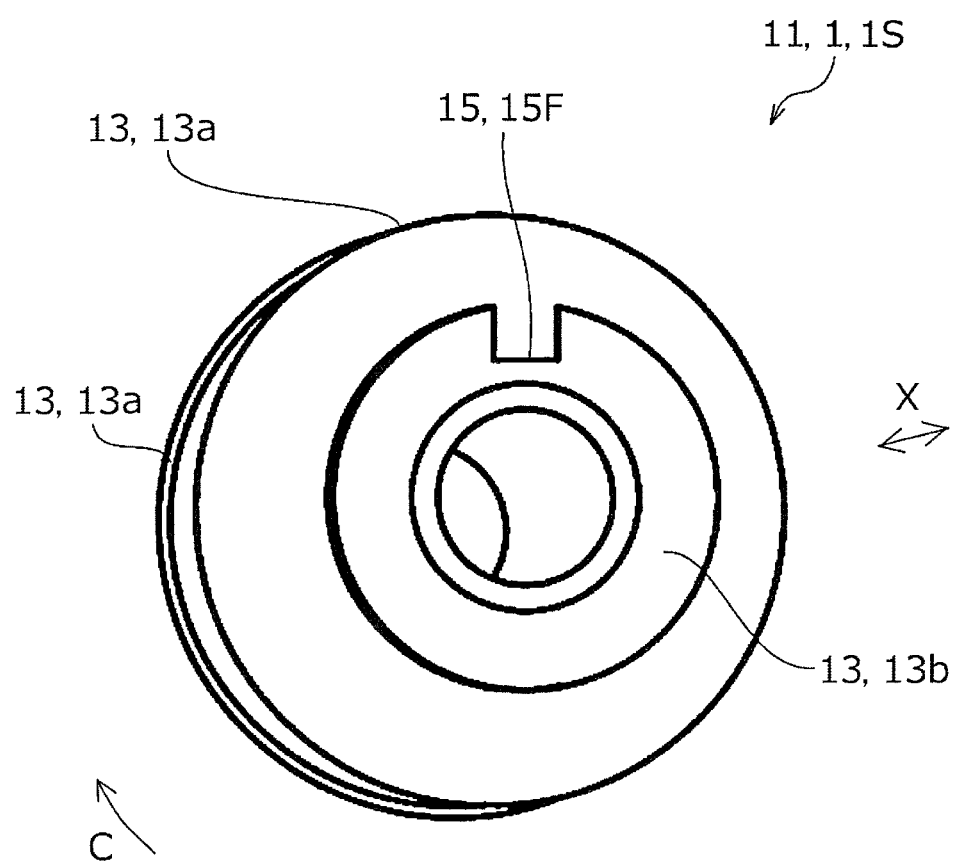
FIG. 35 is a perspective view illustrating a portion (a holder) of a roller according to a nineteenth embodiment of the invention.
Figure 36:
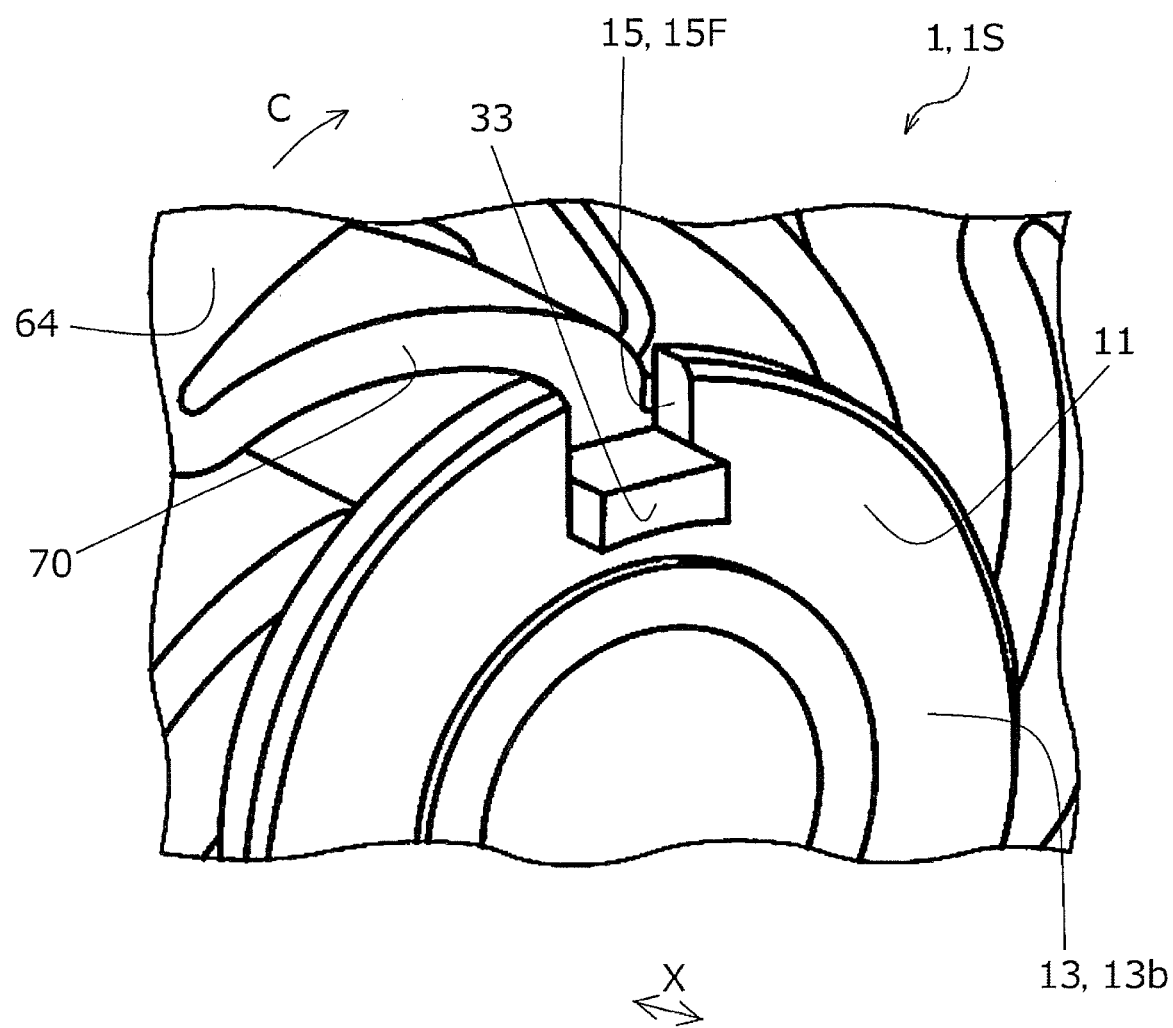
FIG. 36 is a perspective view illustrating a portion of the roller according to the nineteenth embodiment of the invention.

In the roller 1S of the nineteenth embodiment illustrated in FIGS. 35 and 36, the flanges 13 (the outside flanges 13b) are provided with the positioning units 15 (recessed positioning units 15F) which determine the positions of the elastic body portions 64 with respect to the shaft 62 in the rotation direction C of the roller 1. As illustrated in FIG. 36, convex positioning target portions 33 corresponding to the recessed positioning units 15F are formed on the elastic body portions 64 of the roller 1S of the nineteenth embodiment. As illustrated in FIG. 36, the elastic body portions 64 are positioned with respect to the shaft 62 by the elastic body portions 64 being attached to the shaft 62 such that the positioning units 15F and the positioning target portions 33 are fitted together.

The positioning unit 15F in the roller 1S of the nineteenth embodiment has a shape which is symmetrical in the rotation direction C as viewed from a direction going along the apparatus width direction X. As illustrated in FIG. 36, the positioning target portion 33 corresponding to the positioning unit 15F also has a shape which is symmetrical in the rotation direction C as viewed from a direction going along the apparatus width direction X. Therefore, in a configuration in which the two elastic body portions 64 are attached to the respective attachment positions 62a from both sides on the outside of the holder 11 in a direction going along the apparatus width direction X, the configuration is such that it is possible to invert the orientation of the two elastic body portions 64 in the apparatus width direction X and attach each to the opposite attachment position 62a.

Figure 37:
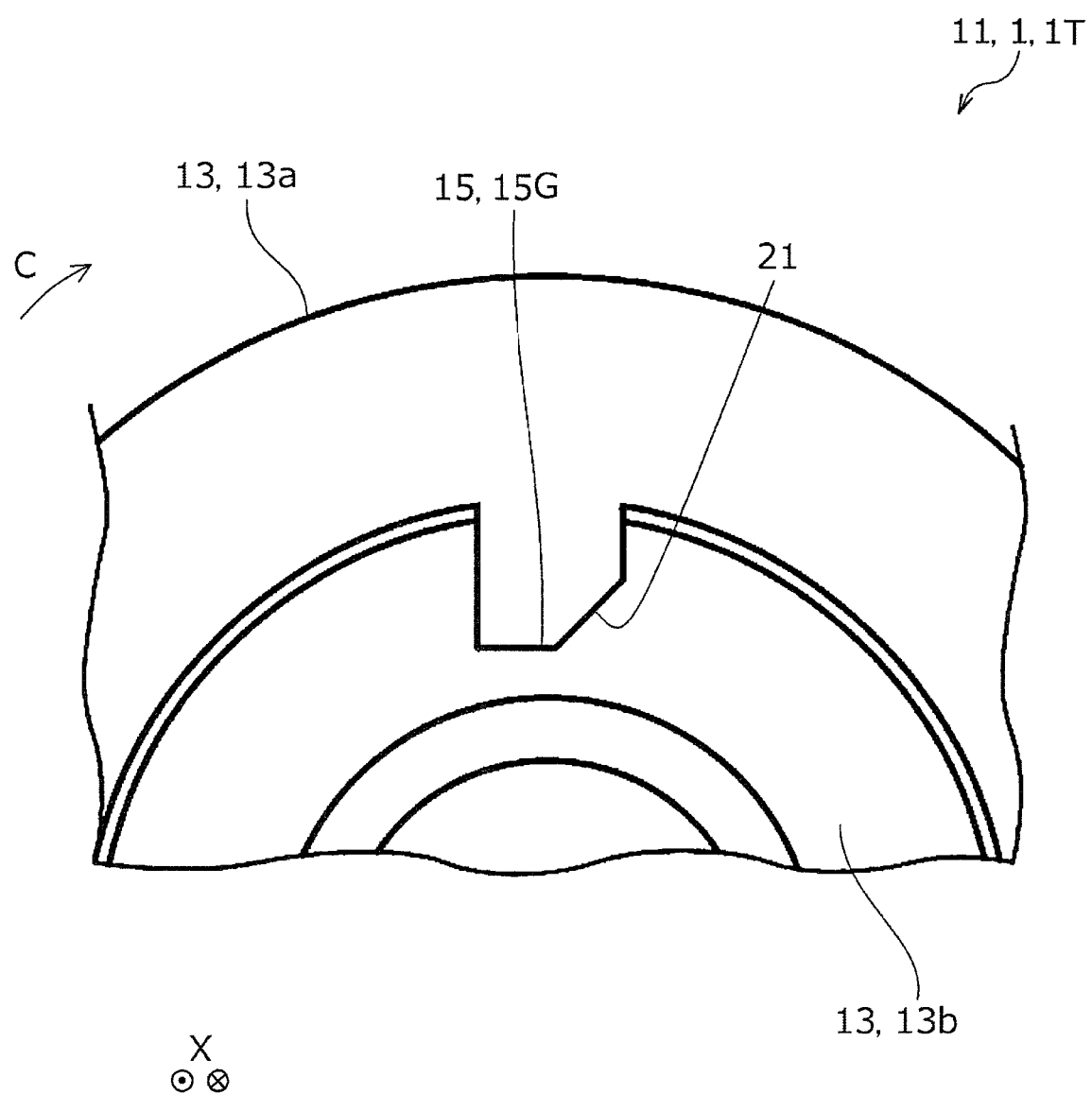
FIG. 37 is a side view illustrating a portion (a holder) of a roller according to a twentieth embodiment of the invention.
Figure 38:
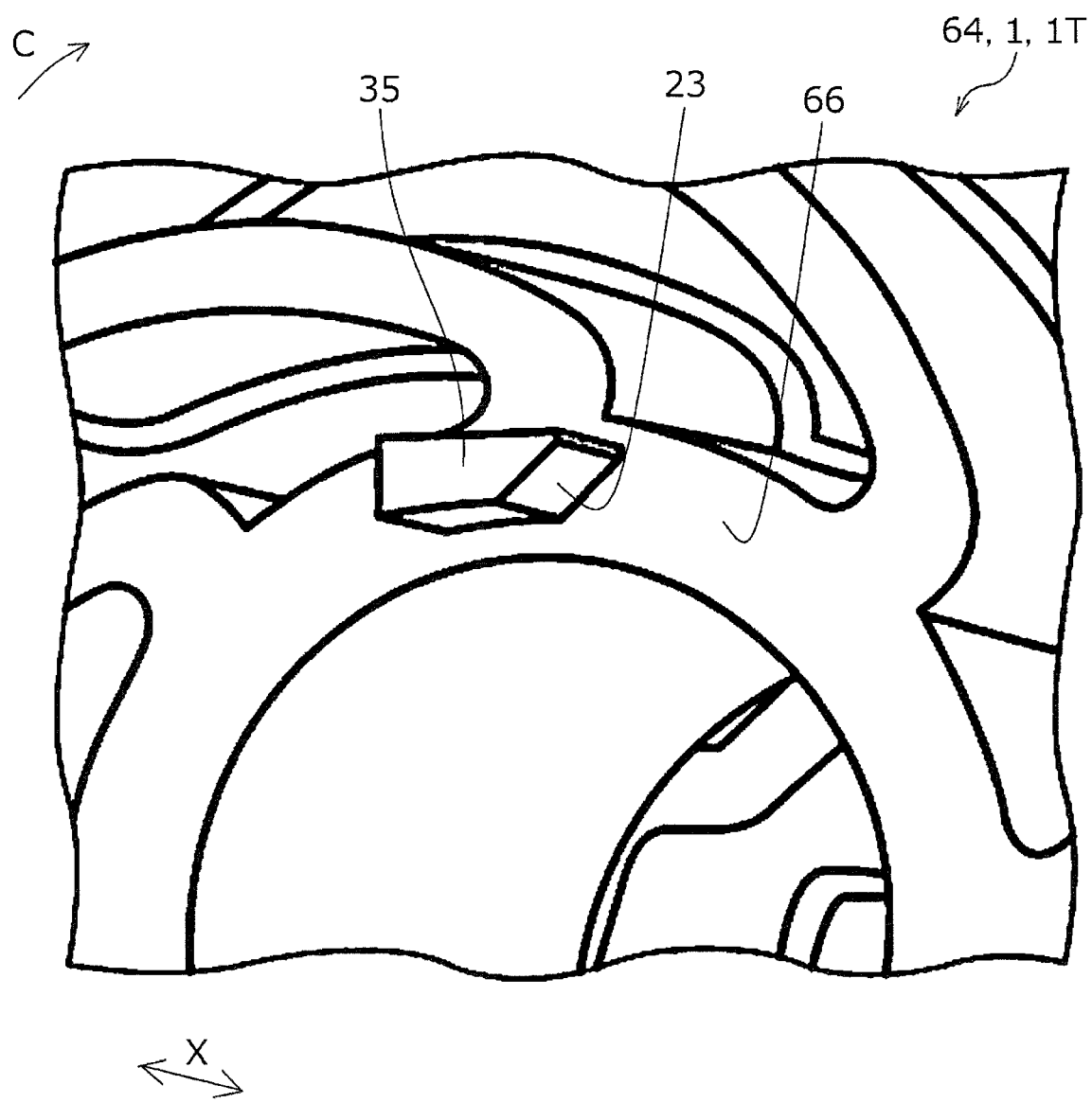
FIG. 38 is a perspective view illustrating a portion (an elastic body portion) of the roller according to the twentieth embodiment of the invention.

Meanwhile, a positioning unit 15G of a roller 1T of the twentieth embodiment illustrated in FIG. 37 does not have a shape which is symmetrical in the rotation direction C as viewed from a direction going along the apparatus width direction X. Specifically, an inclined surface 21 is formed on a portion (a leading side in the rotation direction C) of the positioning unit 15G. As illustrated in FIG. 38, an inclined surface 23 of a shape corresponding to the positioning unit 15G is formed on a positioning target portion 35 of the roller 1T of the twentieth embodiment.

Therefore, since the disposition of the inclined surface 23 in the rotation direction C changes when the elastic body portion 64 is rotated backward, the roller 1T of the twentieth embodiment is configured such that it is not possible to attach the two elastic body portions 64 to the holder 11 at the opposite of the respective attachment positions 62a.

Figure 39:
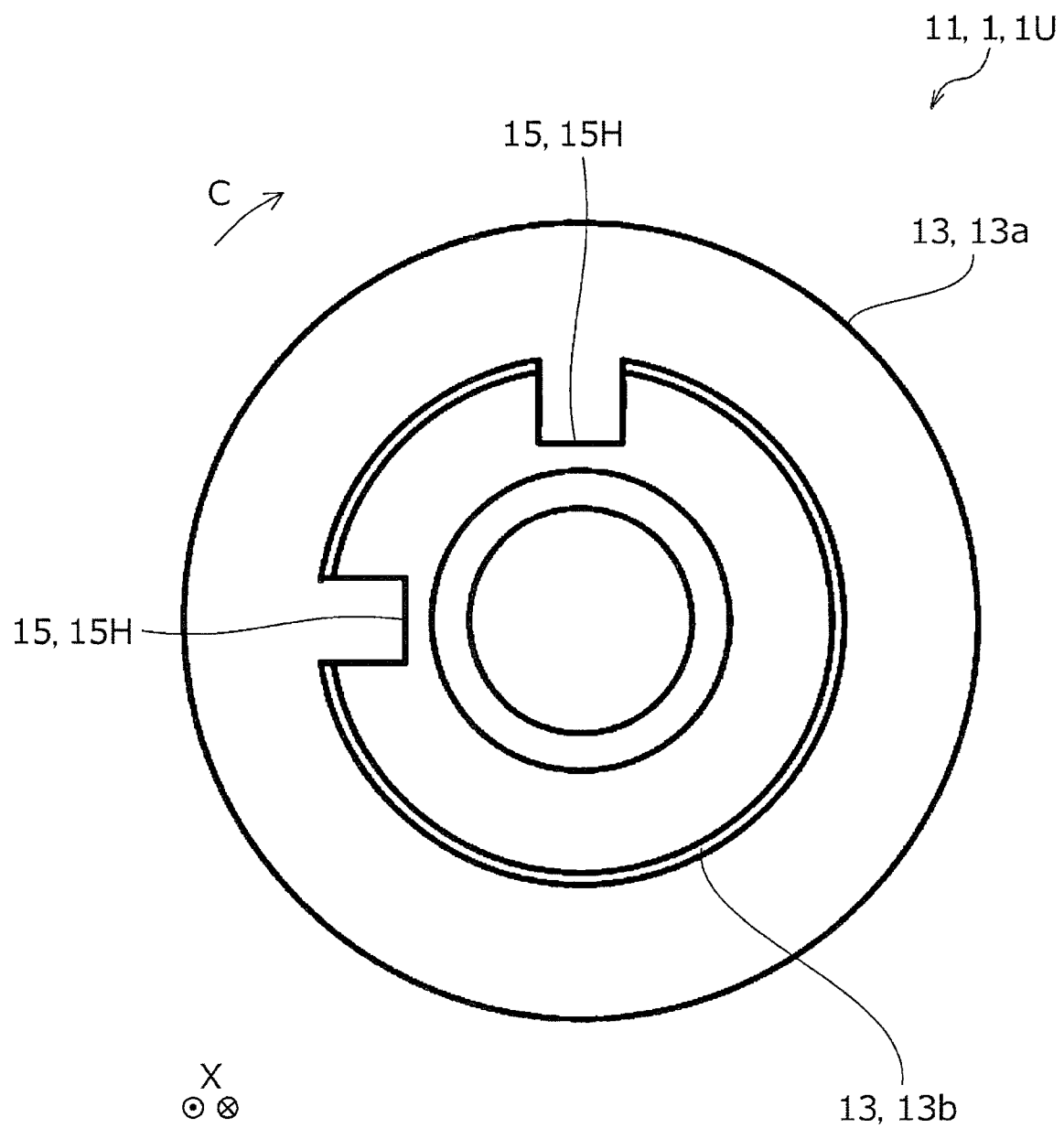
FIG. 39 is a side view illustrating a portion (a holder) of a roller according to a twenty-first embodiment of the invention.
Figure 40:
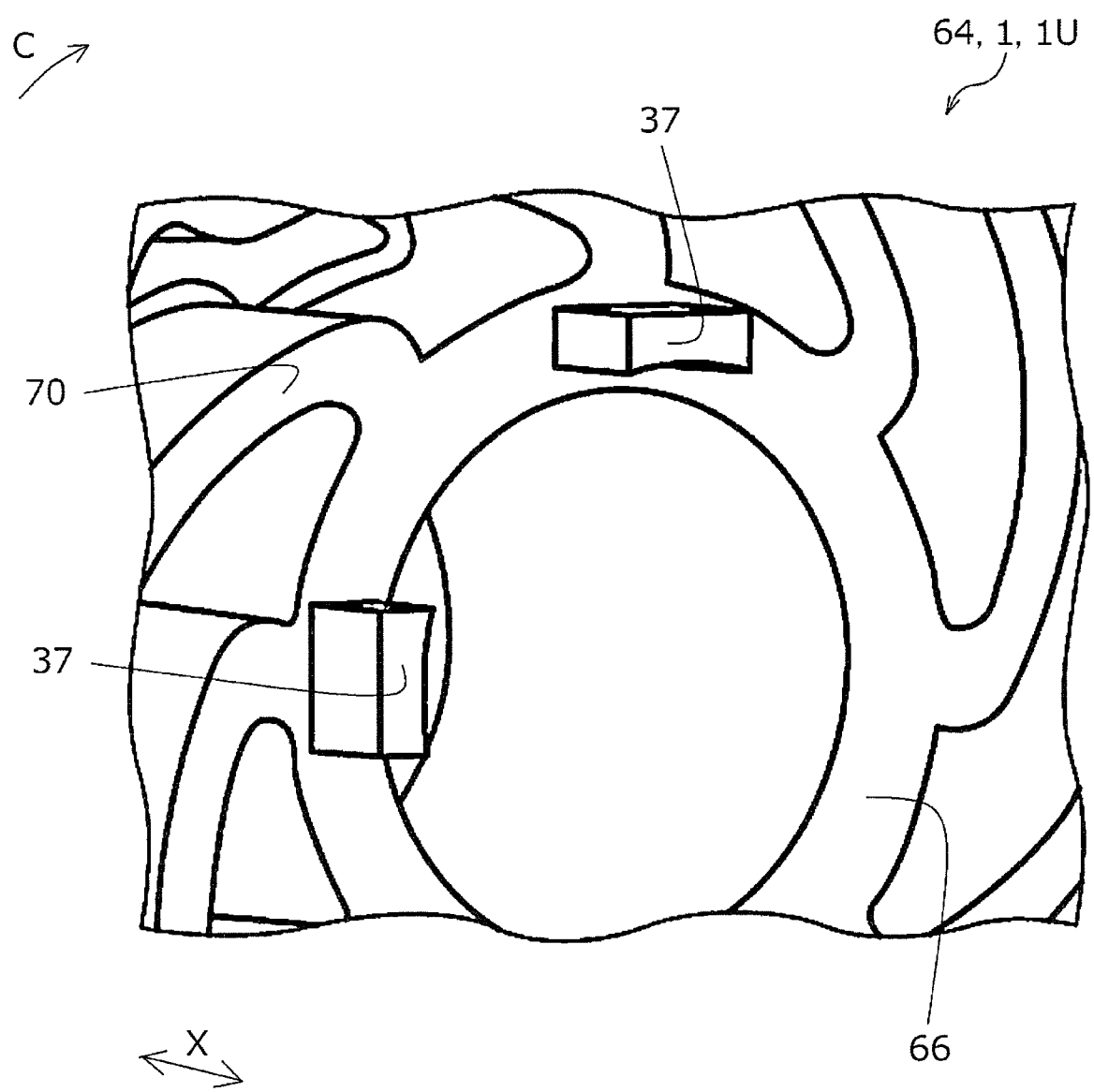
FIG. 40 is a perspective view illustrating a portion (an elastic body portion) of the roller according to the twenty-first embodiment of the invention.

In a roller 1U of the twenty-first embodiment illustrated in FIGS. 39 and 40, recessed positioning units 15H are configured at two locations at an interval separated by 90° in the rotation direction C on the outside flanges 13b as illustrated in FIG. 39. As illustrated in FIG. 40, in the roller 1U of the twenty-first embodiment, convex positioning target portions 37 are formed at two locations at positions corresponding to the recessed positioning units 15H on the inner circumferential portion 66 of the elastic body portions 64.

The positioning units 15H of the two locations and the positioning target portions 37 of the two locations have slightly different sizes and shapes from each other.

Therefore, since the disposition of the positioning target portions 37 in the rotation direction C changes when the elastic body portion 64 is rotated backward, the roller 1U of the twenty-first embodiment is configured such that it is not possible to attach the two elastic body portions 64 to the holder 11 at the opposite of the respective attachment positions 62a in the same manner as the roller 1T of the twentieth embodiment.

As described above, although the rollers 1 of the nineteenth embodiment to the twenty-first embodiment are configured such that the recessed positioning units 15 are formed in the holder 11 and the convex positioning target portions are formed on the elastic body portions 64, the rollers 1 are not limited to such configurations.

Figure 41:
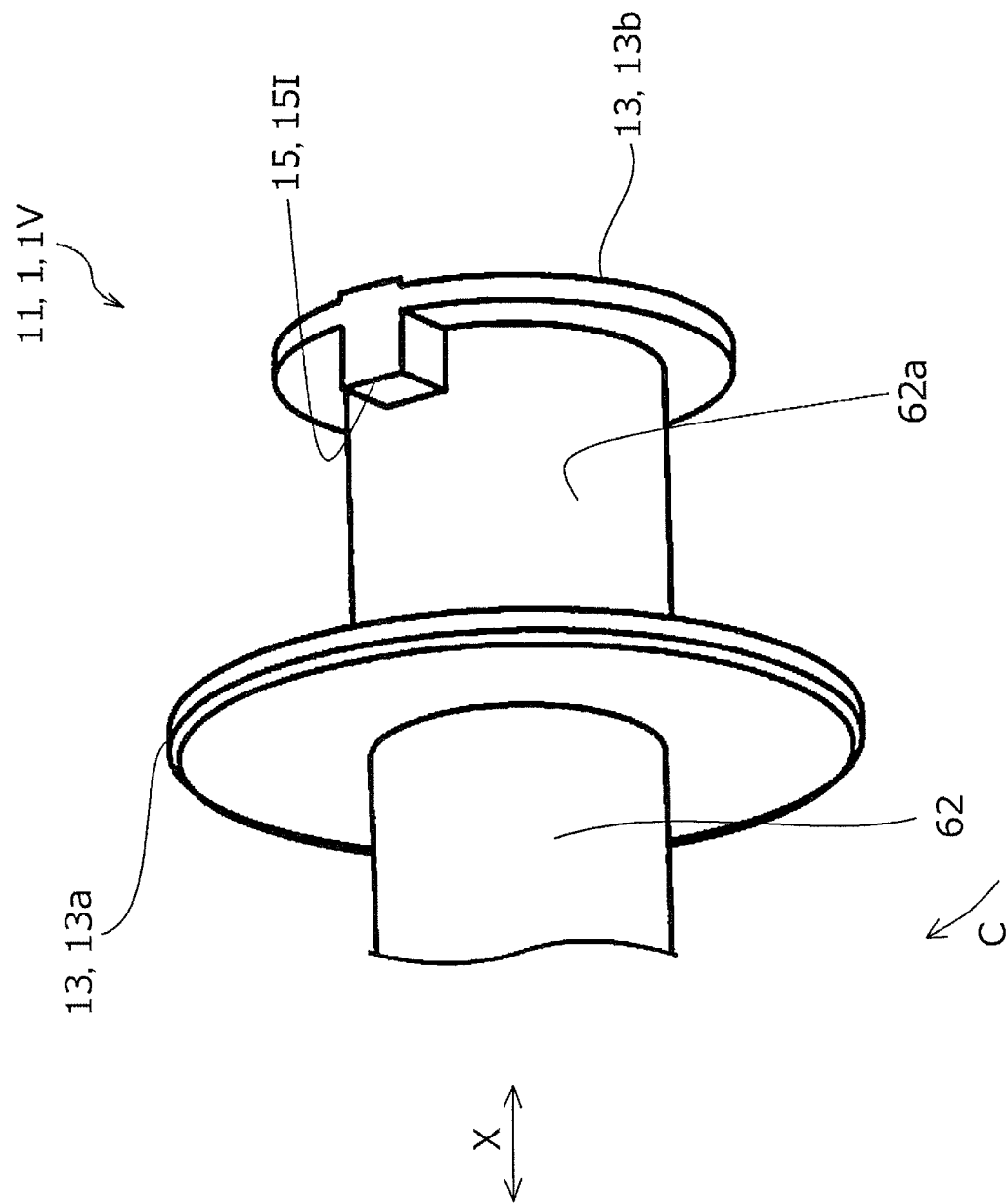
FIG. 41 is a perspective view illustrating a portion (a holder) of a roller according to a twenty-second embodiment of the invention.
Figure 42:
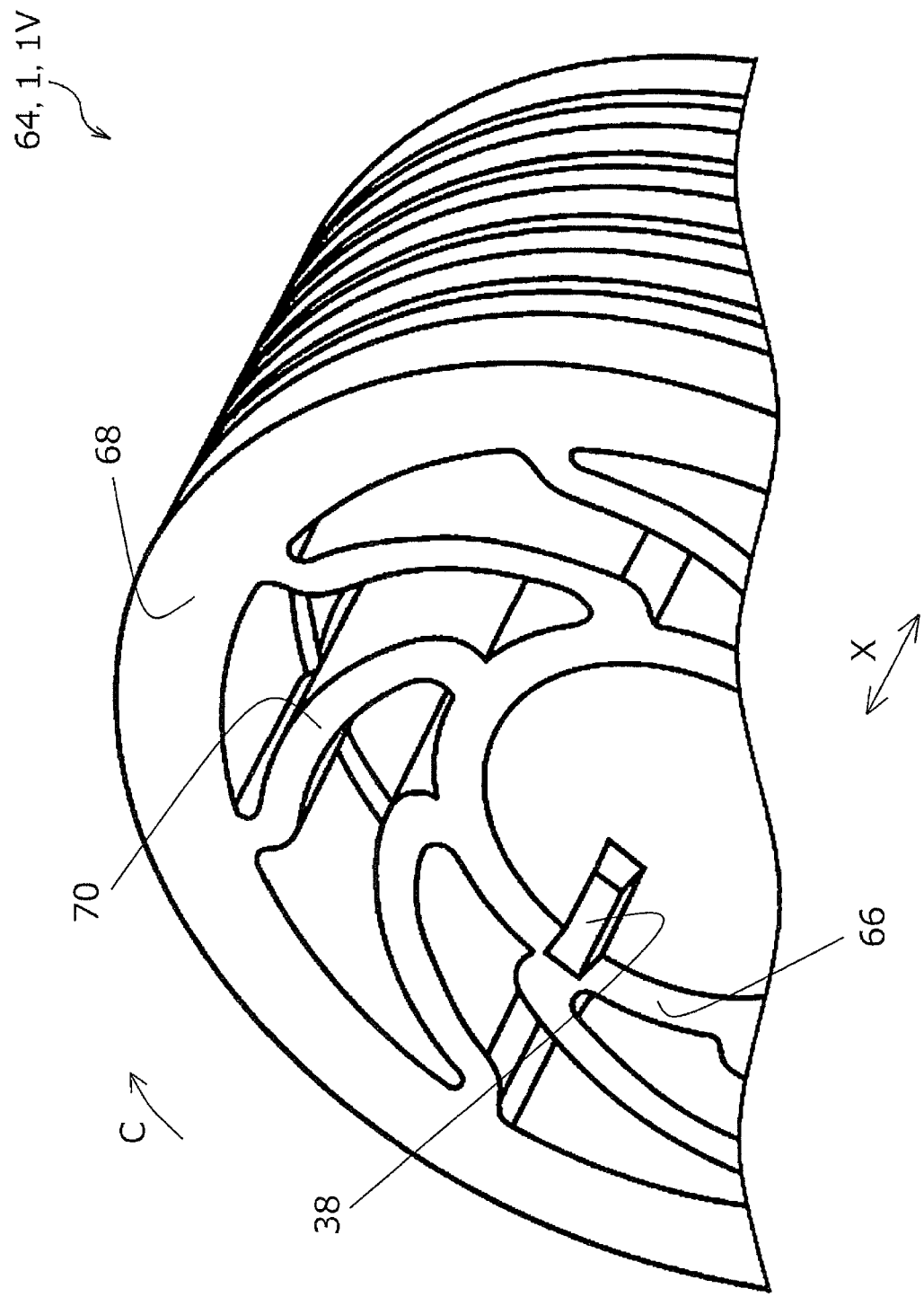
FIG. 42 is a perspective view illustrating a portion (an elastic body portion) of the roller according to the twenty-second embodiment of the invention.

As illustrated in FIGS. 41 and 42, a roller 1V of the twenty-second embodiment is configured such that the convex positioning units 15 (positioning units 15I) on the flanges 13 (the outside flanges 13b) of the holder 11 and recessed positioning target portions 38 are formed on the inner circumferential portion 66 of the elastic body portion 64.

As described above, although the rollers 1 of the nineteenth embodiment to the twenty-second embodiment are configured such that the positioning units 15 are formed on the outside flanges 13b, the configuration is not limited thereto.

Figure 43:
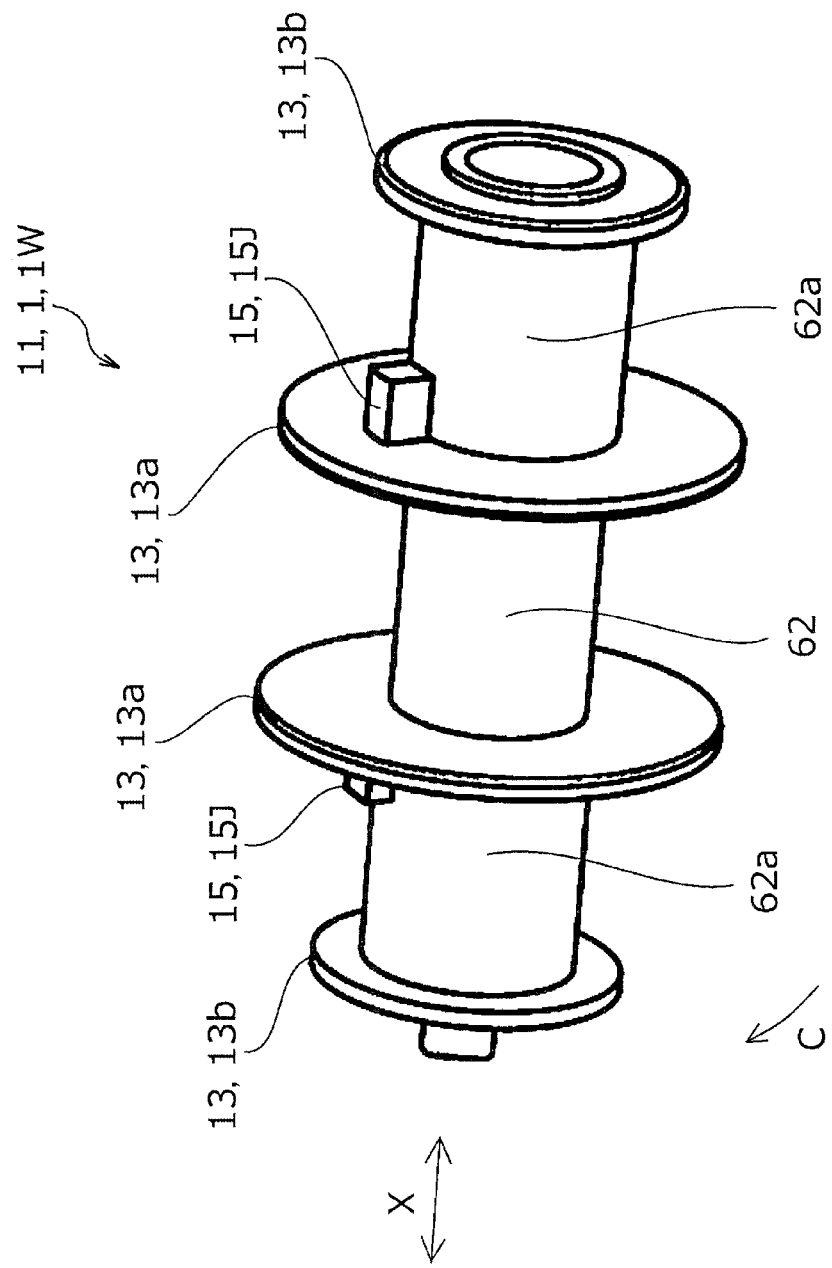
FIG. 43 is a perspective view illustrating a portion (a holder) of a roller according to a twenty-third embodiment of the invention.
Figure 44:
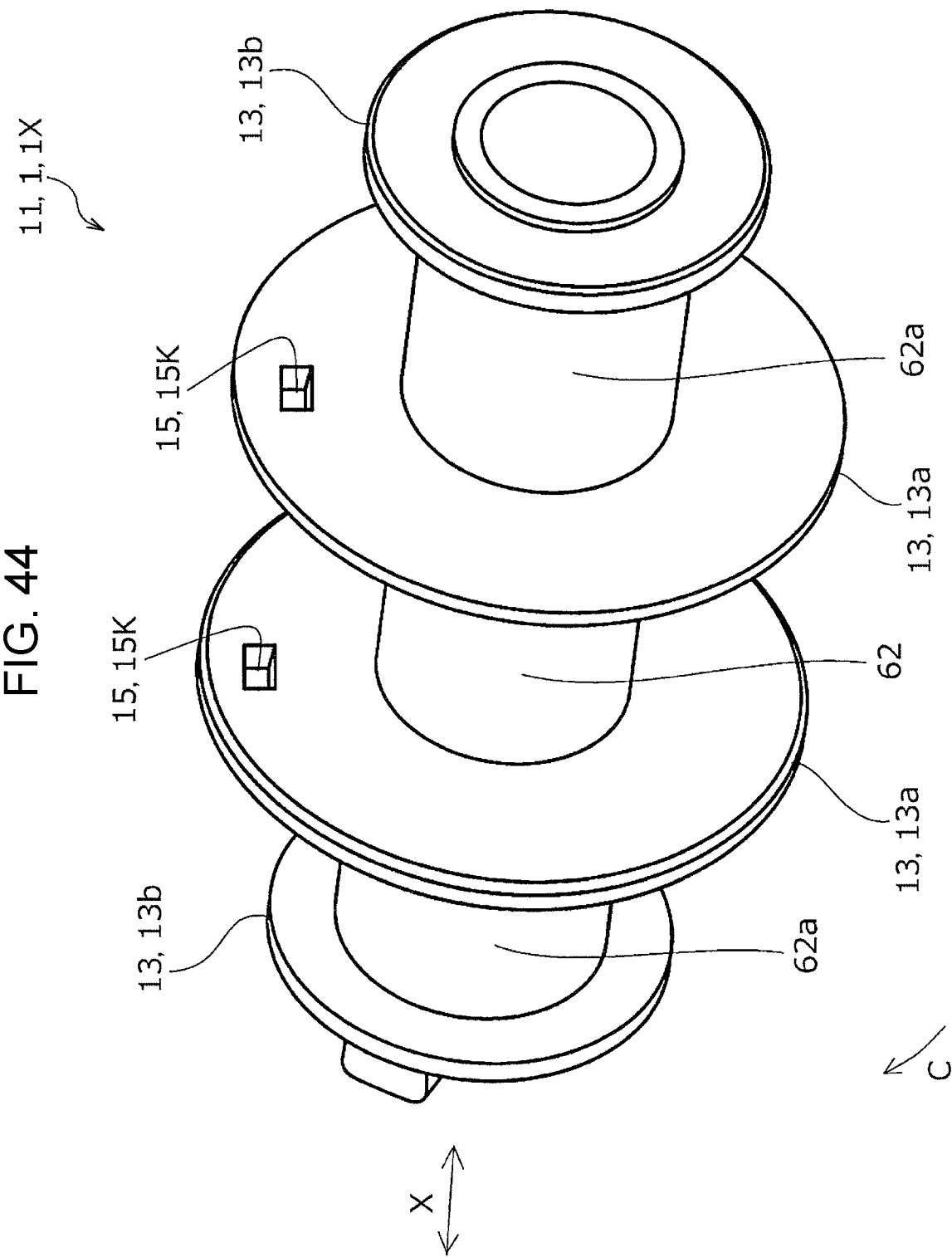
FIG. 44 is a perspective view illustrating a portion (a holder) of a roller according to a twenty-fourth embodiment of the invention.

As in the roller 1W of the twenty-third embodiment illustrated in FIG. 43 and the roller 1X of the twenty-fourth embodiment illustrated in FIG. 44, a configuration may be adopted in which the positioning units 15 are formed on the inside flanges 13a.

Even in a case in which such a configuration is adopted, the convex positioning units 15 such as positioning units 15J may be formed on the holder 11 as in the roller 1W of the twenty-third embodiment (that is, the recessed positioning target portions may be formed in the elastic body portions 64), and the recessed positioning units 15 such as positioning units 15K may be formed on the holder 11 as in the roller 1X of the twenty-fourth embodiment (that is, the convex positioning target portions may be formed on the elastic body portions 64).

As described above, in the rollers 1 of the fourteenth embodiment to the twenty-fourth embodiment, although various shapes of the positioning unit 15 and the positioning target portion corresponding to the positioning unit 15 are disclosed, the shapes, disposition, and the like of the positioning units 15 and the positioning target portions are not particularly limited.

Next, a description will be given of a roller 1Y of the twenty-fifth embodiment with reference to FIGS. 45 and 46. Of the joining portions 70, the first joining portion 70a and the second joining portion 70b which is positioned adjacent to the first joining portion 70a are in a positional relationship so as not to interfere with each other when the outer circumferential portion 68 of the roller 1 is crushed in the radial direction D.

Figure 45:
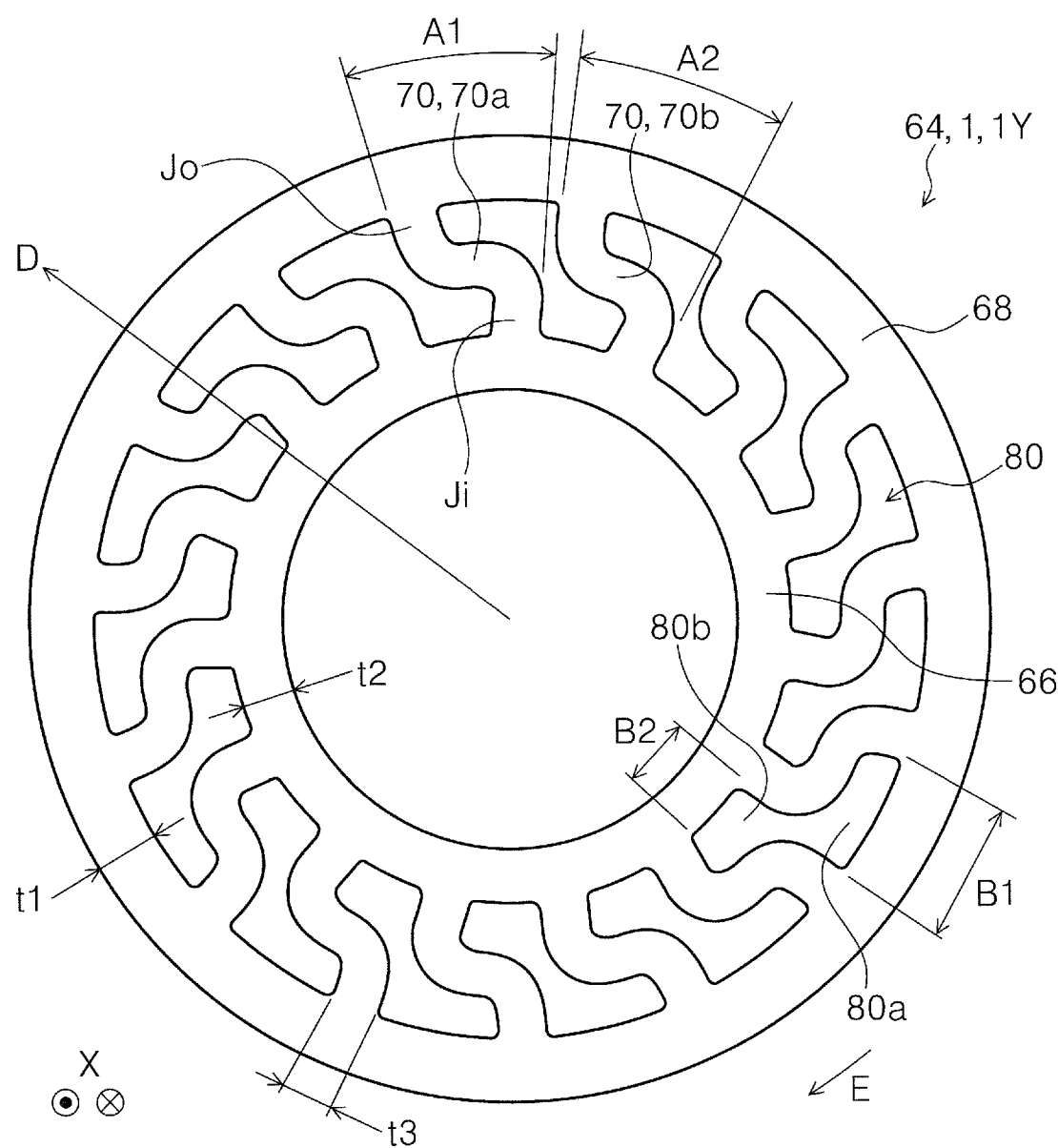
FIG. 45 is a side view illustrating a roller according to a twenty-fifth embodiment of the invention.
Figure 46:
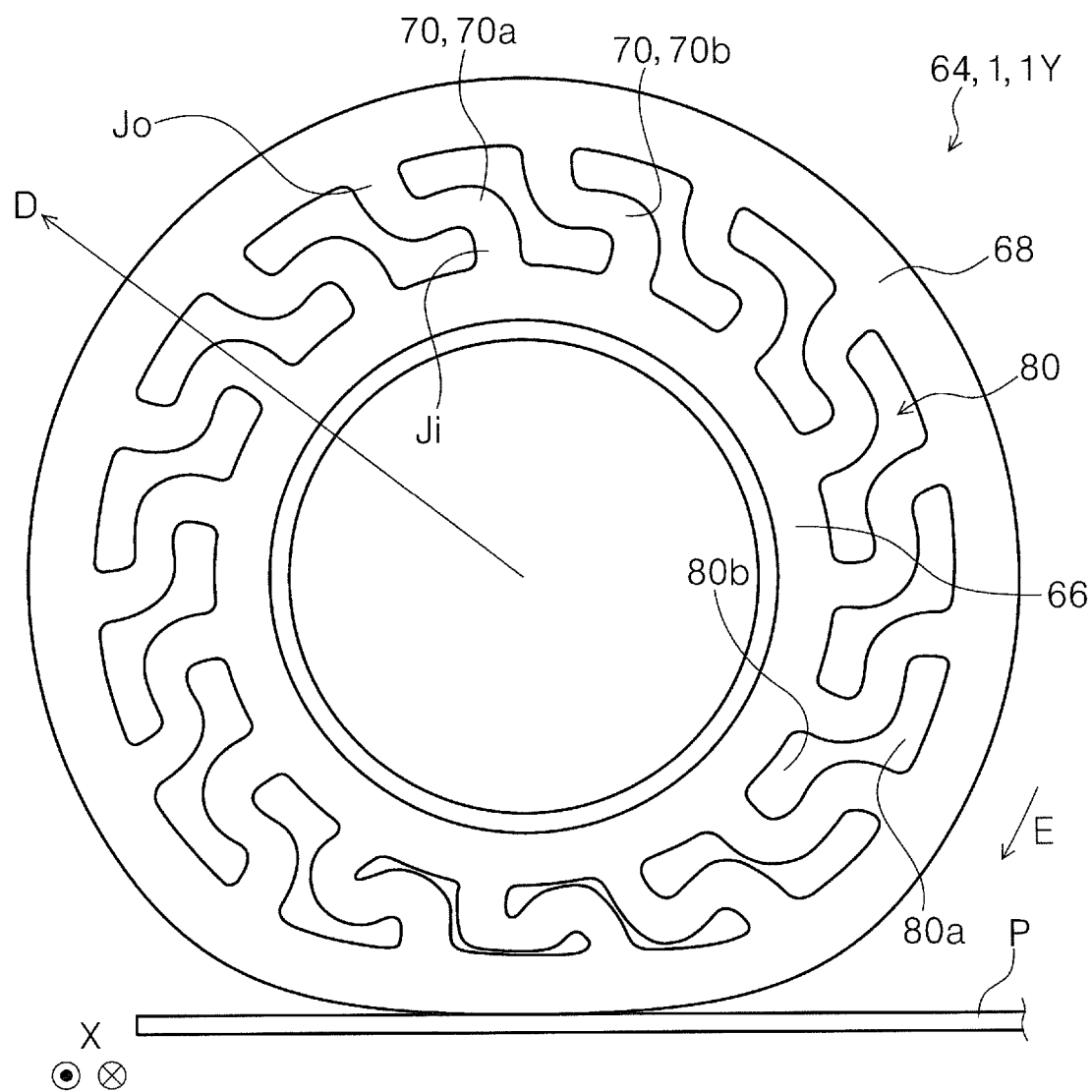
FIG. 46 is a side view illustrating the roller according to the twenty-fifth embodiment of the invention.

FIG. 45 illustrates an example of a state before the deformation of the roller 1 and FIG. 46 illustrates an example of a state after the deformation of the roller 1. In FIGS. 45 and 46, the roller 1 is in contact with the medium P which is fed to the downstream side and rotates in a clockwise direction of the diagram.

As illustrated in FIG. 46, when the outer circumferential portion 68 of the roller 1 is crushed in the radial direction D, since the first joining portion 70a and the second joining portion 70b which is positioned adjacent to the first joining portion 70a do not interfere with each other in the radial direction, it is possible to reduce the fluctuation in the crushing of the outer circumferential portion 68. The fluctuation in the crushing of the outer circumferential portion 68 here is fluctuation in the pressing force applied to the medium P by the outer circumferential portion 68 in the circumferential direction E, and when the fluctuation is significant, there is a concern that this will lead to separation faults. The twenty-fifth embodiment favorably suppresses such problems.

Hereinafter, a further description will be given of the specific structure which achieves the operations and effects. A region A1 in FIG. 45 indicates the forming region of the first joining portion 70a in the circumferential direction E and a region A2 indicates the forming region of the second joining portion 70b in the circumferential direction E. The region A1 and the region A2 do not include overlapping portions in the circumferential direction E. Accordingly, when the outer circumferential portion 68 is crushed in the radial direction D, the first joining portion 70a and the second joining portion 70b which is positioned adjacent to the first joining portion 70a do not interfere with each other in the radial direction D.

The expression "the first joining portion 70a and the second joining portion 70b which is positioned adjacent to the first joining portion 70a do not interfere with each other in the radial direction D" means that, from a viewpoint of the first joining portion 70a, for example, when the first joining portion 70a is deformed, the deformation is not impeded at all by the second joining portion 70b which is positioned adjacent to the first joining portion 70a or alternatively that even if the first joining portion 70a is slightly influenced by the second joining portion 70b during the deformation, a large influence is not received. The first joining portion 70a and the second joining portion 70b which is positioned adjacent to the first joining portion 70a may not interfere with each other in the radial direction D and contact in the circumferential direction E is permitted.

In FIG. 45, the space portion 80 is configured to include a first space portion 80a which faces the outer circumferential portion 68 and a second space portion 80b which faces the inner circumferential portion 66. A width B1 of the first space portion 80a in the circumferential direction E is wider than a width B2 of the second space portion 80b.

In the joining portions 70, the connecting portions Ji between the joining portions 70 and the inner circumferential portion 66 and the connecting portions Jo between the joining portions 70 and the outer circumferential portion 68 have positions which are deviated in the circumferential direction E and the joining portions 70 are S-shaped as viewed from the rotating shaft direction (the X axis direction). The S-shape is a shape in a case in which the roller 1Y is viewed from one side surface and in a case in which the roller 1Y is viewed from the other side surface, the roller 1Y has an inverted S-shape.

A reference numeral t1 indicates the thickness of the outer circumferential portion 68 in the radial direction D, a reference numeral t1 indicates the thickness of the outer circumferential portion 68 in the radial direction D, a reference numeral t2 is the thickness of the inner circumferential portion 66 in the radial direction D, and a reference numeral t3 indicates the thickness of the joining portion 70 in the circumferential direction E.

It is preferable that the thickness t1 of the outer circumferential portion 68 be greater than or equal to the thickness t3 of the joining portions 70. Accordingly, it is possible to reduce the fluctuation in the crushing of the outer circumferential portion 68.

In the roller 1 according to the twenty-fifth embodiment, for example, it is possible to adopt the dimension settings of external diameter=27 mm, internal diameter (shaft external diameter)=13 mm, thickness t1=1.75 mm, thickness t2=1.5 mm, thickness t3=1.0 mm, width B1=3.4 mm, and thickness B2=1.9 mm. It is possible to set the hardness to 42. According to such dimension and hardness settings, when the roller 1 is pressed against the medium P at a weight of 200 gf, the roller 1 is crushed by approximately 1.0 mm to 1.6 mm in the radial direction D and it is possible to obtain a nipping width (the length of the contact surface S of FIG. 3) of approximately 5.0 mm to 6.0 mm.

If the thickness t1 of the outer circumferential portion 68 is greater than or equal to twice the thickness t3 of the joining portions 70, this is more favorable. For example, if the thickness t3=1.0 mm, it is favorable for the thickness t1 to be greater than or equal to 2.0 mm.

However, it goes without saying that such dimensional and hardness settings are exemplary and that it is possible to select various values.

It is possible to apply the roller 1 of an aspect of the invention and the separation device 60 in which the roller 1 is applied to the retarding roller 36 to a recording apparatus which executes recording on the medium P. In other words, the recording apparatus of an aspect of the invention is a recording apparatus such as an ink jet printer which is provided with a recording unit such as a recording head and a roller which is provided in the medium transport path 26 which passes through the recording execution region of the recording unit and applies a feeding force to the medium P, when the roller has a structure in which when the roller is pressed against the medium P, the contact surface S is elastically crushed, and it is possible to configure at least one of the rollers, for example, the retarding roller 36 using the roller 1 of an aspect of the invention.

The invention is not limited to the embodiments and it is possible to realize the invention with various configurations in a scope that does not depart from the gist of the invention. For example, in order to solve a portion of or all of the problems, or alternatively, in order to achieve a portion of or all of the effects, it is possible to replace or combine, as appropriate, the technical features in embodiments corresponding to technical features in each embodiment described in the summary heading. As long as a technical feature is not described as required in the specification, it is possible to remove the technical feature, as appropriate.

The entire disclosure of Japanese Patent Application No. 2017-160012, filed Aug. 23, 2017, and No. 2018-053974, filed Mar. 22, 2018 are expressly incorporated by reference herein.

What is claimed is:

1. A roller comprising:
an elastic body portion that is provided on an outer circumferential surface of a shaft,
wherein the elastic body portion includes:
an inner circumferential portion which serves as the shaft side;
an outer circumferential portion which serves as an outer circumferential side with respect to the inner circumferential portion;
a space portion between the inner circumferential portion and the outer circumferential portion; and
a plurality of joining portions which join the inner circumferential portion and the outer circumferential portion to each other in the space portion and define a plurality of sub-space portions,
wherein at least a portion of each of the joining portions has a curved shape, and
wherein the joining portions are each joined to the inner circumferential portion and the outer circumferential portion such that connecting portions between the joining portions and the inner circumferential portion and connecting portions between the joining portions and the outer circumferential portion do not form acute angles in the space portion, and
wherein the sub-space portion has two inner circumferential portion corner portions that are formed at the connecting portions between the joining portions and the inner circumferential portions and two outer circumferential portion corner portions that are formed at the connecting portions between the joining portions and the outer circumferential portion, and one of the two inner circumferential portion corner portions has a right angle, and the other of the two inner circumferential portion corner portions has a rounded shape, and
wherein a connecting portion between a first joining portion of the joining portions and the inner circumferential portion and a connecting portion between a second joining portion, which is adjacent to the first joining portion, of the joining portions and the outer circumferential portion are provided on the same straight line extending in a radial direction of the roller from a center of the roller.

2. The roller according to claim 1, wherein the joining portions are joined to tangential lines of the inner circumferential portion and the outer circumferential portion in a perpendicular direction.

3. A separation device comprising:
a feed roller; and
a retarding roller that forms a pair with the feed roller to separate media other than a medium which is transported from a bundle of media and return the separated media upstream,
wherein the retarding roller is the roller according to claim 2.

4. A separation device comprising:
a feed roller; and
a retarding roller that forms a pair with the feed roller to separate media other than a medium which is transported from a bundle of media and return the separated media upstream,
wherein the retarding roller is the roller according to claim 1.

5. An image reading apparatus comprising:
a reader that reads image information of a medium; and
the separation device according to claim 4.

6. An image reading apparatus comprising:
a reader that reads image information of a medium; and
a roller that is provided in a medium transport path which passes through a reading execution region of the reader and applies a feeding force to the medium,
wherein the roller has a structure in which when the roller is pressed against the medium, a contact surface thereof is elastically crushed, and
wherein at least one of the rollers is the roller according to claim 1.

7. A recording apparatus comprising:
a recording unit; and
a roller that is provided in a medium transport path which passes through a recording execution region of the recording unit and applies a feeding force to the medium,
wherein the roller has a structure in which when the roller is pressed against the medium, a contact surface thereof is elastically crushed, and
wherein at least one of the rollers is the roller according to claim 1.

8. The roller according to claim 1,
Wherein the two outer circumferential portion corner portions each have a right angle.

9. A roller comprising:
an elastic body portion that is provided on an outer circumferential surface of a shaft, wherein the elastic body portion includes:
an inner circumferential portion which serves as the shaft side;
an outer circumferential portion which serves as an outer circumferential side with respect to the inner circumferential portion;
a space portion between the inner circumferential portion and the outer circumferential portion; and
a plurality of joining portions which join the inner circumferential portion and the outer circumferential portion to each other in the space portion and define a plurality of sub-space portions,
wherein at least a portion of each of the joining portions has a curved shape, and
wherein the joining portions are each joined to the inner circumferential portion and the outer circumferential portion such that connecting portions between the joining portions and the inner circumferential portion and connecting portions between the joining portions and the outer circumferential portion do not form acute angles in the space portion, and
wherein an area of one joining portion is less than an area of one sub-space portion when viewed along a rotational axis of the roller, and
wherein a connecting portion between a first joining portion of the joining portions and the inner circumferential portion and a connecting portion between a second joining portion, which is adjacent to the first joining portion, of the joining portions and the outer circumferential portion are provided on the same straight line extending in a radial direction of the roller from a center of the roller.

10. A roller comprising:
an elastic body portion that is provided on an outer circumferential surface of a shaft, wherein the elastic body portion includes:
an inner circumferential portion which serves as the shaft side;
an outer circumferential portion which serves as an outer circumferential side with respect to the inner circumferential portion;
a space portion between the inner circumferential portion and the outer circumferential portion; and
a plurality of joining portions which join the inner circumferential portion and the outer circumferential portion to each other in the space portion and define a plurality of sub-space portions,
wherein at least a portion of each of the joining portions has a curved shape,
wherein the joining portions are each joined to the inner circumferential portion and the outer circumferential portion such that connecting portions between the joining portions and the inner circumferential portion and connecting portions between the joining portions and the outer circumferential portion do not form acute angles in the space portion,
wherein the sub-space portion has two inner circumferential portion corner portions that are formed at the connecting portions between the joining portions and the inner circumferential portions and two outer circumferential portion corner portions that are formed at the connecting portions between the joining portions and the outer circumferential portions, and at least one of the two inner circumferential portion corner portions has a right angle, and
wherein a connecting portion between a first joining portion of the joining portions and the inner circumferential portion and a connecting portion between a second joining portion, which is adjacent to the first joining portion, of the joining portions and the outer circumferential portion are provided on the same straight line extending in a radial direction of the roller from a center of the roller.

11. The roller according to claim 10,
wherein the other of the two inner circumferential portion corner portions has the right angle,
wherein the two outer circumferential portion corner portions each have a right angle.

* * * * *